(12) United States Patent
Xu et al.

(10) Patent No.: US 11,523,309 B2
(45) Date of Patent: Dec. 6, 2022

(54) METHOD AND DEVICE FOR SUPPORTING HANDOVER

(71) Applicant: Samsung Electronics Co., Ltd., Suwon-si (KR)

(72) Inventors: Lixiang Xu, Beijing (CN); Hong Wang, Beijing (CN); Weiwei Wang, Beijing (CN)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 17/333,983

(22) Filed: May 28, 2021

(65) Prior Publication Data

US 2021/0377818 A1    Dec. 2, 2021

(30) Foreign Application Priority Data

May 29, 2020 (CN) .......................... 202010478645.1
Jun. 1, 2020 (CN) .......................... 202010486399.4
(Continued)

(51) Int. Cl.
*H04W 36/00* (2009.01)
*H04W 36/08* (2009.01)

(52) U.S. Cl.
CPC ... *H04W 36/0022* (2013.01); *H04W 36/0033* (2013.01); *H04W 36/08* (2013.01)

(58) Field of Classification Search
CPC ......... H04W 36/0033; H04W 36/0011; H04W 36/0022; H04W 36/08; H04W 36/0066; H04W 36/38; H04W 36/0016
See application file for complete search history.

(56) References Cited

U.S. PATENT DOCUMENTS

2017/0041767 A1* 2/2017 Vajapeyam ........... H04W 72/04
2017/0295524 A1* 10/2017 Malkamaki ............ H04L 47/34
(Continued)

FOREIGN PATENT DOCUMENTS

WO    2019194486 A1    10/2019

OTHER PUBLICATIONS

International Search Report of the International Searching Authority dated Aug. 30, 2021, in connection with International Application No. PCT/KR2021/006636, 3 pages.
(Continued)

*Primary Examiner* — Allahyar Kasraian

(57) ABSTRACT

The present disclosure relates to a communication method and system for converging a 5th-Generation (5G) communication system for supporting higher data rates beyond a 4th-Generation (4G) system with a technology for Internet of Things (IoT). The present disclosure may be applied to intelligent services based on the 5G communication technology and the IoT-related technology, such as smart home, smart building, smart city, smart car, connected car, health care, digital education, smart retail, security and safety services. According to an aspect of the embodiments of the present disclosure, a method for supporting handover is provided, comprising: receiving a message from a central unit control plane entity of a target base station; receiving a data packet from a source base station; and discarding a packet data convergence protocol (PDCP) service data unit (SDU) including the PDCP sequence number (SN) in the received data packet according to the indication of the message. The problem of coordinated work between the source base station and the target base station during the handover process may be solved. Especially when the source base station and/or the target base station support the separation of the control plane and the user plane, ensure
(Continued)

that the central unit control plane entity of the source base station, the central unit user plane entity of the source base station, the central unit control plane entity of the target base station and/or the central unit user plane entity of the target base station may fully coordinately work.

14 Claims, 30 Drawing Sheets

(30) Foreign Application Priority Data

| | | |
|---|---|---|
| Jul. 1, 2020 | (CN) | 202010626859.9 |
| Aug. 5, 2020 | (CN) | 202010779404.0 |
| Oct. 10, 2020 | (CN) | 202011079934.0 |
| Jan. 8, 2021 | (CN) | 202110024548.X |

(56) References Cited

U.S. PATENT DOCUMENTS

| | | | |
|---|---|---|---|
| 2019/0069333 A1* | 2/2019 | Kim | H04W 76/27 |
| 2019/0098544 A1* | 3/2019 | Han | H04W 72/1205 |
| 2020/0068639 A1* | 2/2020 | Kim | H04W 76/16 |
| 2020/0100102 A1* | 3/2020 | Xu | H04W 12/033 |
| 2021/0185755 A1 | 6/2021 | Kim et al. | |
| 2021/0211926 A1* | 7/2021 | Han | H04W 28/24 |
| 2021/0227428 A1* | 7/2021 | Bae | H04W 36/0069 |
| 2021/0345188 A1* | 11/2021 | Shaheen | H04W 88/085 |
| 2021/0345205 A1* | 11/2021 | Persson | H04W 74/0833 |
| 2021/0352522 A1* | 11/2021 | Hwang | H04W 28/0231 |
| 2021/0410027 A1* | 12/2021 | Persson | H04L 1/1896 |
| 2022/0060283 A1* | 2/2022 | Wang | H04L 1/08 |

OTHER PUBLICATIONS

China Telecom, "Discussion on PDCP Status Report indication over E1," R3-203134, 3GPP TSG-RAN WG3 #108-e, Jun. 1-12, 2020 Online, 3 pages.

Huawei, "(TP for NR_Mob_enh-Core BL CR for TS 38.463): Early Forwarding support over E1" R3-202416, 3GPP LSG-RAN WG3 #107-e, Feb. 24-Mar. 6, 2020 E-Meeting, 22 pages.

Intel Corporation, et al., "Early Forwarding support for DAPS/CHO over E1," R3-203776, 3GPP TSG-RAN WG3 Meeting #108-e, Electronic Meeting, Jun. 1-11, 2020, 3 pages.

Samsung, "Support direct data forwarding for inter-system handover," R3-203624, 3GPP TSG-RAN WG3 #108, Jun. 1-11, 2020, 9 pages.

* cited by examiner

METHOD AND DEVICE FOR SUPPORTING HANDOVER

CROSS-REFERENCE TO RELATED APPLICATIONS

This application is based on and claims priority under 35 U.S.C. § 119 to Chinese Patent Application No. 202010478645.1, filed on May 29, 2020, in the Chinese Intellectual Property Office, Chinese Patent Application No. 202010486399.4, filed on Jun. 1, 2020, in the Chinese Intellectual Property Office, Chinese Patent Application No. 202010626859.9, filed on Jul. 1, 2020, in the Chinese Intellectual Property Office, Chinese Patent Application No. 202010779404.0, filed on Aug. 5, 2020, in the Chinese Intellectual Property Office, Chinese Patent Application No. 202011079934.0, filed on Oct. 10, 2020, in the Chinese Intellectual Property Office, and Chinese Patent Application No. 202110024548.X, filed on Jan. 8, 2021, in the Chinese Intellectual Property Office, the disclosure of each of which is incorporated by reference herein in its entirety.

BACKGROUND

1. Field

The present disclosure relates to a communication technology, in particular to a method and device for supporting handover.

2. Description of Related Art

To meet the demand for wireless data traffic having increased since deployment of 4G communication systems, efforts have been made to develop an improved 5G or pre-5G communication system. Therefore, the 5G or pre-5G communication system is also called a 'Beyond 4G Network' or a 'Post LTE System'. The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems. In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like. In the 5G system, Hybrid FSK and QAM Modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The Internet, which is a human centered connectivity network where humans generate and consume information, is now evolving to the Internet of Things (IoT) where distributed entities, such as things, exchange and process information without human intervention. The Internet of Everything (IoE), which is a combination of the IoT technology and the Big Data processing technology through connection with a cloud server, has emerged. As technology elements, such as "sensing technology", "wired/wireless communication and network infrastructure", "service interface technology", and "Security technology" have been demanded for IoT implementation, a sensor network, a Machine-to-Machine (M2M) communication, Machine Type Communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing Information Technology (IT) and various industrial applications.

In line with this, various attempts have been made to apply 5G communication systems to IoT networks. For example, technologies such as a sensor network, Machine Type Communication (MTC), and Machine-to-Machine (M2M) communication may be implemented by beamforming, MIMO, and array antennas. Application of a cloud Radio Access Network (RAN) as the above-described Big Data processing technology may also be considered to be as an example of convergence between the 5G technology and the IoT technology.

Wireless communication is one of the most successful innovations in modern history. Recently, the number of subscribers to wireless communication services exceeded 5 billion, and it continues to grow rapidly. Due to an increasing popularity of smart phones and other mobile data devices (for example, tablet computers, notebook computers, netbooks, e-book readers, and machine-type devices) among consumers and enterprises, demands for wireless data services are growing rapidly. In order to meet the rapid growth of the mobile data services and support new applications and deployments, it is essential to improve the efficiency and coverage of wireless interfaces.

A base station may include a central unit control plane entity of the base station and a central unit user plane entity of the base station.

When a User Equipment (UE) moves between two base stations, in order to ensure a service continuity, a handover process needs to be defined, including an intra-system handover, such as a handover between gNB and gNB, a handover between gNB and eNB connected to 5GC, and an inter-system handovers, such as a handover between 5G system (5GS) and an evolved packet system (EPS).

For data forwarding, there are still problems on how the source base station and the target base station coordinately work. Particularly, in a case where the source base station and/or the target base station support the separation of the control plane and the user plane, there are still problems on how to ensure that the central unit control plane entity of the source base station, the central unit user plane entity of the source base station, the central unit control plane entity of the target base station and/or the central unit user plane entity of the target base station may fully coordinately work.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. According to the embodiment of the present disclosure, the problem of coordinated work between the source base station and the target base station during the handover process may be solved. Especially when the source base station and/or the target base station support the separation of the control plane and the user plane, ensure that the central unit control plane entity of the source base station, the central unit user plane entity of the source base station, the central unit control plane entity of the target base station and/or the central unit user plane entity of the target base station may fully coordinately work.

In addition, the method and device for supporting handover according to the embodiments of the present disclosure may also reduce data loss, reduce data interruption time, avoid sending useless data packets over the air interface, improve data forwarding efficiency, and ensure service continuity.

Additional aspects will be set forth in part in the description which follows and, in part, will be apparent from the description, or may be learned by practice of the presented embodiments.

According to an aspect of the embodiments of the present disclosure, a method for supporting handover is provided, comprising: receiving a message from a central unit control plane entity of a target base station; receiving a data packet from a source base station; and discarding a Packet Data Convergence Protocol (PDCP) Service Data Unit (SDU) including PDCP sequence numbers (SNs) in the received data packet according to an indication of the message.

In an example, the indication of the message includes an indication information sent through a bearer context modification request message, the indication information indicates at least one of the following: a full configuration or a delta configuration; whether the PDCP SN is reserved; whether the PDCP is restarted; and whether to discard the data packet of the PDCP SDU including the PDCP SN.

In an example, discarding the PDCP SDU including the PDCP SN in the received data packet according to the indication of the message comprises discarding the PDCP SDU including the PDCP SN in the received data packet when the indication information indicates at least one of the following: the full configuration; the PDCP SN is not reserved; the PDCP restarts; and the PDCP SDU including the PDCP SN is discarded.

In an example, the indication of the message includes at least one of the following: no PDCP SN status information is received; no PDCP SN status information of data radio bearer (DRB) is received; no bearer context modification request message is received; and no PDCP SN status information of the DRB is included in the received bearer context modification request message.

In an example, discarding the PDCP SDU including the PDCP SN comprises: identifying the SDU to be discarded according to the SN in the General Packet Radio Service (GPRS) Tunneling Protocol (GTP) user plane (GTP-U) data packet.

In an example, the received data packet is sent from the source base station or forwarded by the source base station through a core network.

In an example, the PDCP SDU without the PDCP SN in the received data packet is fresh data.

According to another aspect of the embodiments of the present disclosure, a method for supporting handover is provided, comprising: receiving a handover request message; receiving a sequence number (SN) status transfer message or a downlink radio access network (RAN) status transfer message; and sending a message to a central unit user plane entity of a target base station, wherein the central unit user plane entity of the target base station discards a Packet Data Convergence Protocol (PDCP) Service Data Unit (SDU) including PDCP sequence numbers (SNs) in the received data packet according to the indication of the message.

In an example, receiving the handover request message comprises receiving a handover request message from the source base station, and receiving the SN status transfer message comprises receiving the SN status transfer message from the source base station, wherein the handover request message is a Xn application protocol (AP) message or other inter-base station messages, and wherein the SN status transfer message is a Xn AP message or other inter-base station messages.

In an example, receiving the handover request message comprises receiving a handover request message from the core network, wherein the handover request message received from the core network is a next generation application protocol (NGAP) message or a message between another base station and the core network.

In an example, the handover request message received from the core network includes a handover type.

In an example, the method also comprises determining whether to use a full configuration or a delta configuration.

In an example, sending a message to the central unit user plane entity of the target base station comprises sending a bearer context modification request message to the central unit user plane entity of the target base station when the handover type is an inter-system handover or when it is decided to use the full configuration.

In an example, the indication of the message includes an indication information sent through a bearer context modification request message, the indication information indicating at least one of the following: a full configuration or a delta configuration; whether the PDCP SN is reserved; whether the PDCP is restarted; and whether to discard the PDCP SDU including the PDCP SN in the data packet.

In an example, the indication of the message includes at least one of the following: no PDCP SN status information is received; no PDCP SN status information of the data radio bearer (DRB) is received; no bearer context modification request message is received; and no PDCP SN status information of the DRB is included in the received bearer context modification request message.

According to an aspect of the embodiments of the present disclosure, a method for supporting handover is provided, comprising: receiving a handover request message by a target base station; sending information on whether to use the full configuration or the delta configuration to a source base station by the target base station; and not sending a Packet Data Convergence Protocol (PDCP) Service Data Unit (SDU) including PDCP sequence numbers (SNs) to the target base station by the source base station based on the information.

In an example, receiving the handover request message by the target base station comprises receiving the handover request message from the source base station or the core network, and the handover request message received from the source base station is a Xn application protocol (AP) message or other inter-base station messages, and the handover request message received from the core network is the next generation application protocol (NGAP) message or the message between another base station and the core network.

In an example, the method further comprises determining whether to use the full configuration or the delta configuration by the target base station, the full configuration or the delta configuration is for each data radio bearer.

In an example, when the separation of the central unit user plane of the source base station and the central unit control plane of the source base station is supported by the source base station, the central unit control plane entity of the source base station notifies the central unit user plane entity of the source base station of not sending the PDCP SDU including the PDCP SN to the target base station.

In an example, the central unit control plane entity of the source base station notifies the central unit user plane entity of the source base station of not sending the PDCP SDU including the PDCP SN to the target base station comprises: the central unit control plane entity of the source base station sends an indication information to the central unit user plane entity of the source base station. The indication information indicates at least one of the following: whether to use a full configuration or a delta configuration; whether the PDCP SN status is reserved; whether only the fresh data is sent; whether to send the PDCP SDU including the PDCP SN; whether to send the PDCP data packet sent to the user equipment (UE) but not confirmed by the UE; and whether to only send the PDCP SDU without the PDCP SN.

In an example, the central unit control plane entity of the source base station notifies the central unit user plane entity of the source base station of not sending the PDCP SDU including the PDCP SN to the target base station comprises: the central unit control plane entity of the source base station sends data forwarding tunnel information to the central unit user plane entity of the source base station without requesting PDCP SN status information in order to indicate that the central unit control plane entity of the source base station does not send PDCP SN status information to the target base station.

According to an aspect of the embodiments of the present disclosure, a method for supporting handover is provided, comprising: receiving a handover related message; and indicating to the central unit user plane entity of the source base station of the information for data forwarding, wherein the central unit user plane entity of the source base station sends a Packet Data Convergence Protocol (PDCP) Service Data Unit (SDU) without the PDCP SN to the target base station based on the information for data forwarding.

In an example, the handover related message is one of a handover request confirmation message and a handover command message, and receiving the handover related message comprises receiving the handover request confirmation message from the target base station or the handover command message from the core network, and wherein the handover related message indicates whether it is the full configuration or the delta configuration, or indicates whether the Packet Data Convergence Protocol (PDCP) Sequence Number (SN) status is reserved.

In an example, indicating the information for data forwarding comprises sending indication information through the bearer context modification request message, and the indication information indicates at least one of the following: whether the PDCP SN status is reserved; whether only the fresh data is sent; whether to send the PDCP SDU including the PDCP SN; whether to send PDCP data packet sent to the user equipment (UE) but not confirmed by the UE; and whether to only send PDCP SDU without the PDCP SN.

In an example, indicating to the central unit user plane entity of the source base station of the information for data forwarding comprises: sending data forwarding tunnel information without requesting PDCP SN status information, in order to indicate that the central unit control plane entity of the source base station does not send the PDCP SN status information to the target base station.

According to one aspect of the embodiments of the present disclosure, a method for supporting handover is provided, comprising: receiving an indication of the information for data forwarding; and sending a Packet Data Convergence Protocol (PDCP) Service Data unit (SDU) without the PDCP sequence number (SN) to a target base station, based on the information for data forwarding.

In an example, the indication of the information for data forwarding comprises an indication information received through the bearer context modification request message, and the indication information indicates at least one of the following: whether the PDCP SN status is reserved; whether only the fresh data is sent; whether to send the PDCP SDU including the PDCP SN; whether to send PDCP data packet sent to the user equipment (UE) but not confirmed by the UE; and whether to only send PDCP SDU without the PDCP SN.

In an example, receiving an indication of the information for data forwarding comprises: receiving data forwarding tunnel information from the central unit control plane entity of the source base station without requesting PDCP SN status information, in order to indicate that the central unit control plane entity of the source base station does not send PDCP SN status information to the target base station.

According to another aspect of the embodiments of the present disclosure, a method for supporting handover is provided, comprising: receiving a handover request message by a central unit control plane entity of a target base station; sending, by a central unit control plane entity of the target base station, configuration information of data radio bearer (DRB) at the source side and configuration information of DRB at the target side, and/or a mapping from source Quality of Service (Qos) flow to a data radio bearer (DRB) as well as a mapping from target Qos flow to DRB, to a central unit user plane entity of the target base station; and processing, by the central unit user plane entity of the target base station, the forwarded data received from the source base station using the configuration of DRB at the source side and/or the QoS flow to DRB mapping at the source side and a fresh data received from the core network using the configuration of DRB at the target side and/or the QoS flow to DRB mapping at the target side.

In an example, the handover request message is received from the source base station or from the core network, the handover request message received from the source base station is an application layer message of an inter-base station interface, and the handover request message received from the core network is an application layer message of the base station and the core network interface. The handover request message includes the configuration information of the user equipment (UE) at the source base station, and the configuration information includes the QoS flow to DRB mapping.

In an example, when the central unit control plane entity of the target base station determines to use the QoS flow to DRB mapping being different from that for the source base station, the central unit control plane entity of the target base station temporarily configures the QoS flow to DRB mapping which is same as the source base station to process the data forwarded by the source base station.

In an example, target QoS flow information to be established is indicated by existing QoS flow information to be established in the DRB information to be established in an interface message of the central unit control plane entity of the base station and the central unit user plane entity of the base station, and source QoS flow information to be established is indicated by a new information element; or the source QoS flow information to be established is indicated by existing QoS flow information to be established in the DRB information to be established in an interface message of the central unit control plane entity of the base station and the central unit user plane entity of the base station, and the target QoS flow information to be established is indicated by a new information element; or the target QoS flow mapped to DRB is indicated by existing flow mapping information in the DRB information to be modified in the interface message of the central unit control plane entity of the base station and the central unit user plane entity of the base station, and the source QoS flow mapped to DRB is indicated by a new information element; or the source QoS flow mapped to DRB is indicated by the existing flow mapping information in the DRB information to be modified in the interface message of the central unit control plane entity of the base station and the central unit user plane entity of the base station, and the target QoS flow mapped to DRB is indicated by a new information element.

In an example, the central unit control plane entity of the target base station sends the configuration information of DRB at the source side and the configuration information of DRB at the target side to the central unit user plane entity of the target base station directly, or sends the configuration information of DRB at the target side together with a delta configuration between the source side and the target side to the central unit user plane entity of the target base station, or sends the configuration information of DRB at the source side and a delta configuration between the source side and the target side to the central unit user plane entity of the target base station.

According to another aspect of the embodiments of the present disclosure, a method for supporting handover is provided, comprising: receiving a handover request message; and sending configuration information of DRB at a source side and configuration information of DRB at a target side, and/or a mapping from source Quality of Service (Qos) flow to the data radio bearer (DRB) as well as a mapping from a target Qos flow to DRB, to a central unit user plane entity of a target base station, wherein the configuration of DRB at the source side and/or the QoS flow to DRB mapping at the source side is used to process the forwarded data received from the source base station by the central unit user plane entity of the target base station, and the configuration of DRB at the target side and/or the QoS flow to DRB mapping at the target side is used to process a fresh data received from the core network.

In an example, target QoS flow information to be established is indicated by existing QoS flow information to be established in the DRB information to be established in an interface message of the central unit control plane entity of the base station and the central unit user plane entity of the base station, and source QoS flow information to be established is indicated by a new information element; or the source QoS flow information to be established is indicated by existing QoS flow information to be established in the DRB information to be established in an interface message of the central unit control plane entity of the base station and the central unit user plane entity of the base station, and the target QoS flow information to be established is indicated by a new information element; or the target QoS flow mapped to DRB is indicated by existing flow mapping information in the DRB information to be modified in the interface message of the central unit control plane entity of the base station and the central unit user plane entity of the base station, and the source QoS flow mapped to DRB is indicated by a new information element; or the source QoS flow mapped to DRB is indicated by the existing flow mapping information in the DRB information to be modified in the interface message of the central unit control plane entity of the base station and the central unit user plane entity of the base station, and the target QoS flow mapped to DRB is indicated by a new information element.

In an example, the central unit control plane entity of the target base station sends the configuration information of DRB at the source side and the configuration information of DRB at the target side to the central unit user plane entity of the target base station directly, or sends the configuration information of DRB at the target side together with a delta configuration between the source side and the target side to the central unit user plane entity of the target base station, or sends the configuration information of DRB at the source side and a delta configuration between the source side and the target side to the central unit user plane entity of the target base station.

According to still another aspect of the embodiments of the present disclosure, a method for supporting handover is provided, comprising: receiving configuration information of DRB at a source side and configuration information of DRB at a target side and/or a mapping from source Quality of Service (Qos) flow to the data radio bearer (DRB) as well as a QoS flow to DRB mapping at the target side, from a central unit control plane entity of the target base station; and processing the forwarded data received from the source base station using the configuration of DRB at the source side and/or the QoS flow to DRB mapping at the source side and a fresh data received from the core network using the configuration of DRB at the target side and/or the QoS flow to DRB mapping at the target side.

In an example, target QoS flow information to be established is indicated by existing QoS flow information to be established in the DRB information to be established in an interface message of the central unit control plane entity of the base station and the central unit user plane entity of the base station, and source QoS flow information to be established is indicated by a new information element; or the source QoS flow information to be established is indicated by existing QoS flow information to be established in the DRB information to be established in an interface message of the central unit control plane entity of the base station and the central unit user plane entity of the base station, and the target QoS flow information to be established is indicated by a new information element; or the target QoS flow mapped to DRB is indicated by existing flow mapping information in the DRB information to be modified in the interface message of the central unit control plane entity of the base station and the central unit user plane entity of the base station, and the source QoS flow mapped to DRB is indicated by a new information element; or the source QoS flow mapped to DRB is indicated by the existing flow mapping information in the DRB information to be modified in the interface message of the central unit control plane entity of the base station and the central unit user plane entity of the base station, and the target QoS flow mapped to DRB is indicated by a new information element.

In an example, the central unit control plane entity of the target base station sends the configuration information of DRB at the source side and the configuration information of DRB at the target side to the central unit user plane entity of the target base station directly, or sends the configuration information of DRB at the target side together with a delta configuration between the source side and the target side to the central unit user plane entity of the target base station, or sends the configuration information of DRB at the source side and a delta configuration between the source side and the target side to the central unit user plane entity of the target base station.

According to another aspect of the embodiments of the present disclosure, a method for supporting handover is provided, comprising: receiving, by a central unit control plane entity of a target base station, a handover request message from a source base station or a core network; sending, by the central unit control plane entity of the target base station, a mapping from source Quality of Service (Qos) flow to data radio bearer (DRB) to a central unit user plane entity of the target base station; processing, by the central unit user plane entity of the target base station, forwarded data received from the source base station using the received QoS flow to DRB mapping at the source side; sending, by the central unit control plane entity of the target base station, a QoS flow to DRB mapping at the target side to the central unit user plane entity of the base station; and processing, by the central unit user plane entity of the target base station, fresh data received from the core network using newly received QoS flow to DRB mapping and sending to a user equipment (UE).

In an example, the method further comprises: including the QoS flow to DRB mapping at the target side in the handover command message by the central unit control plane entity of the target base station, the handover command message is sent to the UE through the source base station.

In an example, the method further comprises: including, by the central unit control plane entity of the target base station, the QoS flow to DRB mapping at the source side in the handover command message, the handover command message is sent to the UE through the source base station; sending, by the central unit control plane entity of the target base station, a radio resource control (RRC) reconfiguration message to UE, the RRC reconfiguration message includes the QoS flow to DRB mapping determined by the target; sending, by the central unit user plane entity of the target base station, an indication message to the central unit control plane entity of the target base station after an end marker packet is received by the central unit user plane entity of the target base station; and sending, by the central unit control plane entity of the target base station, the QoS flow to DRB mapping determined by the target through the RRC reconfiguration message.

In an example, sending the QoS flow to DRB mapping at the source side to the central unit user plane entity of the target base station by the central unit control plane entity of the target base station comprises: including the QoS flow information to be established in the DRB information to be established which is sent from the central unit control plane entity of the target base station to the central unit user plane entity of the target base station. The QoS flow information to be established included in the DRB information to be established is set according to the QoS flow to DRB mapping at the source side.

In an example, sending the mapping of the target Qos flow to DRB to the central unit user plane entity of the base station by the central unit control plane entity of the target base station comprises: including the QoS flow information to be established in the DRB information to be established which is sent from the central unit control plane entity of the target base station to the central unit user plane entity of the target base station. The QoS flow information to be established included in the DRB information to be established is set according to the QoS flow to DRB mapping at the target side.

According to another aspect of the embodiments of the present disclosure, a method for supporting handover is provided, comprising: receiving a handover request message from a source base station or from a core network; sending a mapping from source Quality of Service (Qos) flow to data radio bearer (DRB) to a central unit user plane entity of a target base station, wherein forwarded data received from a source base station is processed using the received QoS flow to DRB mapping at the source side by the central unit user plane entity of the target base station; and sending a QoS flow to DRB mapping at the target side to the central unit user plane entity of the base station, wherein a fresh data received from the core network is processed using newly received QoS flow to DRB mapping and sent to a user equipment (UE) by the central unit user plane entity of the target base station.

In an example, sending a mapping from source Quality of Service (Qos) flow to data radio bearer (DRB) to a central unit user plane entity of a target base station comprises: including the QoS flow information to be established in the DRB information to be established which is sent from the central unit control plane entity of the target base station to the central unit user plane entity of the target base station, the QoS flow information to be established included in the DRB information to be established is set according to the QoS flow to DRB mapping at the source side. And wherein sending the mapping of the target Qos flow to DRB to the central unit user plane entity of the base station comprises: including the QoS flow information to be established in the DRB information to be established which is sent from the central unit control plane entity of the target base station to the central unit user plane entity of the target base station, the QoS flow information to be established included in DRB information to be established is set according to the QoS flow to DRB mapping at the target.

According to another aspect of the embodiments of the present disclosure, a method for supporting handover is provided, comprising: receiving a mapping from source Quality of Service (Qos) flow to data radio bearer (DRB) from a central unit control plane entity of a target base station; processing forwarded data received from a source base station using the received QoS flow to DRB mapping at the source side; receiving a QoS flow to DRB mapping at the target side from the central unit control plane entity of the target base station; and processing a fresh data received from a core network using newly received QoS flow to DRB mapping and sending them to a user equipment (UE).

In an example, receiving a mapping from source Quality of Service (Qos) flow to data radio bearer (DRB) from a central unit control plane entity of a target base station comprises: including the QoS flow information to be established in the DRB information to be established which is sent from the central unit control plane entity of the target base station to the central unit user plane entity of the target base station, the QoS flow information to be established included in the DRB information to be established is set according to the QoS flow to DRB mapping at the source side. And wherein receiving a QoS flow to DRB mapping at the target side from the central unit control plane entity of the target base station comprises: including the QoS flow information to be established in the DRB information to be established which is sent from the central unit control plane entity of the target base station to the central unit user plane entity of the target base station, the QoS flow information to be established included in the DRB information to be established is set according to the QoS flow to DRB mapping at the target side.

According to another aspect of the embodiments of the present disclosure, a method for supporting handover is provided, comprising: receiving, by a central unit control plane entity of a target base station, a handover request message from a source base station or a core network; sending, by the central unit control plane entity of the target base station, a mapping from source Quality of Service (Qos) flow to data radio bearer (DRB) to a central unit user plane entity of the target base station; processing, by the central unit user plane entity of the target base station, the forwarded data received from the source base station using the received QoS flow to DRB mapping at the source side; sending, by the central unit control plane entity of the target base station, a QoS flow to DRB mapping at the target side to the central unit user plane entity of the base station and sending an indication information; and processing, by the central unit user plane entity of the target base station, the forwarded data received from the source base station using the received QoS flow to DRB mapping at the source side and processing a fresh data received from the core network using newly received QoS flow to DRB mapping at the target side.

In an example, the central unit user plane entity of the target base station does not delete an old source mapping and/or does not delete a DRB that is temporarily used for processing the forwarded data but is not used by the target according to the received indication information.

According to one aspect of the embodiments of the present disclosure, a method for supporting handover is provided, comprising: receiving, by a central unit control plane entity of a source base station, a handover command message; and sending, by the central unit control plane entity of the source base station, a bearer context modification request message to a central unit user plane entity of the source base station, wherein the central unit user plane entity of the source base station forwards data according to the information in the received bearer context modification request message.

In an example, the handover command message includes Evolved Universal Terrestrial Radio Access Network (E-UTRAN) Radio Access Bearer (E-RAB) identification information for data forwarding and data forwarding tunnel information.

In an example, the bearer context modification request message includes data forwarding information for handover to the Evolved Universal Terrestrial Radio Access Network (E-UTRAN) or data forwarding information for inter-system handover, so as to notify the central unit user plane entity of the source base station of the data forwarding information.

In an example, the data forwarding information includes downlink data forwarding information, the downlink data forwarding information includes a transport layer address and a tunnel identifier, and the transport layer address and tunnel identifier are data forwarding tunnel information assigned to each E-RAB by the target base station which is received in the handover command message by the central unit control plane entity of the source base station.

In an example, the downlink data forwarding information further includes at least one of the following: a Quality of Service (Qos) flow list for forwarding data through a data forwarding tunnel; a data radio bearer (DRB) identifier; and an E-RAB identifier.

In an example, for the inter-system handover, the DRB identifier corresponds to each E-RAB identifier respectively, and is the same as the E-RAB identifier or corresponds to the E-RAB identifier one-to-one.

In an example, the central unit user plane entity of the source base station determines that it is an inter-system handover according to the data forwarding information for the handover to E-UTRAN or the inter-system handover data forwarding information, and no service data adaptation protocol (SDAP) header is included in the forwarded data packet; or for the inter-system handover, the central unit user plane entity of the source base station includes the SDAP header in the data packet forwarded on the tunnel corresponding to each DRB.

In an example, the central unit user plane entity of the source base station is notified of the data forwarding tunnel information and the Quality of Service (Qos) flow information forwarded on each the tunnel by the data radio bearer (DRB) information to be established and/or the DRB information to be modified in the bearer context modification request message.

In an example, the bearer context modification request message includes an indication information of the inter-system handover, and the indication information of the inter-system handover may be included in at least one of the protocol data unit (PDU) session resource modification information, the DRB information to be modified, or the DRB information to be established.

In an example, when the DRB of the central unit user plane entity of the source base station is configured during an setup of the PDU session, the central unit control plane entity of the source base station sends the transport layer address and the tunnel identifier assigned by the target base station through the DRB data forwarding information in the DRB modification item, and sends the Quality of Service (Qos) flow that forwards the data on the tunnel corresponding to DRB through the flow mapping information in the DRB modification item, wherein the DRB identifier is included in the DRB modification item.

In an example, when the DRB of the central unit user plane entity of the source base station is not configured during the setup of the PDU session, the central unit control plane entity of the source base station sends the transport layer address and the tunnel identifier assigned by the target base station to the central unit user plane entity of the source base station by adding DRB data forwarding information in the DRB setup item, and sends the Qos flow that forwards the data on the tunnel corresponding to DRB to the central unit user plane entity of the source base station through the Qos flow information to be established in the DRB setup item, wherein the DRB identifier is included in the DRB setup item.

In an example, the central unit user plane entity of the source base station knows the Quality of Service (Qos) flow forwarded through the tunnel according to DRB data forwarding information of each DRB in the received DRB information to be modified and flow mapping information, or the central unit user plane entity of the source base station knows the QoS flow forwarded through the tunnel according to DRB data forwarding information of each DRB in the received DRB information to be established and the QoS flow information to be established.

In an example, the central unit user plane entity of the source base station determines the inter-system handover according to a received indication information on inter-system handover, and no service data adaptation protocol (SDAP) header is included in the forwarded data packet; or for the inter-system handover, the central unit user plane entity of the source base station includes the SDAP header in the data packet forwarded on the tunnel corresponding to each DRB.

According to one aspect of the embodiments of the present disclosure, a method for supporting handover is provided, comprising: receiving, by a central unit user plane entity of a source base station, a bearer context modification request message from a central unit control plane entity of the source base station; and forwarding, by the central unit user plane entity of the source base station, data according to the information in the received bearer context modification request message.

In an example, the bearer context modification request message includes data forwarding information for handover to the Evolved Universal Terrestrial Radio Access Network (E-UTRAN) or data forwarding information for inter-system handover, so as to notify the central unit user plane entity of the source base station of the data forwarding information.

In an example, the data forwarding information includes a downlink data forwarding information, the downlink data forwarding information includes a transport layer address and a tunnel identifier, and the transport layer address and tunnel identifier are the data forwarding tunnel information for each E-RAB assigned by the target base station which is received in the handover command message by the central unit control plane entity of the source base station.

In an example, the downlink data forwarding information further includes at least one of the following: a Quality of Service (Qos) flow list for forwarding data through the data forwarding tunnel; a data radio bearer (DRB) identifier; and an E-RAB identifier.

In an example, for the inter-system handover, the DRB identifier corresponds to each E-RAB identifier respectively, and is the same as the E-RAB identifier or corresponds to the E-RAB identifier one-to-one.

In an example, the central unit user plane entity of the source base station determines that it is an inter-system handover according to the data forwarding information for the handover to E-UTRAN or the inter-system handover data forwarding information, and no service data adaptation protocol (SDAP) header is included in the forwarded data packet; or for the inter-system handover, the central unit user plane entity of the source base station includes the SDAP header in the data packet forwarded on the tunnel corresponding to each DRB.

In an example, the central unit user plane entity of the source base station is notified of the data forwarding tunnel information and the Quality of Service (Qos) flow information forwarded on each tunnel by the data radio bearer (DRB) information to be established and/or the DRB information to be modified in the bearer context modification request message; and the central unit user plane entity of the source base station forwards data according to the information in the received bearer context modification request message.

In an example, the bearer context modification request message includes indication information on the inter-system handover, and the indication information on the inter-system handover may be included in at least one of the protocol data unit (PDU) session resource modification information, the DRB information to be modified, or the DRB information to be established.

In an example, when the DRB of the central unit user plane entity of the source base station is configured during the setup of the PDU session, the central unit control plane entity of the source base station sends the transport layer address and the tunnel identifier assigned by the target base station through the DRB data forwarding information in the DRB modification item, and sends the Quality of Service (Qos) flow that forwards the data on the tunnel corresponding to DRB through the flow mapping information in the DRB modification item, wherein the DRB identifier is included in the DRB modification item.

In an example, when the DRB of the central unit user plane entity of the source base station is not configured during the setup of the PDU session, the central unit control plane entity of the source base station sends the transport layer address and the tunnel identifier assigned by the target base station to the central unit user plane entity of the source base station by adding DRB data forwarding information in the DRB setup item, and ends the Qos flow that forwards the data on the tunnel corresponding to DRB to the central unit user plane entity of the source base station through the Qos flow information to be established in the DRB setup item, wherein the DRB identifier is included in the DRB setup item.

In an example, the central unit user plane entity of the source base station knows the Quality of Service (Qos) flow forwarded through the tunnel according to DRB data forwarding information of each DRB in the received DRB information to be modified and flow mapping information, or the central unit user plane entity of the source base station knows the QoS flow forwarded through the tunnel according to DRB data forwarding information of each DRB in the received DRB information to be established and the QoS flow information to be established.

In an example, the central unit user plane entity of the source base station determines the inter-system handover according to the received indication information on inter-system handover, and no service data adaptation protocol (SDAP) header is included in the forwarded data packet; or for the inter-system handover, the central unit user plane entity of the source base station includes the SDAP header in the data packet forwarded on the tunnel corresponding to each DRB.

According to one aspect of the embodiments of the present disclosure, a method for supporting handover is provided, comprising: receiving a message from a central unit control plane entity of a target base station; receiving data packets from a source base station; and discarding PDCP SN included in the received data packet according to the indication of the message.

In an example, discarding the PDCP SN included in the received data packet comprises not sending the PDCP SN received from the source base station to the UE by the central unit user plane entity of the target base station.

In an example, the data packet is sent to the UE after processing by the target after the central unit user plane entity of the target base station removes the PDCP SN from the PDCP SDU.

In an example, the message may indicate the discarding of the PDCP SN included in the received data packet with an explicit indication way or an implicit indication way.

In an example, the explicit indication may comprise including indication information in the message, and the implicit indication may comprise without PDCP SN status information in the message.

In an example, the indication information may indicate at least one of the following: whether it is a full configuration or a delta configuration; whether PDCP SN is reserved; whether PDCP is restarted; discarding the data packet of the PDCP SDU including the PDCP SN; or discarding the PDCP SN included in the received data packet.

In an example, discarding the PDCP SN included in the received data packet according to the indication of the message, comprises: discarding the PDCP SN included in the received data packet when the indication information indicates at least one of the following: full configuration; the PDCP SN is not reserved; PDCP restarts; and discard the PDCP SDU including the PDCP SN or discard the PDCP SN included in the received data packet.

In an example, discarding the PDCP SN included in the received data packet according to the indication of the message, comprises: discarding the PDCP SN included in the received data packet when the indication of the message indicates at least one of the following: no PDCP SN status information is received; no PDCP SN status information of the data radio bearer (DRB) is received; no bearer context modification request message is received; and no PDCP SN status information of the DRB is included in the received bearer context modification request message.

According to another aspect of the embodiments of the present disclosure, a method for supporting handover is provided, comprising: receiving a handover request message; receiving a sequence number (SN) status transfer message or a downlink radio access network (RAN) status transfer message; and sending a message to a central unit user plane entity of a target base station, wherein the central unit user plane entity of the target base station discards PDCP SN included in the received data packet according to the indication of the message.

According to another aspect of the embodiments of the present disclosure, a method for supporting handover is provided, comprising: receiving, by a central unit user plane entity of a target base station, an indication information sent by a central unit control plane entity of a target base station; receiving, by the central unit user plane entity of the target base station, a data packet from the source base station or forwarded by the source base station through the core network; and receiving, by the central unit user plane entity of the target base station, the indication information from the central unit control plane entity of the target base station, and discarding, by the central unit user plane entity of the target base station, the PDCP SN included in the received data packet.

In an example, if the indication information indicates the full configuration or the PDCP SN is not reserved or the PDCP restarts or indicates to discard the PDCP SDU information including the PDCP SN or indicates to discard the PDCP SN information, the central unit user plane entity of the target base station discards the PDCP SN included in the received data packet.

According to another aspect of the embodiments of the present disclosure, a method for supporting handover is provided, comprising: receiving, by a central unit user plane entity of a target base station, a message sent by a central unit control plane entity of a target base station; receiving, by the central unit user plane entity of the target base station, a data packet from the source base station or forwarded by the source base station through the core network; and discarding the PDCP SN included in the received data packet by the central unit user plane entity of the target base station if no PDCP SN status information is received.

According to another aspect of the embodiments of the present disclosure, a method for supporting handover is provided, comprising: receiving, by a target base station, a handover request message; sending, by the target base station, information on whether to use a full configuration or a delta configuration to a source base station; and forwarding, by the source base station, data packets without the PDCP SN to the target base station based on the information.

In an example, the information on whether to use the full configuration or the delta configuration may be at least one of the following: information on whether the PDCP SN status is reserved, information on whether the PDCP SN is restarted, information on the PDCP SN is not required, or information on the data packet including the PDCP SN is not required.

In an example, if the source base station supports an architecture where the control plane and the user plane are separated, the central unit control plane entity of the source base station may notify the central unit user plane entity of the source base station there is no PDCP SN in the forwarded data packet through an explicit indication way or an implicit indication way.

In an example, the indication information may indicate at least one of the following: whether it is a full configuration or a delta configuration; whether PDCP SN is reserved; whether only the fresh data is sent; whether to send PDCP SDU including the PDCP SN; whether to send PDCP data packet sent to the user equipment (UE) but not confirmed by the UE; whether to include the PDCP SDU in the forwarded data packet; and whether to only send PDCP SDU without the PDCP SN.

According to another aspect of the embodiments of the present disclosure, a method for supporting handover is provided, comprising: receiving, by a target base station or a central unit control plane entity of the target base station, a handover request message; sending, by the target base station or the central unit control plane entity of the target base station, information on whether it is full configuration or delta configuration to the source base station or a central unit control plane entity of the source base station; and forwarding, by the source base station, the data packet without the PDCP SN to the target base station.

According to another aspect of the embodiments of the present disclosure, a method for supporting handover is provided, comprising: receiving, a handover related message; and indicating to a central unit user plane entity of a source base station of information for data forwarding, wherein the central unit user plane entity of the source base station forwards a PDCP SDU without the PDCP SN to the target base station based on the information for data forwarding.

In an example, the central unit control plane entity of the source base station may indicate the information for data forwarding to the central unit user plane entity of the source base station through an explicit indication way or an implicit indication way.

In an example, forwarding the data packet without the PDCP SN to the target base station by central unit user plane entity of the source base station when the indication information determines at least one of the followings: no PDCP SN status is reserved; only the fresh data is sent; the PDCP SDU including the PDCP SN is not sent; PDCP data packet sent to the user equipment (UE) but not confirmed by the UE is not forwarded; and only the PDCP SDU without the PDCP SN is sent.

In an example, for the DRB requested to be modified or established by the central unit control plane entity of the source base station, if the central unit control plane entity of the source base station does not request PDCP SN status information, the central unit user plane entity of the source base station forwards the PDCP SDU without the PDCP SN to the target base station.

According to another aspect of the embodiments of the present disclosure, a method for supporting handover is provided, comprising: receiving, by a central unit control plane entity of a source base station, a handover command message or a handover request confirmation message; notifying, by the central unit control plane entity of the source base station, the central unit user plane entity of the source base station of the data forwarding information through an explicit indication way or an implicit indication way; and forwarding, by the central unit user plane entity of the source base station, the data packet without the PDCP SN to the target base station.

According to another aspect of the embodiments of the present disclosure, a method for supporting handover is provided, comprising: receiving an indication of the information for data forwarding; and not sending a Packet Data Convergence Protocol (PDCP) Service Data Unit (SDU) including the PDCP sequence number (SN) to a target base station, based on the information for data forwarding.

In an example, an indication of the information for data forwarding may be received through an explicit indication way or an implicit indication way.

In an example, forwarding the data packet without the PDCP SN to the target base station by the source base station when the indication information determines at least one of the followings: the PDCP SN status is not reserved; only the fresh data is sent; the PDCP SDU including the PDCP SN is not sent; PDCP data packet sent to the user equipment (UE) but not confirmed by the UE is not sent; PDCP SN is not sent; and only the PDCP SDU without the PDCP SN is sent.

In an example, by not requesting of the PDCP SN status information, the central unit user plane entity of the source base station knows that the PDCP SN is not reserved or the central unit control plane entity of the source base station does not send PDCP SN status information to the target base station, and forwards PDCP SDU without the PDCP SN to the target base station.

According to another aspect of the embodiments of the present disclosure, a method for supporting handover is provided, comprising: receiving, by a central unit user plane entity of a source base station, the data forwarding information and the tunnel information for data forwarding sent by a central unit control plane entity of a source base station; and forwarding data packets without the PDCP SN to the target base station by the central unit control plane entity of the source base station.

According to another aspect of the embodiments of the present disclosure, a method for supporting handover performed by a target base station is provided, comprising: receiving, at a central unit-user plane (CU-UP) of the target base station, a first message for a bearer context modification from a central unit-control plane (CU-CP) of the target base station; receiving, at the CU-UP of the target base station, a packet data convergence protocol (PDCP) service data unit (SDU) from a central unit-user plane (CU-UP) of a source base station; identifying, at the CU-UP of the target base station, whether the first message includes PDCP sequence number (SN) status information; in case that the first message does not include the PDCP SN status information, identifying, at the CU-UP of the target base station, whether the PDCP SDU includes a PDCP SN; and in case that the PDCP SDU includes the PDCP SN, discarding, at the CU-UP of the target base station, the PDCP SDU.

In an example, transmission of the PDCP SDU may be skipped.

In an example, when intra-system handover involves full configuration, the first message does not include the PDCP SN status information.

In an example, identifying whether the PDCP SDU includes the PDCP SN comprising: identifying, at the CU-UP of the target base station, whether the PDCP SN is present in a forwarded general packet radio service tunneling protocol-user plane (GTP-U) packet.

According to another aspect of the embodiments of the present disclosure, a method for supporting handover performed by a target base station is provided, comprising: identifying, at a central unit-control plane (CU-CP) of the target base station, whether the intra-system handover involves full configuration; in case that intra-system handover involves the full configuration, generating, at the CU-CP of the target base station, a message for a bearer context modification which does not include packet data convergence protocol (PDCP) sequence number (SN) status information; and transmitting, at the CU-CP of the target base station, the message to a central unit-user plane (CU-UP) of the target base station, wherein a PDCP service data unit (SDU) received from a CU-UP of the source base station is discarded in case that the PDCP SDU includes a PDCP SN.

In an example, transmission of the PDCP SDU may be skipped.

In an example, whether the PDCP SDU includes the PDCP SN is identified based on a presence of the PDCP SN in a forwarded general packet radio service tunneling protocol-user plane (GTP-U) packet.

According to another aspect of the embodiments of the present disclosure, a target base station for supporting handover is provided, comprising: a transceiver; and a processor coupled with the transceiver and configured to: receive, at a central unit-user plane (CU-UP) of the target base station, a first message for a bearer context modification from a central unit-control plane (CU-CP) of the target base station, receive, at the CU-UP of the target base station, a packet data convergence protocol (PDCP) service data unit (SDU) from a central unit-user plane (CU-UP) of a source base station, identify, at the CU-UP of the target base station, whether the first message includes PDCP sequence number (SN) status information, in case that the first message does not include the PDCP SN status information, identify, at the CU-UP of the target base station, whether the PDCP SDU includes a PDCP SN, and in case that the PDCP SDU includes the PDCP SN, discard, at the CU-UP of the target base station, the PDCP SDU.

In an example, transmission of the PDCP SDU may be skipped.

In an example, when intra-system handover involves full configuration, the first message does not include the PDCP SN status information.

In an example, the processor is configured to identify, at the CU-UP of the target base station, whether the PDCP SN is present in a forwarded general packet radio service tunneling protocol-user plane (GTP-U) packet.

According to another aspect of the embodiments of the present disclosure, a target base station for supporting handover is provided, comprising: a transceiver; and a processor coupled with the transceiver and configured to: identify, at a central unit-control plane (CU-CP) of the target base station, whether the intra-system handover involves full configuration, in case that the intra-system handover involves the full configuration, generate, at the CU-CP of the target base station, a message for a bearer context modification which does not include packet data convergence protocol (PDCP) sequence number (SN) status information, and transmit, at the CU-CP of the target base station, the message to a central unit-user plane (CU-UP) of the target base station, wherein a PDCP service data unit (SDU) received from a CU-UP of the source base station is discarded in case that the PDCP SDU includes a PDCP SN.

In an example, transmission of the PDCP SDU may be skipped.

In an example, whether the PDCP SDU includes the PDCP SN is identified based on a presence of the PDCP SN in a forwarded general packet radio service tunneling protocol-user plane (GTP-U) packet.

According to another aspect of the embodiments of the present disclosure, a method for supporting handover performed by a source base station in a first system is provided, comprising: receiving, at a central unit-control plane (CU-CP) of the source base station, a first message for a handover command from a core network, the first message including an identifier of an evolved universal terrestrial radio access network (E-UTRAN) radio access bearer (E-RAB) and information associated with a tunnel for data forwarding; identifying, at the CU-CP of the source base station, information for data forwarding to a second system based on the first message, the information for data forwarding including the information associated with the tunnel and an identifier of a quality of service (QoS) flow to be forwarded on the tunnel; and transmitting, at the CU-CP of the source base station, a second message for a bearer context modification to a central unit-user plane (CU-UP) of the source base station, the second message including the information for data forwarding, wherein data associated with the QoS flow is forwarded to a target base station in the second system based on the information for data forwarding.

In an example, information on a mapping relationship between the E-RAB and the QoS flow is obtained based on a procedure associated with a protocol data unit (PDU) session setup, and the identifier of the QoS flow is identified based on the mapping relationship.

In an example, the data is forwarded as a packet data convergence protocol (PDCP) service data unit (SDU) without a service data adaptation protocol (SDAP) header.

In an example, the information associated with the tunnel includes a transport layer address of the tunnel and an identifier of the tunnel.

According to another aspect of the embodiments of the present disclosure, a method for supporting handover performed by a source base station in a first system is provided, comprising: receiving, at a central unit-user plane (CU-UP) of the source base station, a message for a bearer context modification from a central unit-control plane (CU-CP) of the source base station; in case that the message includes information for data forwarding to a second system, identifying, at the CU-UP of the source base station, a tunnel and a quality of flow (QoS) to be forwarded on the tunnel based on the information for data forwarding; and forwarding, at the CU-UP of the source base station, data associated with the QoS flow to a target base station in the second system through the tunnel; wherein the information for data forwarding includes information associated with the tunnel and an identifier of the QoS flow.

In an example, the information for data forwarding is based on a message for a handover command, the message for the handover command is received by the CU-CU of the source base station from a core network, and the message for the handover command includes an identifier of an evolved universal terrestrial radio access network (E-UTRAN) radio access bearer (E-RAB) and the information associated with the tunnel for data forwarding.

In an example, the data is forwarded as a packet data convergence protocol (PDCP) service data unit (SDU) without a service data adaptation protocol (SDAP) header.

In an example, the information associated with the tunnel includes a transport layer address of the tunnel and an identifier of the tunnel.

According to another aspect of the embodiments of the present disclosure, a source base station for supporting handover in a first system is provided, comprising: a transceiver; and a processor coupled with the transceiver and configured to: receive, at a central unit-control plane (CU-CP) of the source base station, a first message for a handover command from a core network, the first message including an identifier of an evolved universal terrestrial radio access network (E-UTRAN) radio access bearer (E-RAB) and information associated with a tunnel for data forwarding, identify, at the CU-CP of the source base station, information for data forwarding to a second system based on the first message, the information for data forwarding including the information associated with the tunnel and an identifier of a quality of service (QoS) flow to be forwarded on the tunnel, and transmit, at the CU-CP of the source base station, a second message for a bearer context modification to a central unit-user plane (CU-UP) of the source base station, the second message including the information for data forwarding, wherein data associated with the QoS flow is forwarded to a target base station in the second system based on the information for data forwarding.

In an example, information on a mapping relationship between the E-RAB and the QoS flow is obtained based on a procedure associated with a protocol data unit (PDU) session setup, and the identifier of the QoS flow is identified based on the mapping relationship.

In an example, the data is forwarded as a packet data convergence protocol (PDCP) service data unit (SDU) without a service data adaptation protocol (SDAP) header.

In an example, the information associated with the tunnel includes a transport layer address of the tunnel and an identifier of the tunnel.

According to another aspect of the embodiments of the present disclosure, a source base station for supporting handover in a first system is provided, comprising: a transceiver; and a processor coupled with the transceiver and configured to: receive, at a central unit-user plane (CU-UP) of the source base station, a message for a bearer context modification from a central unit-control plane (CU-CP) of the source base station, in case that the message includes information for data forwarding to a second system, identify, at the CU-UP of the source base station, a tunnel and a quality of flow (QoS) to be forwarded on the tunnel based on the information for data forwarding, and forward, at the CU-UP of the source base station, data associated with the QoS flow to a target base station in the second system through the tunnel, wherein the information for data forwarding includes information associated with the tunnel and an identifier of the QoS flow.

In an example, the information for data forwarding is based on a message for a handover command, the message for the handover command is received by the CU-CU of the source base station from a core network, and the message for the handover command includes an identifier of an evolved radio access bearer (E-RAB) and the information associated with the tunnel for data forwarding.

In an example, the data is forwarded as a packet data convergence protocol (PDCP) service data unit (SDU) without a service data adaptation protocol (SDAP) header.

In an example, the information associated with the tunnel includes a transport layer address of the tunnel and an identifier of the tunnel.

According to another aspect of the embodiments of the present disclosure, a device for supporting handover is provided, comprising: a transceiver, which is configured to send and receive signals; a processor; and a memory, comprising instructions that, when executed by the processor, cause the processor to perform any of the foregoing methods.

These and other aspects of the embodiments of the present disclosures will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

The present disclosure is illustrated in the accompanying drawings, throughout which like reference letters indicate corresponding parts in the various figures. The embodiments herein will be better understood from the following description with reference to the drawings, in which.

The same reference numerals are used to represent the same elements throughout the drawings.

DETAILED DESCRIPTION

Figure 1:
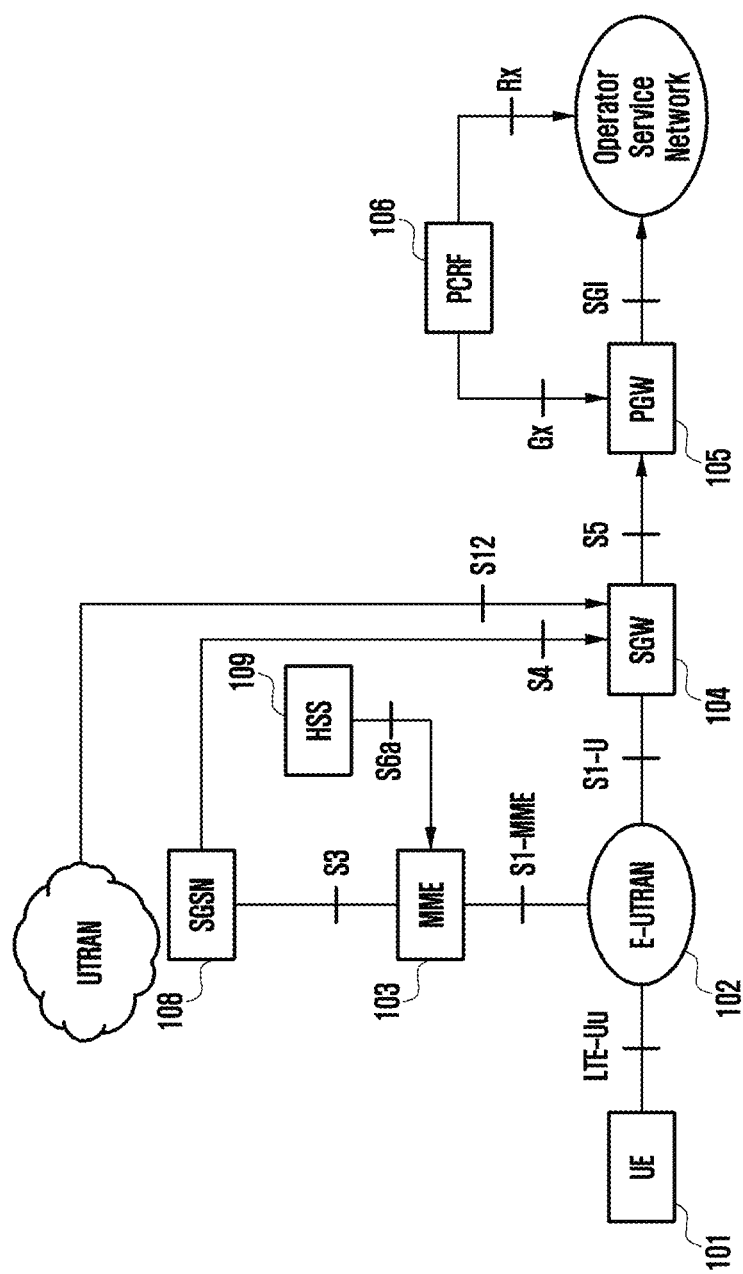
FIG. 1 is an exemplary system architecture of system architecture evolution (SAE)

FIGS. 1 through 30 discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. Also, the various embodiments described herein are not necessarily mutually exclusive, as some embodiments can be combined with one or more other embodiments to form new embodiments. The term "or" as used herein, refers to a non-exclusive or, unless otherwise indicated. The examples used herein are intended merely to facilitate an understanding of ways in which the embodiments herein can be practiced and to further enable those skilled in the art to practice the embodiments herein. Accordingly, the examples should not be construed as limiting the scope of the embodiments herein.

As is traditional in the field, embodiments may be described and illustrated in terms of blocks which carry out a described function or functions. These blocks, which may be referred to herein as managers, units, modules, hardware components or the like, are physically implemented by analog and/or digital circuits such as logic gates, integrated circuits, microprocessors, microcontrollers, memory circuits, passive electronic components, active electronic components, optical components, hardwired circuits and the like, and may optionally be driven by firmware. The circuits may, for example, be embodied in one or more semiconductor chips, or on substrate supports such as printed circuit boards and the like. The circuits constituting a block may be implemented by dedicated hardware, or by a processor (e.g., one or more programmed microprocessors and associated circuitry), or by a combination of dedicated hardware to perform some functions of the block and a processor to perform other functions of the block. Each block of the embodiments may be physically separated into two or more interacting and discrete blocks without departing from the scope of the disclosure. Likewise, the blocks of the embodiments may be physically combined into more complex blocks without departing from the scope of the disclosure.

FIGS. 1 to 8 discussed below and various embodiments used to describe the principle of the present disclosure in this patent document are only for illustration, and should not be construed as limiting the scope of the present disclosure in any way. Those skilled in the art will understand that the principles of the present disclosure may be implemented in any suitably arranged system or device.

FIG. 1 is an exemplary system architecture 100 of system architecture evolution (SAE). A user equipment (UE) 101 is a terminal device for receiving data. An evolved universal terrestrial radio access network (E-UTRAN) 102 is a radio access network, in which includes a macro base station (eNodeB/NodeB) that provides an interface for UE to access a radio network. A mobility management entity (MME) 103 is used for managing the UE's mobility context, session context, and security information. A serving gateway (SGW) 104 mainly provides functions of user plane, and the MME 103 and the SGW 104 may be in the same physical entity. A packet data network gateway (PGW) 105 is used for functions such as charging and lawful interception, and may also be in the same physical entity as the SGW 104. A policy and charging rules function entity (PCRF) 106 provides quality of service (QoS) policies and charging criteria. A general packet radio service support node (SGSN) 108 is a network node device that provides routing for data transmission in the universal mobile telecommunication system (UMTS). A home subscriber server (HSS) 109 is the home sub-system of the UE, and is used for protecting user information including the current location of the user equipment, the address of the serving node, user security information, the packet data context of the user equipment, and so on.

Figure 2:
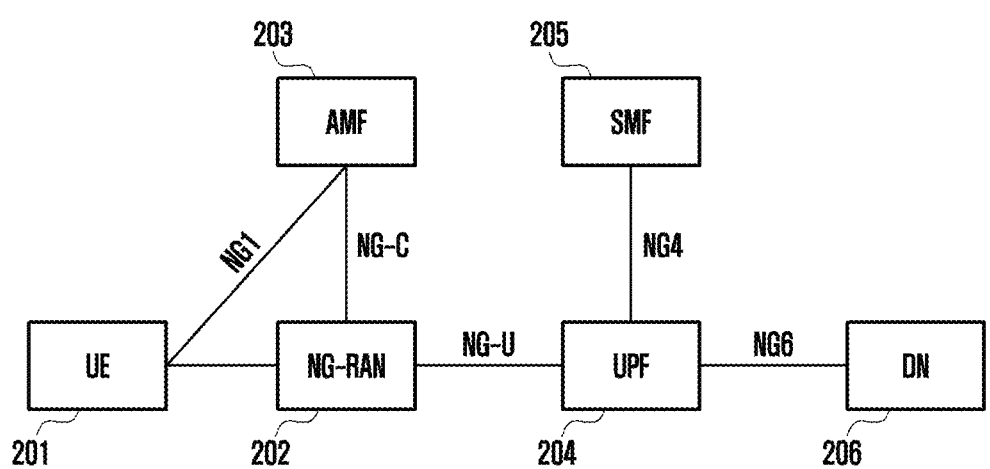
FIG. 2 is an exemplary system architecture according to various embodiments of the present disclosure.

FIG. 2 is an exemplary system architecture 200 according to various embodiments of the present disclosure. Other embodiments of the system architecture 200 may be used without departing from the scope of this disclosure.

A user equipment (UE) 201 is a terminal device for receiving data. Next Generation Radio Access Network (NG-RAN) 202 is a radio access network, in which includes base station (gNB or eNB connected to 5G core network (5GC), eNB connected to 5GC is also called ng-gNB) that provide interfaces for UE to access the wireless network. An access and mobility management function entity (AMF) 203 is used for managing the UE's mobility context and security information. A user plane function entity (UPF) 204 mainly provides functions of the user plane. A session management function entity (SMF) 205 is used for session management. A data network (DN) 206 includes such as operators' services, Internet access, and third-party services. The base station may be divided into a central unit of the base station and a distribution unit of the base station. The central unit of the base station may be divided into a central unit control plane entity of the base station and a central unit user plane entity of the base station. Alternatively, base stations may be divided into a control plane entity of the base station and a user plane entity of the base station.

The exemplary embodiments of the present disclosure are further described below in conjunction with the accompanying drawings.

The specification and drawings are provided as examples only to help understand the present disclosure. They should not be construed as limiting the scope of the present disclosure in any way. Although certain embodiments and examples have been provided with reference to the present disclosure, it is obvious to those skilled in the art that various changes in the illustrated embodiments and examples may be made without departing from the scope of the present disclosure.

A central unit control plane entity of a base station in the embodiments of the present disclosure may also be referred to as a control plane entity of the base station, which refers to a logical entity that includes radio resource control (RRC) and packet data convergence protocol (PDCP) control plane parts in the base station.

A central unit user plane entity of the base station in the embodiments of the present disclosure may also be referred to as a user plane entity of the base station, which refers to a logical entity that includes the user plane function part of the packet data convergence protocol (PDCP) in the base station. The logical entity may also include the functions of service data adaptation protocol (SDAP).

During the handover process, the source base station may send the configuration information of the UE at the source base station to the target base station, and the target base station determines whether to use a full configuration or a delta configuration. The source base station does not know whether the target base station determines the full configuration or the delta configuration. For a data radio bearer (DRB) for which the target base station has received downlink data forwarding, the source base station forwards the data packets sent to the UE but not confirmed by the UE and fresh data packets to the target base station. In the case where the target base station has an architecture where the control plane and the user plane are separated, the central unit control plane entity of the target base station determines whether to use the full configuration or the delta configuration, but the central unit user plane entity of the target base station does not know whether it is the full configuration or the delta configuration for handover. The central unit user plane entity of the target base station may send all the forwarded data packets received from the source base station to the UE. For the full configuration, a PDCP sequence number (SN) status is not saved, it is useless that the central unit user plane entity of the target base station sends to UE the data packets forwarded by the source base station to the UE but not confirmed by the UE, or the SN included in the packet forwarded by the source base station is useless, which wastes air interface resources, and affects data re-ordering at the UE. The present disclosure provides two ways to solve this problem. Including:

Method 1: The central unit control plane entity of the target base station sends an indication information to the central unit user plane entity of the target base station, so that the central unit user plane entity of the target base station sends appropriate data to the UE according to the indication information. The details are as described in the methods in FIGS. 3 to 8.

Method 2: The target base station receives a handover request message, and the target base station sends information on whether to use the full configuration or the delta configuration or whether the PDCP SN status is reserved to the source base station, and the source base station forwards the data to the target base station according to the received information. In the case that the source base station has an architecture where the user plane and the control plane are separated, the central unit control plane entity of the source base station sends indication information to the central unit user plane entity of the source base station, and the central unit user plane entity of the source base station forwards the data to the target base station according to the received information. The details are as described in the methods in FIGS. 9-14.

Figure 24:
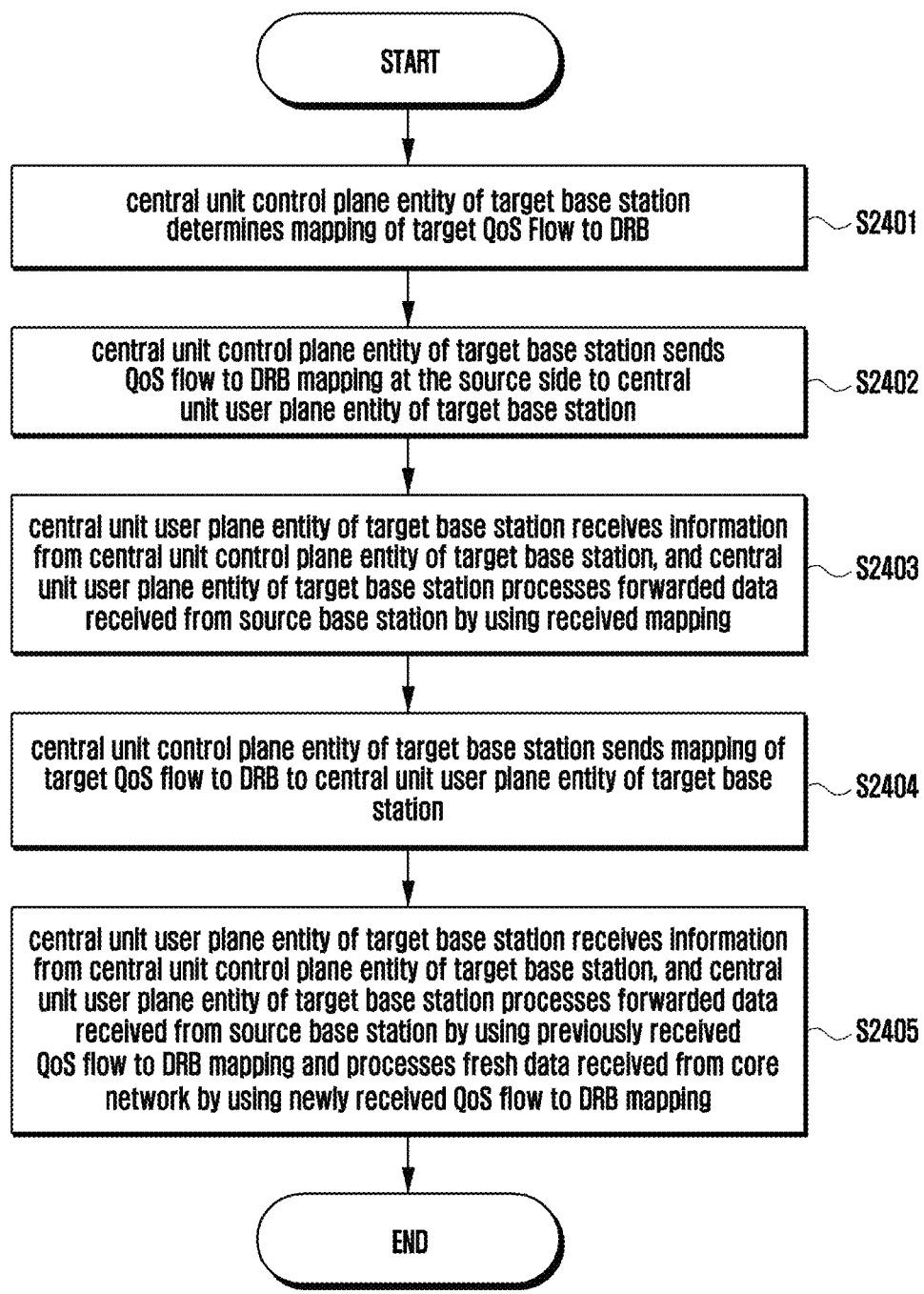
FIG. 24 shows an exemplary flowchart of a method for supporting handover according to an embodiment of the present disclosure.
Figure 25:
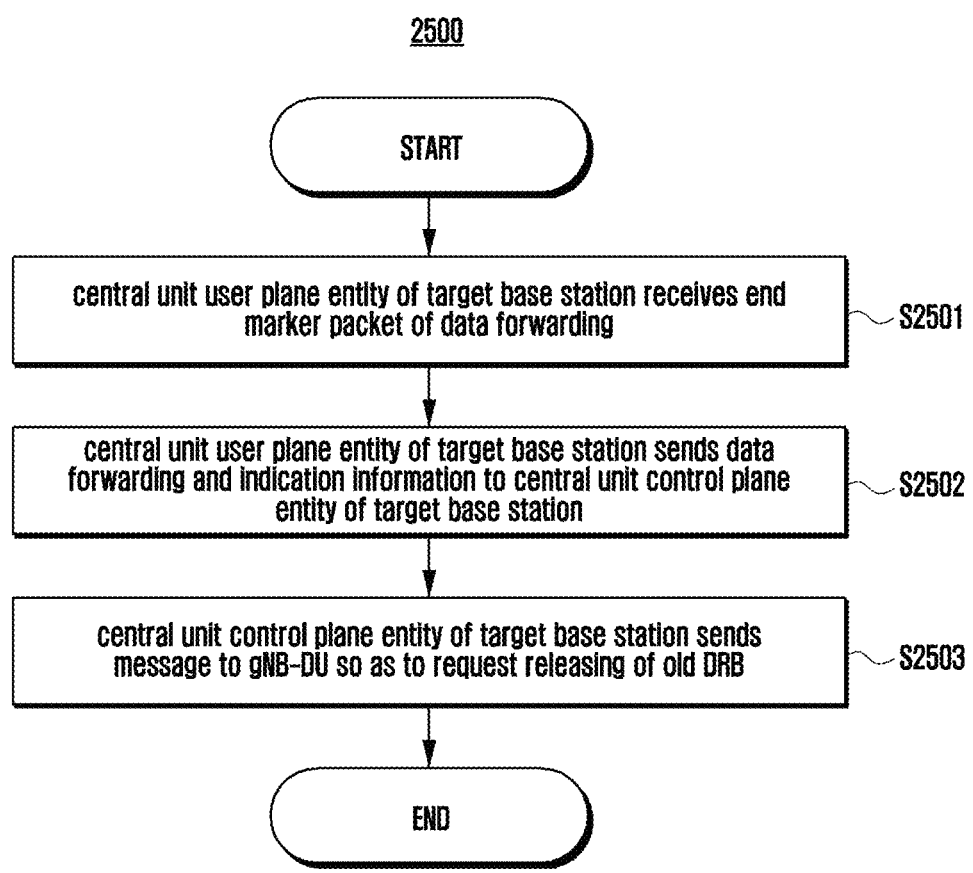
FIG. 25 shows an exemplary flowchart of a method for supporting handover according to an embodiment of the present disclosure.

During the handover process, the source base station may send the configuration information of the UE at the source base station to the target base station, and the configuration information includes the DRB configuration information at the source base station. The configuration information may also include a mapping from quality of service (Qos) flow to DRB. The target base station determines whether to use the same DRB configuration and/or the same QoS flow to DRB mapping as the source base station. If the target base station determines to use a different DRB configuration and/or different QoS flow to DRB mapping from the source base station, in order to ensure data lostless during the handover process, the target base station may also temporarily configure the old DRB and/or and the same QoS flow to DRB mapping of the source base station, which is used to process the data forwarded by the source base station. For the fresh data received from the core network, the target base station uses the new DRB and/or the QoS flow to DRB mapping determined by the target. In the case where the target base station has an architecture where the control plane and the user plane are separated, the central unit control plane entity of the target base station determines the configuration of the DRB and the QoS flow to DRB mapping. The message sent by the central unit control plane entity of the target base station to the central unit user plane entity of the target base station includes the DRB to be established or modified and the Qos flow(s) mapped on the DRB. In the current mechanism, the central unit user plane entity of the target base station only receives a set of information of the QoS flow to DRB mapping, and the central unit user plane entity of the target base station does not know whether the mapping information is a new mapping determined by the target or a mapping from the source. The central unit user plane entity of the target base station will receive the data forwarded from the source base station and the fresh data received from the core network. In the above scenario, processing the forwarded data from the source base station and the fresh data received from the core network using the received information of the Qos Flow(s) mapped on the DRB by the central unit user plane entity of the target base station will cause data loss problems, or processing the fresh data received from the core network without using the QoS flow to DRB mapping on target. FIGS. 15, 18, 21 and 24 of the present disclosure show four methods to solve this problem. FIG. 25 shows the method of releasing the old DRB configured on the base station distribution unit (gNB-DU) among these methods.

For a case where UE handovers from a 5G system (5GS) to an evolved packet system (EPS), the source NG-RAN node determines the mapping of Qos Flow to DRB when the PDU session is established, and the central unit control plane entity of the source base station sends the DRB to be established and the Qos flow information mapped on the DRB to the central unit user plane entity of the source base station, and the central unit user plane entity of the source base station processes the data received from the core network according to the mapping. For direct data forwarding from the source NG-RAN to the target base station, a tunnel for each Evolved Universal Terrestrial Radio Access Network (E-UTRAN) Radio Access Bearer (E-RAB) is established between the source NG-RAN node and the target base station for data forwarding. The target base station assigns a tunnel for each E-RAB and sends it to the source NG-RAN node. The E-RAB mapped by the Qos flow is determined by the core network. If a number of E-RABs to which the Qos flow maps is more than the number of DRBs determined by NG-RAN, the central unit control plane entity of the source base station may not send tunnel information corresponding to each E-RAB to the center unit user plane entity of the source base station through the existing bearer context modification request message.

In addition, for the inter-system handover from 5GS to EPS, the data packet header forwarded by the source base station does not include the SDAP header, while for the intra-system handover of 5GS, the data forwarded on the DRB tunnel may include the SDAP header. Data forwarding is performed by the central unit user plane entity of the source base station to forward data to the target base station. In the prior art, the central unit user plane entity of the source base station does not know when the SDAP header is included in the forwarded data packet and when the SDAP header is not included in the forwarded data packet. FIGS. 24 to 25 show two ways to solve the above problems.

Figure 3:
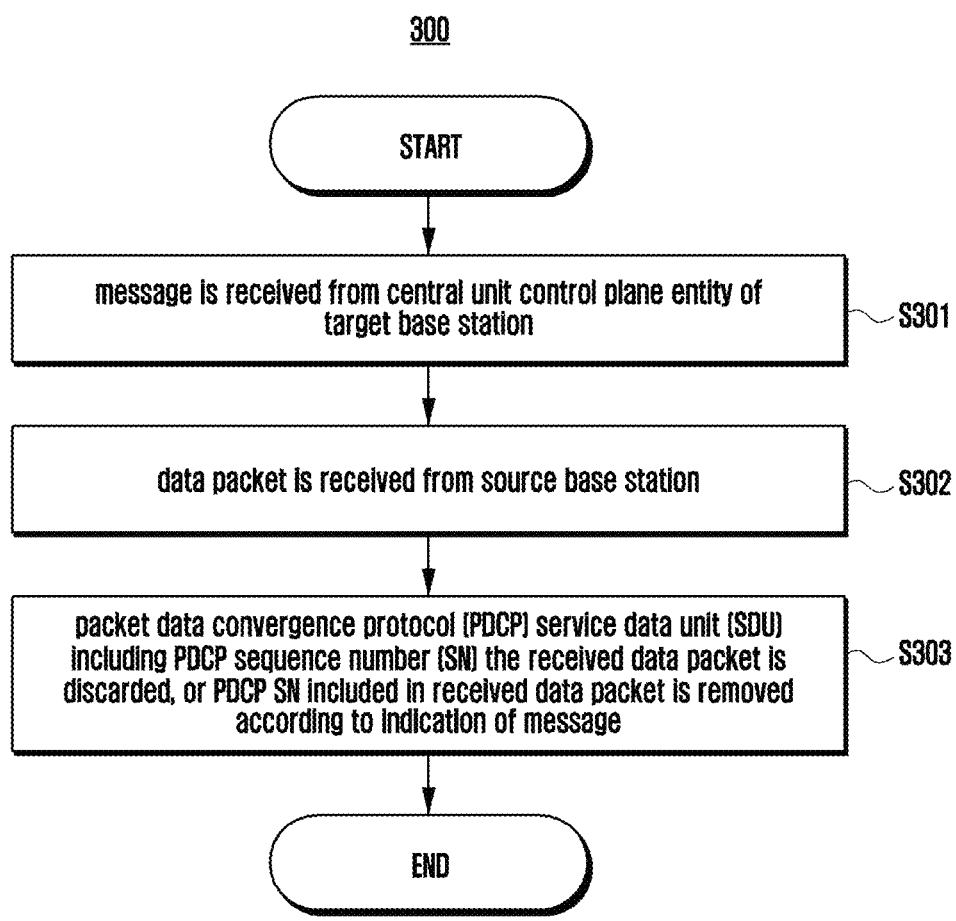
FIG. 3 is an exemplary flowchart showing a method for supporting handover according to an embodiment of the present disclosure.

FIG. 3 is an exemplary flowchart illustrating a method 300 for supporting handover according to an embodiment of the present disclosure. The method 300 may be used for an intra-system handover or an inter-system handover, and may be performed on the central unit user plane entity of the target base station.

As shown in FIG. 3, in the method 300, in step S301, a message is received from the central unit control plane entity of the target base station.

In step S302, a data packet is received from the source base station.

In step S303, a packet data convergence protocol (PDCP) service data units (SDU) including PDCP sequence numbers (SNs) in the received data packets are discarded according to the indication of the message.

Alternatively, in step S303, the PDCP SN included in the received data packet is discarded according to the indication of the message. Discarding the PDCP SN included in the received data packet means that the central unit user plane entity of the target base station does not send the PDCP SN received from the source base station to the UE. The data packet may be sent to the UE after processing by the target side after the central unit user plane entity of the target base station removes the PDCP SN in the PDCP SDU.

According to the embodiment of the present disclosure, the message may indicate the discarding of the PDCP SDU including the PDCP SN in the received data packet and the discarding of the PDCP SN included in the received data packet through an explicit indication way or an implicit indication way. The explicit indication may comprise including an indication information in the message, and the implicit indication may comprise no PDCP SN status information included in the message.

Specifically, in an example of the explicit indication way, in step S301, the message received from the central unit control plane entity of the target base station includes the indication information. The indication information may indicate at least one of the following: whether to use a full configuration or a delta configuration; whether the PDCP SN is reserved; whether the PDCP is restarted; discarding the data packet of the PDCP SDU including the PDCP SN; or discarding the PDCP SN included in the received data packet. Restarting PDCP means that the PDCP is deleted and then readded.

The central unit control plane entity of the target base station may send the indication information to the central unit user plane entity of the target base station through a bearer context modification request message. The bearer context modification request message is used for bearer setup or bearer modification.

The central unit user plane entity of the target base station saves the received information.

In an example, in step S302, the central unit user plane entity of the target base station receives the data packet from the source base station or forwarded by the source base station through the core network. If the source base station also supports an architecture where the user plane and the control plane are separated, the data is received from the central unit user plane entity of the source base station.

In an example, in step S303, the central unit user plane entity of the target base station discards the PDCP SDU including the PDCP SN or discards the PDCP SN included in the received data packet when the indication information indicates at least one of the following: full configuration; the PDCP SN is not reserved; the PDCP restarts; and discard the PDCP SDU including the PDCP SN or discard the PDCP SN included in the received data packet.

That is, the central unit user plane entity of the target base station discards the PDCP SDU including the PDCP SN that the source base station attempted to send to the user equipment (UE). The central unit user plane entity of the target base station identifies these data packets and discards them based on the presence of SN in the forwarded general packet radio service (GPRS) Tunneling Protocol (GTP) user plane (GTP-U) data packet. Alternatively, the central unit user plane entity of the target base station discards the PDCP SN in the PDCP SDU received from the source base station.

On the other hand, in an example of the implicit indication way, in step S303, the central unit user plane entity of the target base station discards the PDCP SDU including the PDCP SN or discards the PDCP SN included in the received data packet when the indication information indicates at least one of the following: no PDCP SN status information is received; no PDCP SN status information of the data radio bearer (DRB) is received; no bearer context modification request message is received; and no PDCP SN status information of the DRB is included in the received bearer context modification request message.

Specifically, if the central unit user plane entity of the target base station does not receive the PDCP SN status information in step S301, the central unit user plane entity of the target base station discards the received PDCP SDUs including the PDCP SN, which are forwarded from the source base station, which would not be sent to the UE. Alternatively, if the central unit user plane entity of the target base station does not receive the PDCP SN status information of the data radio bearer (DRB) in step S301, the central unit user plane entity of the target base station discards the received PDCP SDUs including the PDCP SN, which are forwarded from the source base station, which would not be sent to the UE.

In other words, the central unit user plane entity of the target base station discards the PDCP SDU including the PDCP SN that the source base station attempts to send to the UE, and the central unit user plane entity of the target base station identifies these data packets according to the presence of SN in the forwarded GTP-U data packets, and discards them.

Alternatively, if the central unit user plane entity of the target base station does not receive the bearer context modification request message, the central unit user plane entity of the target base station discards the received PDCP SDUs including the PDCP SN, which are forwarded from the source base station. Alternatively, if the bearer context modification request message received by the central unit user plane entity of the target base station does not include the PDCP SN status information of a certain DRB, the central unit user plane entity of the target base station discards the received PDCP SDUs including the PDCP SN, which are forwarded from the source base station.

Specifically, in the example of discarding the PDCP SN included in the received data packet, if the central unit user plane entity of the target base station does not receive the PDCP SN status information in step S301, the central unit user plane entity of the target base station discards the PDCP SN included in the received data packet, and the PDCP SN received from the source base station would not be sent to the UE. Alternatively, if the central unit user plane entity of the target base station does not receive the PDCP SN status information of the data radio bearer (DRB) in step S301, the central unit user plane entity of the target base station discards the PDCP SN included in the received data packet, and the PDCP SN received from the source base station would not be sent to the UE.

Alternatively, if the central unit user plane entity of the target base station does not receive the bearer context modification request message, the central unit user plane entity of the target base station discards the PDCP SN included in the received data packet, and the PDCP SN received from the source base station is not sent to the UE. Alternatively, if the bearer context modification request message received by the central unit user plane entity of the target base station does not include the PDCP SN status information of a certain DRB, the central unit user plane entity of the target base station discards the PDCP SN included in the received data packet, and the PDCP SN received from the source base station would not be sent to the UE.

The central unit user plane entity of the target base station adds the PDCP SN to the PDCP SDU whose PDCP SN is removed, and sends it to the UE after processing by the PDCP layer and other layers.

Thereafter, the central unit user plane entity of the target base station adds the PDCP SN to the received PDCP SDU without the PDCP SN, and sends it to the UE after processing by the PDCP layer and other layers.

The PDCP SDU without the PDCP SN may be fresh data.

According to the embodiment of the present disclosure, the central unit user plane entity of the target base station may discard the data not needed to be sent to the UE or the PDCP SN not needed to be sent to the UE, and only sends the required data to the UE, thereby improving the efficiency of data forwarding and avoiding wasting air interface resources.

Figure 4:
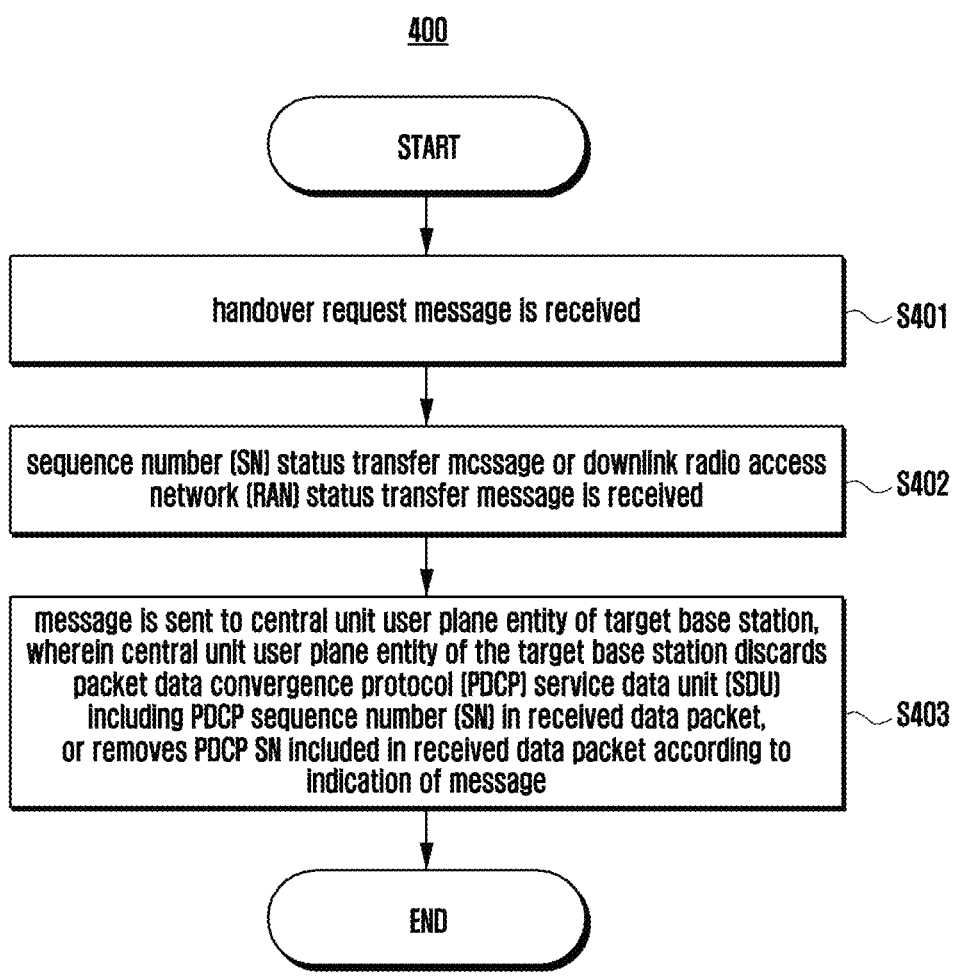
FIG. 4 is an exemplary flowchart showing a method for supporting handover according to an embodiment of the present disclosure.

FIG. 4 is an exemplary flowchart illustrating a method 400 for supporting handover according to an embodiment of the present disclosure. The method 400 may be used for the intra-system handover or the inter-system handover, and may be performed on the central unit control plane entity of the target base station.

As shown in FIG. 4, in the method 400, in step S401, a handover request message is received.

In step S402, a sequence number (SN) status transfer message or a downlink radio access network (RAN) status transfer message is received.

In step S403, a message is sent to the central unit user plane entity of the target base station, wherein the central unit user plane entity of the target base station discards a packet data convergence protocol (PDCP) service data unit (SDU) including a PDCP sequence number (SN) in the received data packet according to the indication of the message.

Alternatively, in step S403, a message is sent to the central unit user plane entity of the target base station, where the central unit user plane entity of the target base station discards the PDCP SN included in the received data packet according to the indication of the message.

In an example, in step S401, the central unit control plane entity of the target base station may receive a handover request message. The handover request message may be received from the source base station or the central unit control plane entity of the source base station or from the core network. The handover request message received from the source base station or the central unit control plane entity of the source base station is a Xn application protocol (AP) message or other inter-base station messages. In addition, the handover request message received from the core network is a next generation application protocol (NGAP) message or a message between another base stations and the core network.

The handover request message received from the core network includes a handover type, and the handover type may include an intra-system handover or an inter-system handover.

In addition, the handover request message received from the source base station or the central unit control plane entity of the source base station indicates that the handover type is the intra-system handover by default.

The central unit control plane entity of the target base station may determine whether to use the full configuration or the delta configuration.

In an example, in step S402, the central unit control plane entity of the target base station receives the SN status transfer message or the downlink RAN status transfer message. The SN status transfer message may be received from the source base station or the central unit control plane entity of the source base station. The SN status transfer message received from the source base station or the central unit control plane entity of the source base station may be a Xn application protocol (AP) message or other inter-base station messages. The downlink RAN status transfer message may be received from the core network.

As mentioned above, in step S403, the message may indicate the discarding of the PDCP SDU including the PDCP SN in the received data packet and the discarding of the PDCP SN included in the received data packet through the explicit indication way or the implicit indication way. The explicit indication may comprise including the indication information in the messages, and the implicit indication may comprise no PDCP SN status information included in the message.

The central unit control plane entity of the target base station may send the indication information to the central unit user plane entity of the target base station through the bearer context modification request message. The bearer context modification request message is used for bearer setup or bearer modification.

For the implicit indication, the central unit control plane entity of the target base station may determine whether the bearer context modification request message sent to the central unit user plane entity of the target base station includes the PDCP SN status information for each DRB to be modified or established. When the central unit control plane entity of the target base station determines to use full configuration for a certain DRB, the bearer context modification request message sent to the central unit user plane entity of the target base station does not include the PDCP SN status information for the DRB.

The explicit indication way or the implicit indication way is similar to the method 300 described above with reference to FIG. 3, and the repetition is omitted.

The central unit control plane entity of the target base station sends the indication information to the central unit user plane entity of the target base station when the handover is the inter-system handover. The central unit control plane entity of the target base station knows whether it is the inter-system handover according to the handover type included in the received handover request message.

It should be noted that the handover preparation message for inter-system handover is sent through the core network, therefore, for the inter-system handover, the handover request message may only be received from the core network.

In another example, the central unit control plane entity of the target base station sends the indication information to the central unit user plane entity of the target base station when determining to use the full configuration.

For intra-system handover, the central unit control plane entity of the target base station determines whether to use the full configuration or the delta configuration. The full configuration is used for inter-system handover.

According to the embodiment of the present disclosure, the central unit control plane entity of the target base station may enable the central unit user plane entity of the target base station know how to process the received data forwarded from the source base station, so that the data not needed to be sent to the UE or PDCP SN not needed to be sent to the UE may be discarded, only required data would be sent to the UE, thereby improving the efficiency of data forwarding, and avoiding wasting air interface resources.

Figure 5:
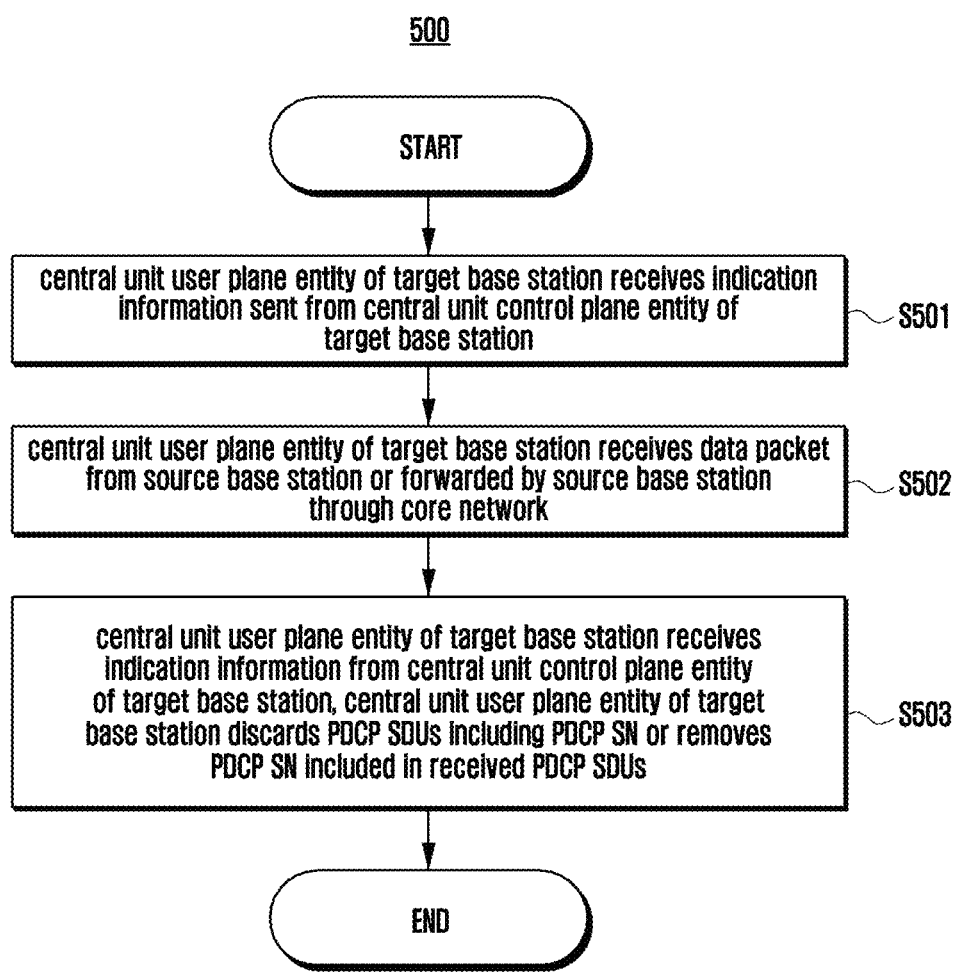
FIG. 5 is an exemplary flowchart showing a method for supporting handover according to an embodiment of the present disclosure.

FIG. 5 is an exemplary flowchart illustrating a method 500 for supporting handover according to an embodiment of the present disclosure. The method 500 may be used for the intra-system handover or the inter-system handover. The method includes the following steps.

In step S501, the central unit user plane entity of the target base station receives an indication information sent by the central unit control plane entity of the target base station. The indication information may be information on whether to use the full configuration or the delta configuration, or information on whether the PDCP SN is reserved, or information on whether PDCP is restarted, or information indicating to discard PDCP SDU information including the PDCP SN or indicating to discard PDCP SN. The indication information may be sent by the central unit control plane entity of the target base station to the central unit user plane entity of the target base station through a bearer context modification request message. Restarting PDCP refers to deleting the PDCP and then readding.

The central unit user plane entity of the target base station saves the received information.

In the step S502, the central unit user plane entity of the target base station receives the data packet from the source base station or forwarded by the source base station through the core network. If the source base station also supports an architecture where the user plane and the control plane are separated, the data is received from the central unit user plane entity of the source base station.

In step S503, the central unit user plane entity of the target base station receives the indication information from the central unit control plane entity of the target base station. If the indication information indicates that the full configuration or PDCP SN is not reserved or the PDCP restarts or indicates to discard PDCP SDU information including the PDCP SN or indicates to discard PDCP SN information, the central unit user plane entity of the target base station discards the PDCP SDU including the PDCP SN or discards the PDCP SN included in the received data packet. That is, the central unit user plane entity of the target base station discards the PDCP SDUs that the source base station attempts to send to the UE, and the central unit user plane entity of the target base station identifies these data packets and discards them based on the presence of SN in the forwarded general packet radio service (GPRS) Tunneling Protocol (GTP) user plane (GTP-U) data packet. Alternatively, the central unit user plane entity of the target base station discards the PDCP SN included in the received data packet, and the PDCP SN received from the source base station would not be sent to the UE. The central unit user plane entity of the target base station will remove the PDCP SN of the PDCP SDU and send it to UE after processing by the PDCP layer and other layers.

The central unit user plane entity of the target base station adds the PDCP SN to the PDCP SDU without the PDCP SN, and sends it to the UE after processing by the PDCP layer and other layers. The PDCP SDU without PDCP SN may be fresh data.

So far, the method 500 for supporting handover of the present disclosure has been described. With this method, the central unit user plane entity of the target base station may discard data not needed to be sent to the UE, thereby improving the efficiency of data forwarding and avoiding wasting air interface resources.

Figure 6:
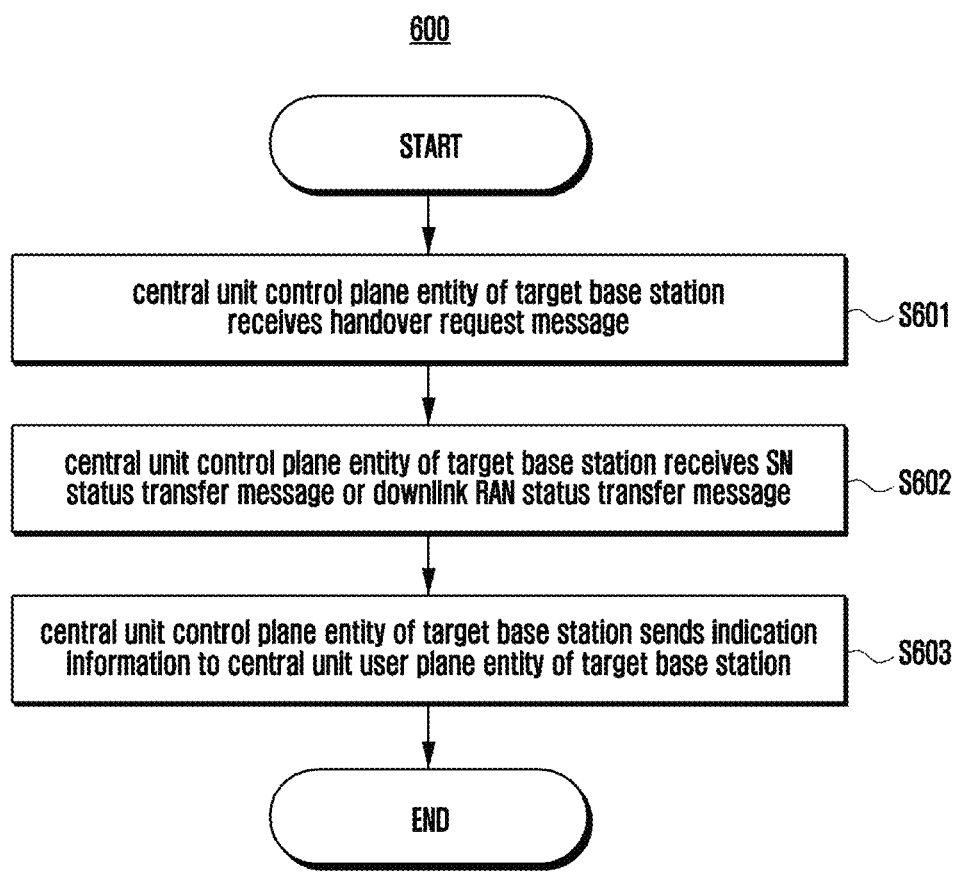
FIG. 6 is an exemplary flowchart showing a method for supporting handover according to an embodiment of the present disclosure.

FIG. 6 is an exemplary flowchart illustrating a method 600 for supporting handover according to an embodiment of the present disclosure. The method 600 may be used for an intra-system handover or an inter-system handover. The method includes the following steps.

In step S601, the central unit control plane entity of the target base station receives the handover request message. The handover request message is received from the source base station or the central unit control plane entity of the source base station, or from the core network. The handover request message received from the source base station or the central unit control plane entity of the source base station is a Xn application protocol (AP) message or other inter-base station messages. The handover request message received from the core network is a NGAP message or a message between another base stations and the core network.

For the handover request message received from the core network, the handover request message includes the handover type.

The central unit control plane entity of the target base station determines whether to use a full configuration or a delta configuration.

In step S602, the central unit control plane entity of the target base station receives a SN status transfer message or a downlink RAN status transfer message. The SN status transfer message is received from the source base station or the central unit control plane entity of the source base station. The message received from the source base station or the central unit control plane entity of the source base station is a Xn application protocol (AP) message or other inter-base station messages. The downlink RAN status transfer message is received from the core network. The handover request message received from the core network is a NGAP message or a message between another base stations and the core network.

In step S603, the central unit control plane entity of the target base station sends an indication information to the central unit user plane entity of the target base station. The indication information is as same as that in step S501, and will be omitted here.

The central unit control plane entity of the target base station sends the indication information to the central unit user plane entity of the target base station through a bearer context modification request message.

The central unit control plane entity of the target base station sends the indication information to the central unit user plane entity of the target base station when the handover is the inter-system handover. The central unit control plane entity of the target base station knows whether it is the inter-system handover according to the handover type included in the received handover request message. It should be noted that a handover preparation message for the inter-system handover is sent through the core network, and thus the handover request message may only be received from the core network for the inter-system handover. Alternatively, the central unit control plane entity of the target base station sends the indication information to the central unit user plane entity of the target base station as determining to use the full configuration. For the intra-system handover, the central unit control plane entity of the target base station determines whether to use the full configuration or the delta configuration. The inter-system handover uses the full configuration.

So far, the method 600 for supporting handover of the present disclosure has been described. With this method, the central unit control plane entity of the target base station may enable the central unit user plane entity of the target base station to know how to process the received data which is forwarded from the source base station, so that data not needed to be sent to the UE or PDCP SN not needed to be sent to the UE can be discarded, thereby improving the efficiency of data forwarding, and avoiding wasting air interface resources.

Figure 7:
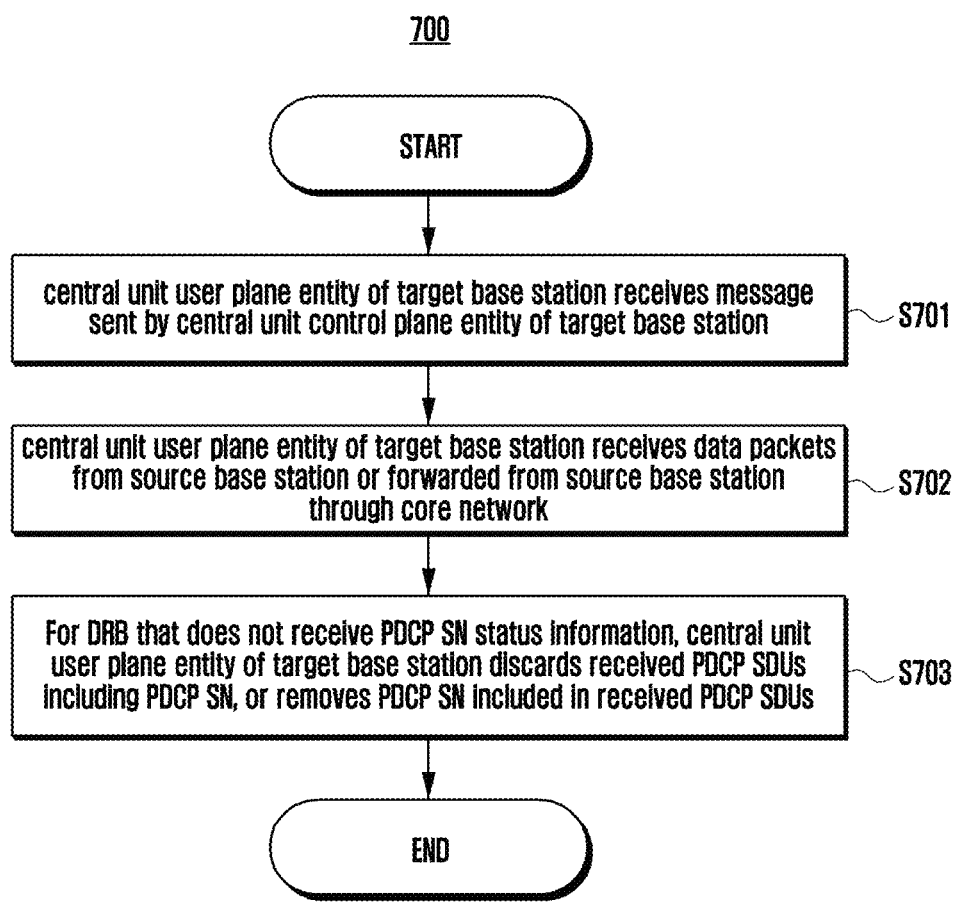
FIG. 7 is an exemplary flowchart showing a method for supporting handover according to an embodiment of the present disclosure.

FIG. 7 is an exemplary flowchart illustrating a method 700 for supporting handover according to an embodiment of the present disclosure. The method 700 may be used for an intra-system handover or an inter-system handover. The method includes the following steps.

In step S701, the central unit user plane entity of the target base station receives a message sent by the central unit control plane entity of the target base station. The message is used for a bearer setup or a bearer modification. The message may be a bearer modification request message.

The central unit user plane entity of the target base station may store the received information.

In step S702, the central unit user plane entity of the target base station receives data packets from the source base station or forwarded from the source base station through the core network. If the source base station also supports an architecture where the user plane and the control plane are separated, the data is received from the central unit user plane entity of the source base station.

In step S703, if the central unit user plane entity of the target base station does not receive the PDCP SN status information in step S701, the central unit user plane entity of the target base station discards the received PDCP SDUs including the PDCP SN, which are forwarded from the source base station, and the data packet would not be sent to UE. Alternatively, for the data radio bearer (DRB) that does not receive the PDCP SN status information in step S701, the central unit user plane entity of the target base station discards the received PDCP SDUs including the PDCP SN, which are forwarded from the source base station, and the data packet would not be sent to the UE. That is, the central unit user plane entity of the target base station discards the PDCP SDUs that the source base station attempted to send to the UE, and the central unit user plane entity of the target base station identifies these data packets according to the presence of the PDCP SN in the forwarded GTP-U data packets and discards them. Alternatively, if the central unit user plane entity of the target base station does not receive the PDCP SN status information, the central unit user plane entity of the target base station discards the received PDCP SDUs including the PDCP SN, which are forwarded from the source base station. Alternatively, the central unit user plane entity of the target base station does not receive the bearer context modification request message, and the central unit user plane entity of the target base station discards the received PDCP SDUs including the PDCP SN, which are forwarded from the source base station. Alternatively, the bearer context modification request message received by the central unit user plane entity of the target base station does not comprise the PDCP SN status information of a certain DRB, and the central unit user plane entity of the target base station discards the received PDCP SDUs including the PDCP SN of the DRB, which are forwarded from the source base station.

If the central unit user plane entity of the target base station does not receive the PDCP SN status information in step S701, the central unit user plane entity of the target base station removes the PDCP SN included in the received data packet, and the PDCP SN received from the source base station would not be sent to the UE. Alternatively, for the data radio bearer (DRB) that does not receive the PDCP SN status information in step S701, the central unit user plane entity of the target base station removes the PDCP SN included in the received data packet, and the PDCP SN received from the source base station would not be sent to the UE. Alternatively, the central unit user plane entity of the target base station does not receive the bearer context modification request message, the central unit user plane entity of the target base station removes the PDCP SN included in the received data packet, and the PDCP SN received from the source base station would not be sent to UE. Alternatively, the bearer context modification request message received by the central unit user plane entity of the target base station does not comprise the PDCP SN status information of a certain DRB, the central unit user plane entity of the target base station removes the PDCP SN included in the received data packet, and the PDCP SN received by the source base station would not be sent to the UE.

The central unit user plane entity of the target base station adds the PDCP SN to the PDCP SDUs having no PDCP SN, and sends them to the UE after processing by the PDCP layer and other layers. The PDCP SDU having no PDCP SN may be fresh data.

So far, the method 700 for supporting handover of the present disclosure has been described. With this method, the central unit user plane entity of the target base station may discard the data not needed to be sent to the UE or the PDCP SN not needed to be sent to the UE, thereby improving the efficiency of data sending and avoiding wasting air interface resources.

Figure 8:
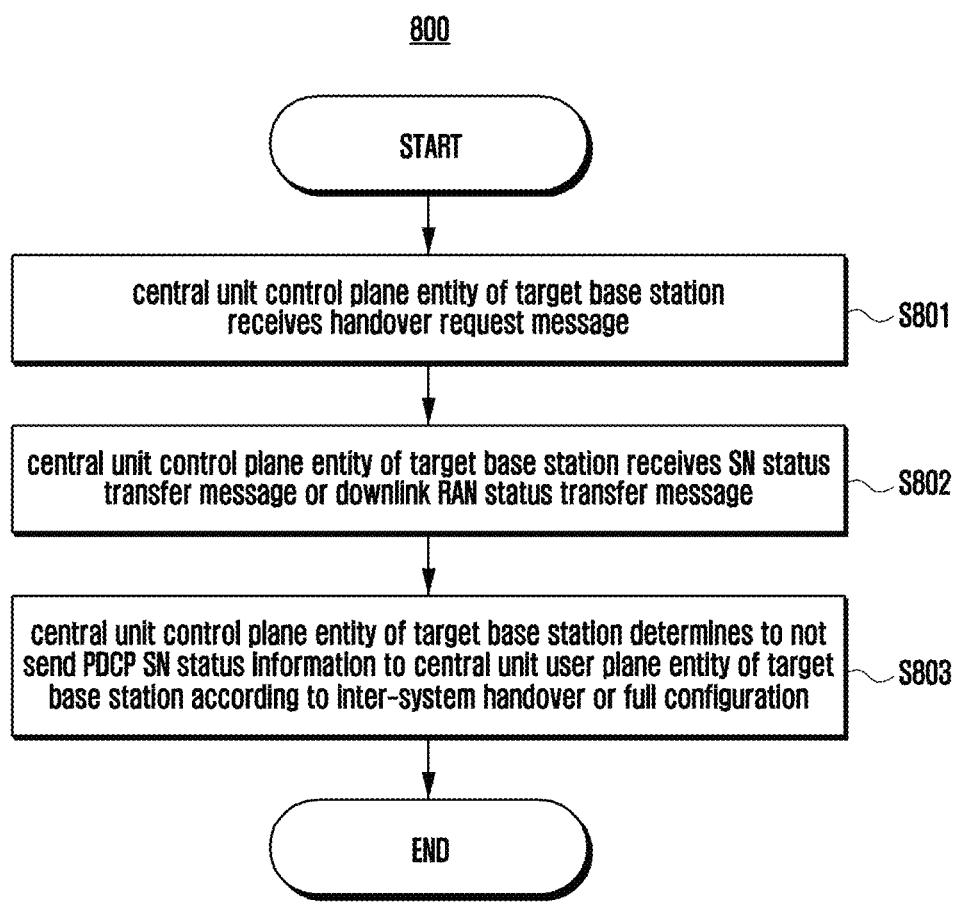
FIG. 8 is an exemplary flowchart showing a method for supporting handover according to an embodiment of the present disclosure.

FIG. 8 is an exemplary flowchart illustrating a method 800 for supporting handover according to an embodiment of the present disclosure. The method 800 may be used for an intra-system handover or an inter-system handover. The method includes the following steps.

Steps S801 to S802 are the same as steps S601 to S602, and detailed technical descriptions are omitted here.

In step S803, the central unit control plane entity of the target base station determines whether to send a bearer context modification request message to the central unit user plane entity of the target base station, or the central unit control plane entity of the target base station determines whether the bearer context modification request message sent to the central unit user plane entity of the target base station comprises the PDCP SN status information for DRBs to be modified or established.

In a case that the handover is the inter-system handover, the central unit control plane entity of the target base station may not send the bearer context modification request message to the central unit user plane entity of the target base station, or the PDCP SN status information is not contained in the bearer context modification request message sent to the central unit user plane entity of the target base station. The central unit control plane entity of the target base station knows whether it is the inter-system handover according to a handover type included in the received handover request message. It should be noted that a handover preparation message for the inter-system handover is sent through the core network, and thus for the inter-system handover, the handover request message may only be received from the core network.

Alternatively, the central unit control plane entity of the target base station does not send the bearer context modification request message to the central unit user plane entity of the target base station when deciding to use the full configuration. For the intra-system handover, the central unit control plane entity of the target base station determines whether to use the full configuration or the delta configuration. The inter-system handover uses the full configuration.

Alternatively, the bearer context modification request message sent to the central unit user plane entity of the target base station does not comprise the PDCP SN status information for a DRB when the central unit control plane entity of the target base station determines to use the full configuration for the DRB.

So far, the method 800 for supporting handover of the present invention has been described. With this method, the central unit control plane entity of the target base station can enable the central unit user plane entity of the target base station to know how to process the received forwarded data, so that the data not needed to be sent to the UE or the PDCP SN not needed to be sent to the UE can be discarded, thereby improving the efficiency of data forwarding and avoiding wasting air interface resources.

Figure 9:
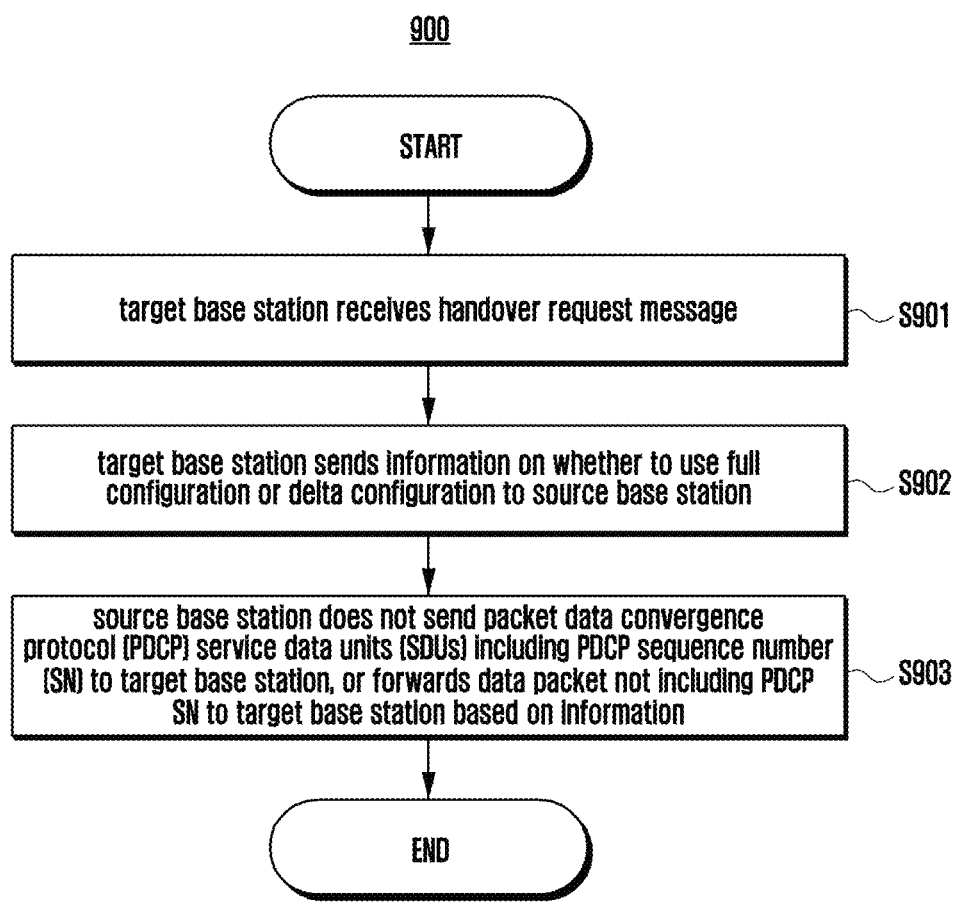
FIG. 9 is an exemplary flowchart showing a method for supporting handover according to an embodiment of the present disclosure.

FIG. 9 is an exemplary flowchart illustrating a method 900 for supporting handover according to an embodiment of the present disclosure. The method 900 may be used for the intra-system handover or the inter-system handover, and may be performed between the target base station and the source base station.

As shown in FIG. 9, in the method 900, in step S901, the target base station receives a handover request message.

In step S902, the target base station sends information on whether to use the full configuration or the delta configuration to the source base station. The information on whether to use the full configuration or the delta configuration may also be the information on whether the PDCP SN status is reserved, the information on whether the PDCP SN is restarted, the information on whether the PDCP SN is not required, or the information on whether the data packet including the PDCP SN is not required.

In the present disclosure, the information on whether to use the full configuration or the delta configuration may be the information of whether the PDCP SN status is reserved, the information of whether the PDCP SN is restarted, the information on the PDCP SN is not required for the forwarded data packet, or the information on the data packet including the PDCP SN is not required. No additional explanation will be given below when referring to the full configuration or delta configuration information.

In step S903, the source base station does not send packet data convergence protocol (PDCP) service data units (SDUs) including the PDCP sequence number (SN) to the target base station based on the information.

Alternatively, in step S903, the source base station forwards the data packet without the PDCP SN to the target base station based on the information. The forwarded data packet may be a PDCP SDU. For the data packet that has been assigned the PDCP SN, the source base station does not include the PDCP SN in the forwarded data packet.

In an example, in step S901, the target base station or the central unit control plane entity of the target base station receives the handover request message. The handover request message is received from the source base station or the central unit control plane entity of the source base station or from the core network. The handover request message received from the source base station or the central unit control plane entity of the source base station is a Xn application protocol (AP) message or other inter-base station messages. The handover request message received from the core network is an NGAP message or a message between another base stations and the core network.

For the handover request message received from the core network, the handover request message includes the handover type.

The target base station or the central unit control plane entity of the target base station may determine whether to use the full configuration or the delta configuration. In addition, the target base station or the central unit control plane entity of the target base station may also determine whether to use the full configuration or the delta configuration for each established DRB.

In this example, in step S902, the target base station or the central unit control plane entity of the target base station may send information on whether to use the full configuration or the delta configuration to the source base station or the central unit control plane entity of the source base station.

The target base station or the central unit control plane entity of the target base station may send the information to the source base station or the central unit control plane entity of the source base station through an interface message between the target base station and the source base station. The target base station or the central unit control plane entity of the target base station may also send the information to the source base station or the central unit control plane entity of the source base station through the core network, for example, the information on whether to use the full configuration or the delta configuration is sent to the source base station or the central unit control plane entity of the source base station through a transparent transmitter from the target to the source.

The full configuration or the delta configuration may be for each DRB.

In an example, when a handover intends to the handover (for example, Xn handover) performed directly between base stations, the target base station may send the information on whether to use the full configuration or the delta configuration to the source base station or the central unit control plane entity of the source base station through a request confirmation message.

In one example, when the handover intends to the handover (such as NG handover) performed by the core network, the target base station may send the information on whether to use the full configuration or the delta configuration through the handover request confirmation from the target base station to the core network and the handover command message from the core network to the source base station. Here, in order to avoid obscuring the subject of the present disclosure, the description of the interaction between core network entities is omitted.

In an example, in step S903, the source base station receives the information in step S902. Based on this information, the source base station does not forward the data packet including the PDCP SN to the target base station. For PDCP data packets sent by the source base station to the UE but not confirmed by the UE, the source base station would not forward the data packets to the target base station. The source base station sends a fresh data packet to the target base station. The source base station sends the fresh data by sending PDCP SDUs without the PDCP SN to the target base station.

In an example, in step S903, the source base station receives the information in step S902. Based on this information, the source base station forwards the data packet without the PDCP SN to the target base station. For the data packet that has been assigned the PDCP SN, the source base station does not include the PDCP SN in the forwarded data packet.

In an example, if the source base station supports an architecture where the central unit user plane of the source base station and the central unit control plane of the source base station are separated, the central unit control plane entity of the source base station may inform to the center unit user plane entity of the source base station that there is no need to forward the PDCP SDU including the PDCP SN to the target base station in an explicit indication way or an implicit indication way. The central unit control plane entity of the source base station informs the central unit user plane entity of the source base station there is no need to forward the PDCP SDU including the PDCP SN to the target base station or there is no need to include the PDCP SN in the forwarded data packet, and the data packet may be the PDCP SDU.

In the explicit indication way, the central unit control plane entity of the source base station sends an indication information to the central unit user plane entity of the source base station.

The central unit user plane entity of the source base station determines not to forward the PDCP SDU including the PDCP SN to the target base station according to the indication information, but forwards only the fresh data to the target base station. The fresh data is the PDCP SDU without the PDCP SN. The central unit user plane entity of the source base station forwards the PDCP SDU without the PDCP SN to the target base station according to the indication information. For the data packet to which the PDCP SN has been assigned, the source base station does not include the PDCP SN in the forwarded data packet.

In an example, the indication information may indicate at least one of the following: whether it is a full configuration or a delta configuration; whether PDCP SN is reserved; whether only the fresh data is sent; whether to send PDCP SDU including the PDCP SN; whether to send PDCP data packet sent to the user equipment (UE) but not confirmed by the UE; whether to include the PDCP SDU in the forwarded data packet; and whether to only send PDCP SDU without the PDCP SN.

In the implicit indication way, the central unit control plane entity of the source base station sends the tunnel information for data forwarding without requesting PDCP SN status information to indicate the above information, or indicates the central unit control plane entity of the source base station not send PDCP SN status information to the target base station.

With requesting no PDCP SN status information, the central unit user plane entity of the source base station knows that the information that the PDCP SN status is not reserved or other above-mentioned information, or the central unit control plane entity of the source base station does not send the PDCP SN status information to the target base station, so that the PDCP SDU including the PDCP SN is not forwarded to the target base station, and only the fresh data is forwarded to the target base station. The fresh data is sent through the PDCP SDU without the PDCP SN. Or the central unit user plane entity of the source base station forwards the data packet without the PDCP SN to the target base station. For the data packet to which the PDCP SN has been assigned, the source base station does not include the PDCP SN in the forwarded data packet.

For the DRB that the central unit control plane entity of the source base station requests to modify or establish, if the central unit control plane entity of the source base station does not request PDCP SN status information, the central unit user plane entity of the source base station knows that the PDCP SN status of the DRB is not reserved, so that only the fresh data is forwarded to the target base station, and the PDCP SDU including the PDCP SN is not forwarded to the target base station. The fresh data is sent through the PDCP SDU without the PDCP SN.

For the DRB that the central unit control plane entity of the source base station requests to modify or establish, if the central unit control plane entity of the source base station does not request PDCP SN status information, the central unit user plane entity of the source base station knows that the PDCP SN status of the DRB is not reserved, so that the PDCP SDU without the PDCP SN is forwarded to the target base station. For a data packet to which the PDCP SN has been assigned, the central unit user plane entity of the source base station does not include the PDCP SN in the forwarded data packet.

According to the embodiment of the present disclosure, the source base station, especially the central unit control plane entity of the source base station may know whether the PDCP SN status is maintained, and thus send the appropriate information for data forwarding to the central unit user plane entity of the source base station. In addition, the central unit user plane entity of the source base station forwards only the required data packets to the target base station, thereby avoiding unnecessary data sending and resource waste, improving the efficiency of data forwarding, and avoiding wasting air interface resources.

Figure 10:
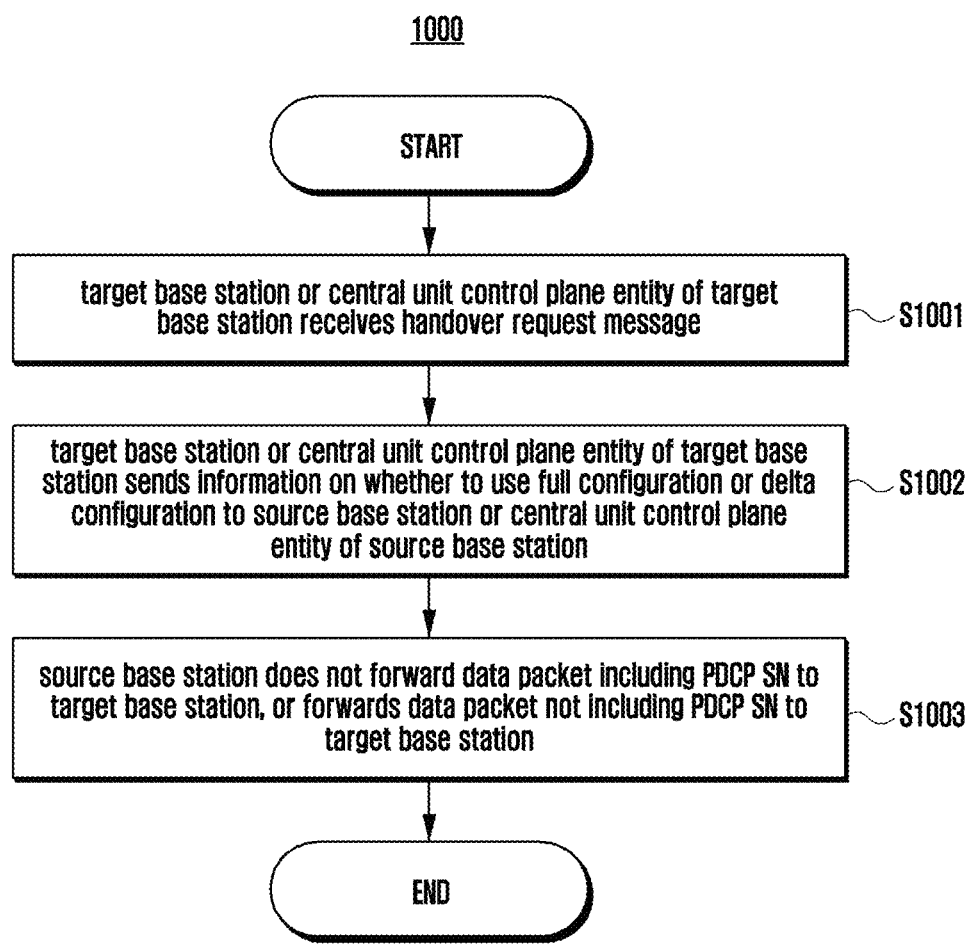
FIG. 10 is an exemplary flowchart showing a method for supporting handover according to an embodiment of the present disclosure.

FIG. 10 is an exemplary flowchart illustrating a method 1000 for supporting handover according to an embodiment of the present disclosure. The method 1000 may be used for the intra-system handover or the inter-system handover. The method includes the following steps.

In step S1001, the target base station or the central unit control plane entity of the target base station receives the handover request message. The handover request message is received from the source base station or the central unit control plane entity of the source base station or from the core network. The handover request message received from the source base station or the central unit control plane entity of the source base station is a Xn application protocol (AP) message or other inter-base station messages. The handover request message received from the core network is an NGAP message or a message between another base stations and the core network.

For the handover request message received from the core network, the handover request message includes the handover type.

The target base station or the central unit control plane entity of the target base station determines whether to use the full configuration or the delta configuration. The target base station or the central unit control plane entity of the target base station determines whether to use the full configuration or the delta configuration for each established DRB.

In step S1002, the target base station or the central unit control plane entity of the target base station sends the information on whether to use the full configuration or the delta configuration to the source base station or the central unit control plane entity of the source base station. The target base station or the central unit control plane entity of the target base station may send the information to the source base station or the central unit control plane entity of the source base station through an interface message between the target base station and the source base station. The target base station or the central unit control plane entity of the target base station may also send the information to the source base station or the central unit control plane entity of the source base station through the core network, for example, the information on whether to use the full configuration or the delta configuration is sent to the source base station or the central unit control plane entity of the source base station through a transparent transmitter from the target to the source. The full configuration or the delta configuration may be for each DRB.

When the handover intends to the handover (for example, Xn handover) performed directly between base stations, the target base station may send the information to the source base station or the central unit control plane entity of the source base station through a request confirmation message.

When the handover intends to the handover (such as NG handover) performed by the core network, the target base station may send through the handover request confirmation from the target base station to the core network and the handover command message from the core network to the source base station. Here, the description of the interaction between core network entities is omitted.

In step S1003, the source base station receives the information in step S1002. The source base station does not forward the data packet including the PDCP SN to the target base station. For PDCP data packets sent by the source base station to the UE but not confirmed by the UE, the source base station does not forward the data packets to the target base station. The source base station sends a fresh data packet to the target base station. The source base station forwards the fresh data to the target base station by sending PDCP SDUs without the PDCP SN.

In an example, the source base station receives the information in step S1002, and the source base station forwards the data packet without the PDCP SN to the target base station. The forwarded data packet may be a PDCP SDU. For the data packet that has been assigned the PDCP SN, the source base station does not include the PDCP SN in the forwarded data packet.

If the source base station supports an architecture where the user plane and the control plane are separated, the central unit control plane entity of the source base station may inform the central unit user plane entity of the source base station that there is no need to forward the PDCP SDUs including the PDCP SN to the target base station or forward the PDCP SDUs without the PDCP SN to the target base station in several ways of the followings.

Method 1: the central unit control plane entity of the source base station sends the indication information to the central unit user plane entity of the source base station, and the central unit user plane entity of the source base station does not forward PDCP SDUs including the PDCP SN to the target base station according to the indication information, and forwards only the fresh data to the target base station. The fresh data are the PDCP SDUs without the PDCP SN. Or the central unit user plane entity of the source base station forwards the data packet without the PDCP SN to the target base station according to the indication information. The forwarded data packet may be the PDCP SDU. For the data packet to which the PDCP SN has been assigned, the source base station does not include the PDCP SN in the forwarded data packet. The indication information may be the information on whether to use the full configuration or the delta configuration, or the indication information may be the information on whether the PDCP SN status is reserved, or the indication information may be the information on whether to forward only the fresh data, or the indication information may be the information on whether to forward PDCP SDUs including the PDCP SN, or the information on whether to forward PDCP data packet sent to the UE but not confirmed by the UE, or the information on that PDCP SN is not needed, or the indication information is the information that only PDCP SDUs without the PDCP SN is forwarded, and so on.

Method 2: the central unit control plane entity of the source base station sends tunnel information for data forwarding to the central unit user plane entity of the source base station, and the central unit control plane entity of the source base station does not request PDCP SN status information. Without requesting PDCP SN status information, the central unit user plane entity of the source base station knows that the information that the PDCP SN status is not reserved or other above-mentioned information, or the central unit control plane entity of the source base station does not send PDCP SN status information to the target base station, so that the PDCP SDU including the PDCP SN is not forwarded to the target base station, and only the fresh data is forwarded to the target base station. The fresh data is sent through the PDCP SDU without the PDCP SN. Or the central unit user plane entity of the source base station forwards the data packet without the PDCP SN to the target base station. For the DRB that the central unit control plane entity of the source base station requests to modify or establish, if the central unit control plane entity of the source base station does not request PDCP SN status information, the central unit user plane entity of the source base station knows that the PDCP SN status of the DRB is not reserved, so that only the fresh data is forwarded to the target base station, and the PDCP SDU including the PDCP SN is not forwarded to the target base station. The fresh data is sent through the PDCP SDU without the PDCP SN. Or the central unit user plane entity of the source base station forwards the data packet without the PDCP SN to the target base station.

The central unit user plane entity of the source base station does not forward the PDCP SDUs including the PDCP SN to the target base station according to the indication information, but forwards only the fresh data to the target base station. The fresh data are PDCP SDUs without the PDCP SN. Or the central unit user plane entity of the source base station forwards the data packet without the PDCP SN to the target base station. The data packet may be the PDCP SDU. For the data packet to which the PDCP SN has been assigned, the source base station does not include the PDCP SN in the forwarded data packet.

So far, the method 1000 for supporting handover of the present disclosure is has been described. With this method, the source base station, especially the central unit control plane entity of the source base station may know whether the PDCP SN status is maintained, and thus send the appropriate information for data forwarding to the central unit user plane entity of the source base station, the central unit user plane entity of the source base station forwards only the required data packets to the target base station, thereby avoiding unnecessary data sending and resource waste, improving the efficiency of data forwarding, and avoiding wasting air interface resources.

Figure 11:
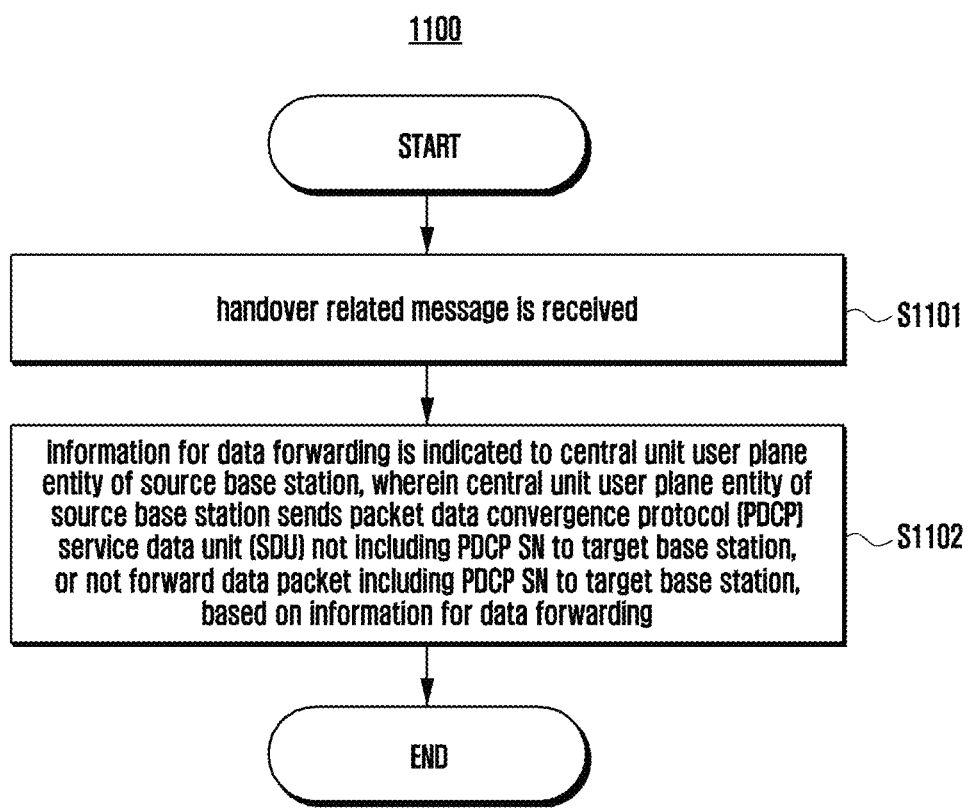
FIG. 11 is an exemplary flowchart showing a method for supporting handover according to an embodiment of the present disclosure.

FIG. 11 is an exemplary flowchart illustrating a method 1100 for supporting handover according to an embodiment of the present disclosure. The method 1100 may be used for the intra-system handover or the inter-system handover, and may be performed on the central unit control plane entity of the source base station.

As shown in FIG. 11, in the method 1100, in step S1101, a handover related message is received.

In step S1102, the information for data forwarding is indicated to the central unit user plane entity of the source base station, wherein the central unit user plane entity of the source base station sends a packet data convergence protocol (PDCP) service data unit (SDU) without the PDCP SN to the target base station based on the information for data forwarding to the target base station.

Alternatively, in step S1102, the information for data forwarding is indicated to the central unit user plane entity of the source base station, where the central unit user plane entity of the source base station forwards the PDCP SDU without PDCP SN to the target base station based on the information for data forwarding.

In an example, the handover related message is one of the handover request confirmation message and the handover command message, and the handover related message indicates whether it is the full configuration or the delta configuration or whether the PDCP SN status is reserved. For example, in step S1101, the central unit control plane entity of the source base station may receive the handover command message or the handover request confirmation message. The handover request confirmation message may be received from the target base station or the central unit control plane entity of the target base station. The handover command message is received from the core network.

The handover request confirmation message or the handover command message includes information on whether to use the full configuration or the delta configuration or whether the PDCP SN status is reserved.

In an example, in step S1102, the central unit control plane entity of the source base station may indicate the information for data forwarding to the central unit user plane entity of the source base station through an explicit indication way or an implicit indication way.

In the explicit indication way, the information for data forwarding may include the indication information sent through the bearer context modification request message, and the indication information may indicate at least one of the following: whether the PDCP SN status is reserved; whether only the fresh data is sent; whether to send PDCP SDU including the PDCP SN; whether to send PDCP data packet sent to the user equipment (UE) but not confirmed by the UE; whether to include the PDCP SN in the forwarded data packet; and whether to only send PDCP SDU without the PDCP SN.

In an example, the central unit user plane entity of the source base station knows that only the fresh data is forwarded to the target base station, and the PDCP SDU including the PDCP SN is not forwarded to the target base station, when at least one of the following is determined according to the indication information: the PDCP SN status is not reserved; only the fresh data is sent; the PDCP SDU including the PDCP SN is not sent; PDCP data packet sent to the user equipment (UE) but not confirmed by the UE is not sent; and only the PDCP SDU without the PDCP SN is sent.

In an example, the central unit user plane entity of the source base station knows to forward the PDCP SDU without the PDCP SN to the target base station, when at least one of the following is determined according to the indication information: the PDCP SN status is not reserved; only the fresh data is sent; the PDCP including the PDCP SN is not sent SDU; PDCP data packet sent to the user equipment (UE) but not confirmed by the UE is not forwarded; and only the PDCP SDU without the PDCP SN is sent.

In the implicit indication way, the central unit control plane entity of the source base station may send the tunnel information for data forwarding without requesting PDCP SN status information to indicate that the PDCP SN status is not reserved or the central unit control plane entity of the source base station does not send PDCP SN status information to the target base station. By not requesting the PDCP SN status information, the central unit user plane entity of the source base station knows that the PDCP SN is not reserved or the central unit control plane entity of the source base station does not send PDCP SN status information to the target base station, and therefore would not forward the PDCP SDU including the PDCP SN to the target base station, and forward only the fresh data to the target base station. The fresh data is sent through the PDCP SDU without the PDCP SN. Or the central unit user plane entity of the source base station forwards the data packet without the PDCP SN to the target base station.

For the DRB that the central unit control plane entity of the source base station requests to modify or establish, if the central unit control plane entity of the source base station does not request PDCP SN status information, the central unit user plane entity of the source base station knows that the PDCP SN status of the DRB is not reserved, so that only the fresh data is forwarded to the target base station, and the PDCP SDU including the PDCP SN is not forwarded to the target base station. The fresh data is sent through the PDCP SDU without the PDCP SN.

For the DRB that the central unit control plane entity of the source base station requests to modify or establish, if the central unit control plane entity of the source base station does not request PDCP SN status information, the central unit user plane entity of the source base station knows that the PDCP SN status of the DRB is not reserved, so that the PDCP SDU without the PDCP SN is forwarded to the target base station. For the data packet to which the PDCP SN has been assigned, the central unit user plane entity of the source base station does not include the PDCP SN in the forwarded data packet.

In addition, the central unit user plane entity of the source base station may not forward the data packets sent to the UE but not confirmed by the UE.

The central unit user plane entity of the source base station knows the data forwarding information through the explicit indication way or the implicit indication way in step S1102. For the implicit indication way, the central unit user plane entity of the source base station knows that the PDCP SN status information is not reserved or the central unit control plane entity of the source base station does not send PDCP SN status information to the target base station according to the central unit control plane entity of the source base station not requesting PDCP SN status information, so that the PDCP SDU including the PDCP SN is not forwarded to the target base station, but only the fresh data is forwarded to the target base station. The fresh data is sent through the PDCP SDU without the PDCP SN. Or the central unit user plane entity of the source base station forwards the data packet without the PDCP SN to the target base station. For a data packet that has been assigned a PDCP SN, the central unit user plane entity of the source base station does not include the PDCP SN in the forwarded data packet.

According to the embodiment of the present disclosure, the central unit control plane entity of the source base station may send the appropriate information for data forwarding to the central unit user plane entity of the source base station, and the central unit user plane entity of the source base station forwards only the required data packets to the target base station, thereby avoiding unnecessary data sending and resource waste, improving the efficiency of data forwarding, and avoiding wasting air interface resources.

Figure 12:
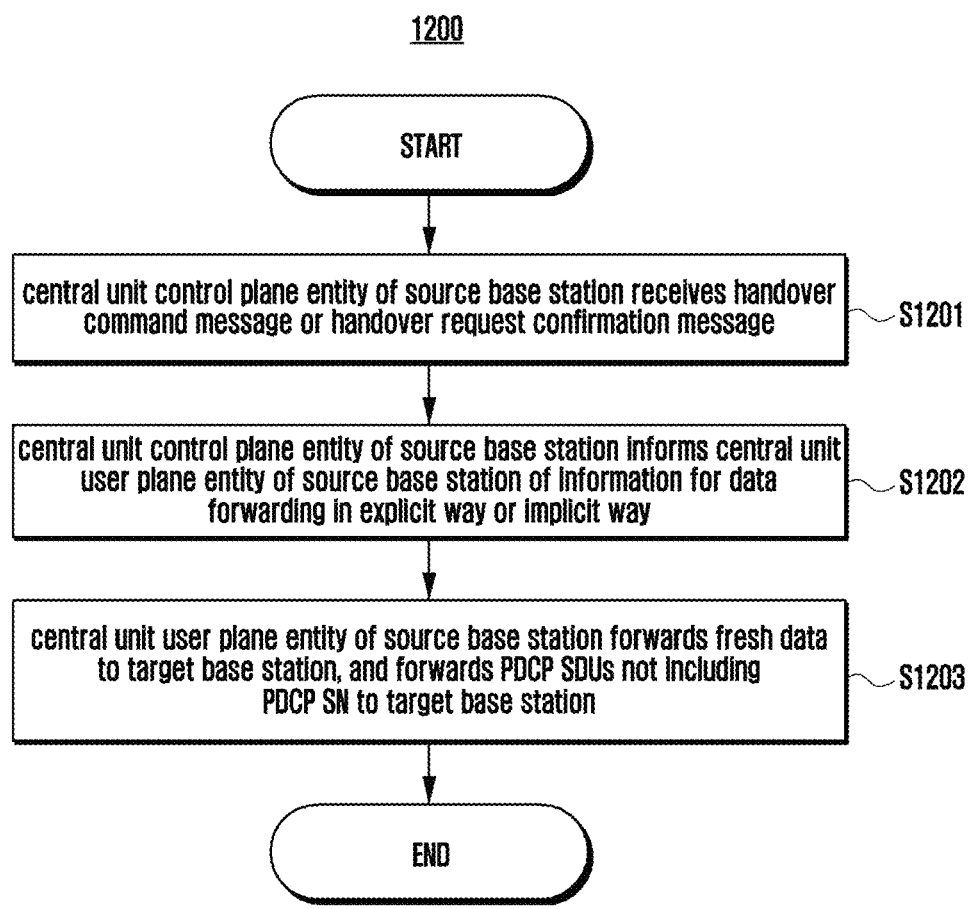
FIG. 12 is an exemplary flowchart showing a method for supporting handover according to an embodiment of the present disclosure.

FIG. 12 is an exemplary flowchart illustrating a method 1200 for supporting handover according to an embodiment of the present disclosure. This method may be used for the intra-system handover or the inter-system handover. The method includes the following steps.

In the step S1201, the central unit control plane entity of the source base station receives the handover command message or the handover request confirmation message. The handover request confirmation message is received from the target base station or the central unit control plane entity of the target base station. The handover command message is received from the core network.

The handover request confirmation message or handover command message includes information on whether to use the full configuration or the delta configuration, or whether the PDCP SN status is reserved.

In step S1202, the central unit control plane entity of the source base station informs the central unit user plane entity of the source base station of the information for data forwarding in an explicit way or an implicit way. The information for data forwarding is the information on whether the PDCP SN status is reserved, or the information on whether only the fresh data is forwarded, or the information on whether to forward the information of PDCP SDUs including the PDCP SN, or the information on whether to forward the PDCP sent to the UE but not confirmed by the UE, or the information on that the PDCP SN is not required, or the information on that only the PDCP SDUs without the PDCP SN is forwarded, and so on. The implicit way is to indicate the information for data forwarding by including an information element. The information element may be included in the bearer context modification request message.

The implicit way is that the central unit control plane entity of the source base station does not send the information requesting the PDCP SN status to the central unit user plane entity of the source base station. The central unit control plane entity of the source base station sends the tunnel information for data forwarding to the central unit user plane entity of the source base station. With not requesting PDCP SN status information, the central unit user plane entity of the source base station knows that the information that the PDCP SN status is not reserved or other above-mentioned information, or the central unit control plane entity of the source base station does not send PDCP SN status information to the target base station, so that the PDCP SDU including the PDCP SN is not forwarded to the target base station, and only the fresh data is forwarded to the target base station. The fresh data is sent through the PDCP SDU without the PDCP SN. Or the central unit user plane entity of the source base station forwards the data packet without the PDCP SN to the target base station. For the data packet to which the PDCP SN has been assigned, the source base station does not include the PDCP SN in the forwarded data packet. For the DRB that the central unit control plane entity of the source base station requests to modify or establish, if the central unit control plane entity of the source base station does not request PDCP SN status information, the central unit user plane entity of the source base station knows that the PDCP SN status of the DRB is not reserved, so that only the fresh data is forwarded to the target base station, and the PDCP SDU including the PDCP SN is not forwarded to the target base station. The fresh data is sent through the PDCP SDU without the PDCP SN. Or the central unit user plane entity of the source base station forwards the data packet without the PDCP SN to the target base station. For the data packet to which the PDCP SN has been assigned, the central unit user plane entity of the source base station does not include the PDCP SN in the forwarded data packet.

In step S1203, the central unit user plane entity of the source base station forwards PDCP SDUs without the PDCP SN to the target base station, and does not forward the PDCP SDUs including the PDCP SN to the target base station. Only forward the fresh data to the target base station. The fresh data is sent through PDCP SDUs without the PDCP SN. The central unit user plane entity of the source base station does not forward the data packets sent to the UE but not confirmed by UE. The central unit user plane entity of the source base station knows the information for data forwarding in the explicit way or the implicit way described in step S1202. For the implicit way, the central unit user plane entity of the source base station knows that the PDCP SN status is not reserved or the central unit control plane entity of the source base station does not send SN status information to the target based on the central unit control plane entity of the source base station not requesting PDCP SN status information, thus the PDCP SDUs including the PDCP SN would not forward to the target base station, but only the fresh data is forwarded to the target base station. The fresh data is sent through PDCP SDUs without the PDCP SN.

Alternatively, in step S1203, the central unit user plane entity of the source base station forwards the data packet without the PDCP SN to the target base station. For a data packet to which the PDCP SN has been assigned, the central unit user plane entity of the source base station does not include the PDCP SN in the forwarded data packet.

So far, the method 1200 for supporting handover of the present disclosure has been described. With this method, the central unit control plane entity of the source base station sends the appropriate information for data forwarding to the central unit user plane entity of the source base station, and the central unit user plane entity of the source base station forwards only the required data packets to the target base station, thereby avoiding unnecessary data sending and resource waste, improving the efficiency of data forwarding, and avoiding wasting air interface resources.

Figure 13:
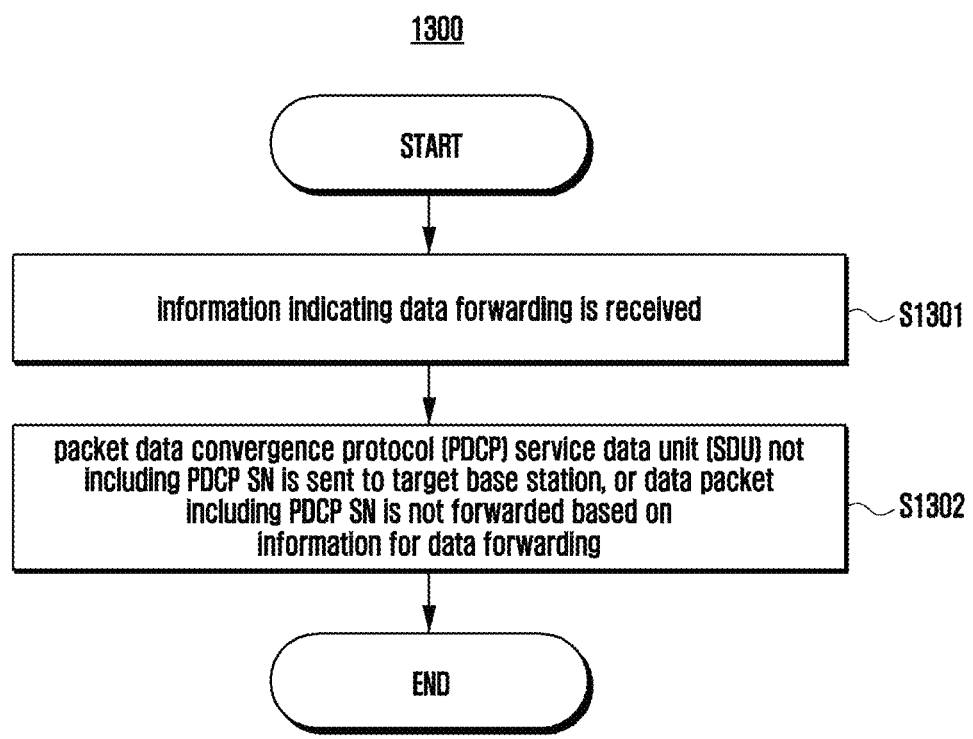
FIG. 13 is an exemplary flowchart showing a method for supporting handover according to an embodiment of the present disclosure.

FIG. 13 is an exemplary flowchart illustrating a method 1300 for supporting handover according to an embodiment of the present disclosure. The method 1300 may be used for the intra-system handover or the inter-system handover, and may be performed at the central unit user plane entity of the source base station.

As shown in FIG. 13, in the method 1300, in step S1301, the information indicating the data forwarding is received.

In step S1302, the PDCP SDU without PDCP SN is sent to the target base station based on the information for data forwarding.

In step S1302, the PDCP SDU including the PDCP SN is not sent to the target base station based on the information for data forwarding. For the data packet to which the PDCP SN has been assigned, the source base station does not include the PDCP SN in the forwarded data packet.

In an example, in step S1301, the information indicating the data forwarding may be received in an explicit indication way or an implicit indication way.

In the explicit indication way, the central unit user plane entity of the source base station may receive the information for data forwarding sent by the central unit control plane entity of the source base station. The information indicating the data forwarding includes the indication information received through the bearer context modification request message, and the indication information may indicate at least one of the following: whether the PDCP SN status is reserved; whether to send only the fresh data; whether to send the PDCP SDU including the PDCP SN; whether to send PDCP data packet sent to the user equipment (UE) but not confirmed by the UE; whether to send PDCP SN; and whether to send only PDCP SDU without the PDCP SN.

In an example, the central unit user plane entity of the source base station knows that only the fresh data is forwarded to the target base station, and the PDCP SDU including the PDCP SN is not forwarded to the target base station when at least one of the following is determined according to the indication information: the PDCP SN status is not reserved; only the fresh data is sent; the PDCP SDU including the PDCP SN is not sent; PDCP data packet sent to the user equipment (UE) but not confirmed by the UE is not sent; PDCP SN is not sent; and only the PDCP SDU without the PDCP SN is sent.

In an example, the central unit user plane entity of the source base station knows to forward the PDCP SDU without the PDCP SN to the target base station when at least one of the following is determined according to the indication information: the PDCP SN status is not reserved; only the fresh data is sent; the PDCP including the PDCP SN is not sent SDU; PDCP data packet sent to the user equipment (UE) but not confirmed by the UE is not sent; PDCP SN is not sent; and only the PDCP SDU without the PDCP SN is sent.

In the implicit indication way, the tunnel information for data forwarding is received from the central unit control plane entity of the source base station without requesting PDCP SN status information to indicate that the PDCP SN is not reserved or the central unit control plane entity of the source base station does not send the PDCP SN status information to the target base station.

The central unit control plane entity of the source base station sends the tunnel information for data forwarding to the central unit user plane entity of the source base station. By not requesting the PDCP SN status information, the central unit user plane entity of the source base station knows that the PDCP SN is not reserved or the central unit control plane entity of the source base station does not send PDCP SN status information to the target base station, so that PDCP SDU without the PDCP SN is forwarded to the target base station, and only the fresh data is forwarded to the target base station. The fresh data is sent through the PDCP SDU without the PDCP SN.

The central unit control plane entity of the source base station sends the tunnel information for data forwarding to the central unit user plane entity of the source base station. By not requesting the PDCP SN status information, the central unit user plane entity of the source base station knows that the PDCP SN is not reserved or the central unit control plane entity of the source base station does not send PDCP SN status information to the target base station, so that the PDCP SDU without the PDCP SN is forwarded to the target base station.

For the DRB that the central unit control plane entity of the source base station requests to modify or establish, if the central unit control plane entity of the source base station does not request PDCP SN status information, the central unit user plane entity of the source base station knows that the PDCP SN status of the DRB is not reserved, so that only the fresh data is forwarded to the target base station, and the PDCP SDU including the PDCP SN is not forwarded to the target base station. The fresh data is sent through the PDCP SDU without the PDCP SN.

For the DRB that the central unit control plane entity of the source base station requests to modify or establish, if the central unit control plane entity of the source base station does not request PDCP SN status information, the central unit user plane entity of the source base station knows that the PDCP SN status of the DRB is not reserved, so the PDCP SDU without the PDCP SN is forwarded to the target base station. For the data packet to which the PDCP SN has been assigned, the central unit user plane entity of the source base station does not include the PDCP SN in the forwarded data packet.

The central unit user plane entity of the source base station forwards the PDCP SDU without the PDCP SN to the target base station, and does not forward the PDCP SDU including the PDCP SN to the target base station. The PDCP SDU without the PDCP SN may be fresh data. The central unit user plane entity of the source base station does not forward data packets sent to the UE but not confirmed by the UE. The central unit user plane entity of the source base station knows the data forwarding information through the explicit indication way or the implicit indication way in step S1301. For the implicit indication way, the central unit user plane entity of the source base station knows that the PDCP SN status is not reserved or the central unit control plane entity of the source base station does not send PDCP SN status information to the target base station according to the central unit control plane entity of the source base station not requesting PDCP SN status information, so that the PDCP SDU including the PDCP SN is not forwarded to the target base station, but only the fresh data is forwarded to the target base station. The fresh data is sent through the PDCP SDU without the PDCP SN. The central unit user plane entity of the source base station does not forward the data packets sent to the UE but not confirmed by the UE. Or the central unit user plane entity of the source base station forwards the data packet without the PDCP SN to the target base station.

According to the embodiment of the present disclosure, the central unit user plane entity of the source base station forwards only the required data packets to the target base station, thereby avoiding unnecessary data sending and resource waste, improving the efficiency of data forwarding, and avoiding wasting air interface resources.

Figure 14:
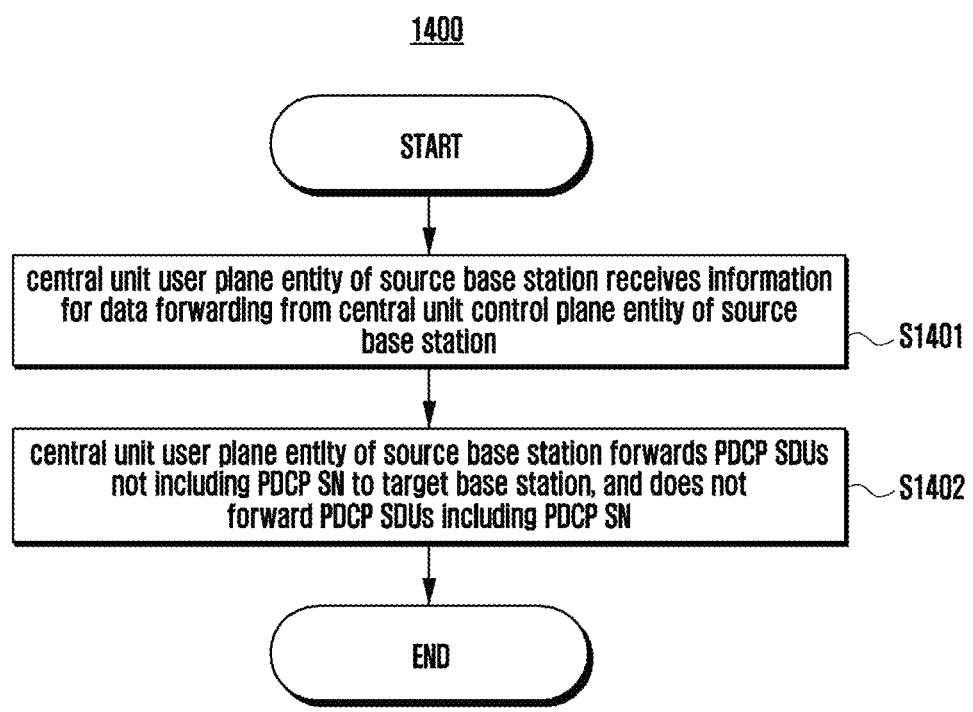
FIG. 14 is an exemplary flowchart showing a method for supporting handover according to an embodiment of the present disclosure.

FIG. 14 is an exemplary flowchart illustrating a method 1400 for supporting handover according to an embodiment of the present disclosure. The method 1400 may be used for the intra-system handover or the inter-system handover. The method includes the following steps.

In the step S1401, the central unit user plane entity of the source base station receives the information for data forwarding and the tunnel information for data forwarding sent by the central unit control plane entity of a source base station. The information for data forwarding includes the information on whether to forward PDCP SDUs including the PDCP SN, or the information on whether the PDCP SN status is reserved, or the information on whether to forward only the fresh data, or the information on whether to forward the PDCP data packet sent to the UE but not confirmed by the UE, or the information on whether PDCP SN is included in the forwarded data packet; or the information on whether only PDCP SDUs without the PDCP SN are forwarded, etc. The information for data forwarding may be in an explicit way or an implicit way. The explicit way directly includes an information element to indicate the above-mentioned data forwarding information. The information element may be included in the bearer context modification request message.

The implicit way is that the central unit control plane entity of the source base station does not send the request of PDCP SN status information to the central unit user plane entity of the source base station. The central unit control plane entity of the source base station sends the tunnel information for data forwarding to the central unit user plane entity of the source base station. By not requesting PDCP SN status information, the central unit user plane entity of the source base station knows that the PDCP SN status is not reserved or the central unit control plane entity of the source base station does not send PDCP SN status information to the target base station, thus the data packet without the PDCP SN is forwarded to the target base station or only the fresh data is forwarded to the target base station, and the fresh data is sent through the PDCP SDUs without the PDCP SN. For the DRB that the central unit control plane entity of the source base station requests to modify or establish, if the central unit control plane entity of the source base station does not request PDCP SN status information, the central unit user plane entity of the source base station knows that the PDCP SN status of the DRB is not reserved, so that only the fresh data is forwarded to the target base station, and the PDCP SDU including the PDCP SN is not forwarded to the target base station. The fresh data is sent through the PDCP SDU without the PDCP SN. Or the central unit user plane entity of the source base station forwards the data packet without the PDCP SN to the target base station.

In step S1402, the central unit user plane entity of the source base station forwards PDCP SDUs without the PDCP SN to the target base station, and does not forward the PDCP SDUs including the PDCP SN to the target base station. The PDCP SDUs without the PDCP SN may be the fresh data. The central unit user plane entity of the source base station does not forward the data packets sent to the UE but not confirmed by UE. The central unit user plane entity of the source base station knows the data forwarding information through the explicit way or the implicit way described in step S1401. For the implicit indication way, the central unit user plane entity of the source base station knows that the PDCP SN status is not reserved or the central unit control plane entity of the source base station does not send PDCP SN status information to the target base station according to the central unit control plane entity of the source base station not requesting PDCP SN status information, so that the PDCP SDU without the PDCP SN is forwarded to the target base station, or the PDCP SDU including the PDCP SN is not forwarded to the target base station. Or only the fresh data is forwarded to the target base station, and the fresh data is sent through PDCP SDUs without the PDCP SN. The central unit user plane entity of the source base station does not forward the data packets sent to the UE but not confirmed by UE.

So far, the method 1400 for supporting handover of the present disclosure has been described. With this method, the central unit user plane entity of the target base station forwards only the required data packets to the target base station, thereby avoiding unnecessary data sending and resource waste, improving the efficiency of data forwarding, and avoiding wasting air interface resources.

Figure 15:
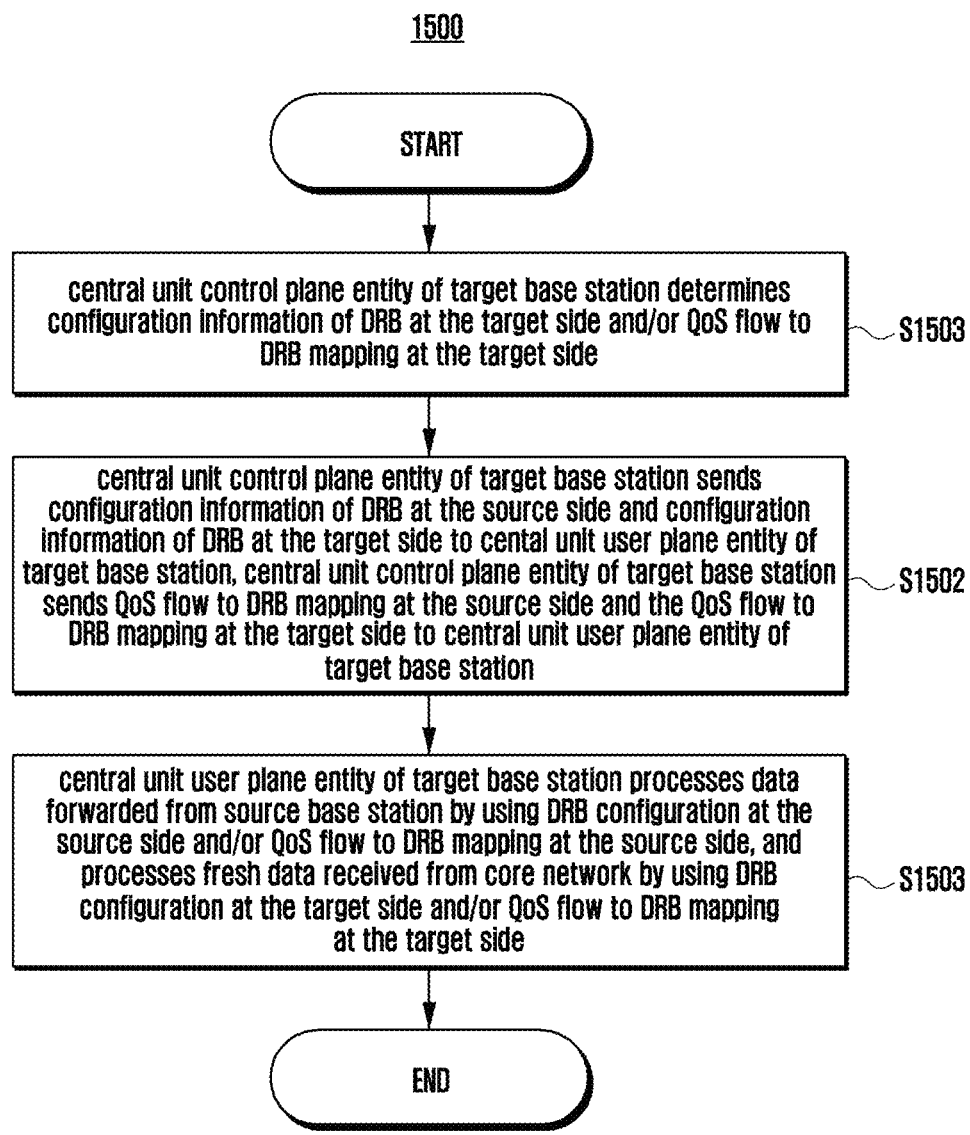
FIG. 15 shows an exemplary flowchart of a method for supporting handover according to an embodiment of the present disclosure.

FIG. 15 shows an exemplary flowchart of a method 1500 for supporting handover according to an embodiment of the present disclosure. The method 1500 may be used for the intra-system handover or the inter-system handover. The method includes the following steps.

In step S1501, the central unit control plane entity of the target base station receives a handover request message from the source base station or the core network. The handover request message received from the source base station is an application layer message over interface between base stations, such as a XnAP message. The handover request message received from the core network is an application layer message of the interface between the base station and the core network, such as an NGAP message. The handover request message includes a configuration information of the UE at the source base station, and the configuration information includes a DRB configuration information and/or a QoS flow to DRB mapping information. The message includes an E-RAB identifier to which a Qos flow maps.

The central unit control plane entity of the target base station determines the DRB configuration information and/or the Qos Flow to DRB mapping at the target side. The target base station includes the DRB configuration information and/or the Qos Flow to DRB mapping at the target side in the handover command message, which is sent to the UE through the source base station.

In step S1502, the central unit control plane entity of the target base station sends the QoS flow to DRB mapping at the source side and the QoS flow to DRB mapping at the target side to the central unit user plane entity of the target base station. For the inter-system handover from the 4G system to the 5G system, the Qos Flow to DRB mapping at the source side is also the mapping of Qos Flow to E-RAB.

The central unit control plane entity of the target base station may determine to use the same DRB configuration as the source or a different DRB configuration.

If the central unit control plane entity of the target base station determines to use the same DRB configuration and the same QoS flow to DRB mapping as the source base station, the information, i.e. the same DRB configuration as the source base station, is sent to the central unit user plane entity of the target base station through the DRB to be established and the Qos flow information to be established on the DRB. The central unit control plane entity of the target base station sends the information to the central unit user plane entity of the target base station through a bearer context setup request message or a bearer context modification request message. The central unit control plane entity of the target base station sends the Qos flow to DRB mapping to the central unit user plane entity of the target base station through the Qos flow(s) information to be established which is included in the DRB to be established in the bearer context setup request message or the bearer context modification request message. The DRB to be established is the DRB to be established which is included in the PDU session resource to setup list in the bearer context setup request message or the DRB to be established included in the PDU session resource to setup list (also called the PDU session resource to setup modification list) in the bearer context modification request message. In the case that the handover is from E-UTRA and NR dual connectivity (EN-DC) to standalone architecture (SA) and the source secondary base station and the target base station are shared, the central unit control plane entity of the target base station may send the mapping to the central unit user plane entity of the target base station through the Qos flow(s) information to be setup which is included in the DRB to be established in the bearer context modification request message.

If the central unit control plane entity of the target base station determines to use the same QoS flow to DRB mapping as the source base station, then the mapping is sent to the central unit user plane entity of the target base station. The central unit control plane entity of the target base station sends the mapping to the central unit user plane entity of the target base station through the bearer context setup request message or the bearer context modification request message. The central unit control plane entity of the target base station sends the mapping to the central unit user plane entity of the target base station through the Qos flow(s) information to be setup which is included in the DRB to be established in the bearer context setup request message or the bearer context modification request message. The DRB to be established is the DRB to be established included in the PDU session resource to setup list in the bearer context setup request message or the DRB to be established included in the PDU session resource to setup list (also called the PDU session resource to setup modification list) in the bearer context modification request message. In the case that the handover is from EN-DC to SA and the source secondary base station and the target base station are shared, the central unit control plane entity of the target base station may send the mapping to the central unit user plane entity of the target base station through the Qos flow(s) information to be established included in the DRB to be established in the bearer context modification request message.

If the central unit control plane entity of the target base station determines to use a different DRB configuration and/or a different QoS flow to DRB mapping from the source base station, in order to ensure the data lossless during the handover process, the central unit control plane entity of the target base station may determine to temporarily configure the same DRB and/or the same QoS flow to DRB mapping as the source base station to process the data forwarded by the source base station. The DRB configuration and the mapping of the Qos flow to DRB determined by the central unit control plane entity of the target base station are used by the central unit user plane entity of the target base station to process the fresh data received from the core network. For the inter-system handover from 4G system to 5G system, the central unit control plane entity of the target base station may determine to temporarily configure the same DRB (or E-RAB) and/or the same QoS flow to DRB mapping (or E-RAB) mapping as the source base station to process the data forwarded by the source base station. The DRB configuration and Qos flow to DRB mapping determined by the central unit control plane entity of the target base station are used by the central unit user plane entity of the target base station to process the fresh data received from the core network.

When the central unit control plane entity of the target base station determines that the DRB configuration at the target side is different from the DRB configuration at the source side, the central unit control plane entity of the target base station sends the configuration information of DRB at the source side to the central unit user plane entity of the target base station. The central unit control plane entity of the target base station may send the configuration information of DRB at the source side and the configuration information of DRB at the target side to the central unit user plane entity of the target base station directly, or send the configuration information of DRB at the target side and delta configuration between the source side and the target side to the central unit user plane entity of the target base station, or send the configuration information of DRB at the source side and delta configuration between the source side and the target side to the central unit user plane entity of the target base station. With the configuration information of DRB at the target side and the delta configuration information between the source side and the target side, the central unit user plane entity of the target base station may know the configuration information of DRB at the source side; or with the configuration information of DRB at the source side and the delta configuration information between the source side and the target side, the central unit user plane entity of the target base station may know the configuration information of DRB at the target side. If the central unit control plane entity of the target base station sends the configuration information of DRB at the source side and the configuration information of DRB at the target side to the central unit user plane entity of the target base station directly, the Qos flow information to be established included in the corresponding configuration information of DRB at the source side is the Qos flow(s) mapped to the DRB at the source side. The Qos flow information to be established included in the corresponding configuration information of DRB at the target side is the Qos flow(s) mapped to the DRB at the target side. The configuration information of DRB is included in the DRB information to be established or DRB information to be modified. The configuration information of DRB at the target side may be indicated with the DRB to be established or the DRB to be modified in existing message, and a new information element, such as source DRB configuration information, may be defined to indicate the configuration information of DRB at the source side. The configuration information of DRB at the source side may be indicated with the DRB to be established or the DRB to be modified in existing message, and a new information element, such as target DRB configuration information, may be defined to indicate the configuration information of DRB at the target side. If the central unit control plane entity of the target base station sends the configuration information of DRB at the target side and the delta configuration between the source side and the target side to the central unit user plane entity of the target base station, the DRB information to be established or the DRB information to be modified includes the configuration information of DRB at the target side and the Qos flow(s) mapped to the DRB at the target side, and the DRB information to be established or the DRB information to be modified further includes the delta configuration and/or the Qos flow(s) mapped to the DRB at the source side. If a DRB is merely configured for the source side and the target side would not use the corresponding DRB, the DRB information to be established or the DRB information to be modified includes a source DRB indication information. If the central unit control plane entity of the target base station sends the configuration information of DRB at the source side and the delta configuration between the source side and the target side to the central unit user plane entity of the target base station, the DRB information to be established or the DRB information to be modified includes the configuration information of DRB at the source side and the Qos flow(s) mapped to the DRB at the source side, and the DRB information to be established or the DRB information to be modified further includes the delta configuration and/or the Qos flow(s) mapped to the DRB at the target side. If a DRB is merely configured for the source side and the target side would not use the corresponding DRB, the DRB information to be established or the DRB information to be modified includes a source DRB indication information.

If the central unit control plane entity of the target base station determines to use a different QoS flow to DRB mapping from the source base station, in order to ensure the data lossless during the handover process, the central unit control plane entity of the target base station may determine to temporarily configure the same Qos flow to DRB mapping as the QoS flow to DRB mapping at source base station to process the data forwarded by the source base station. The Qos flow to DRB mapping at the target side determined by the central unit control plane entity of the target base station is used by the central unit user plane entity of the target base station to process the fresh data received from the core network. For the inter-system handover from the 4G system to the 5G system, the central unit control plane entity of the target base station may decide to temporarily configure the same Qos flow to DRB (or E-RAB) mapping as the source base station to process the data forwarded by the source base station. The DRB configuration and Qos Flow to DRB mapping at the target side determined by the central unit control plane entity of the target base station are used by the central unit user plane entity of the target base station to process the fresh data received from the core network.

The central unit control plane entity of the target base station sends the QoS flow to DRB mapping at source side and/or the QoS flow to DRB mapping at the target side to the central unit user plane entity of the target base station. The target QoS flow information to be established and/or the source QoS flow information to be established are included in the DRB information to be established sent by the central unit control plane entity of the target base station to the central unit user plane entity of the target base station. The target QoS flow information to be established includes one or more QoS flows mapped to the DRB at target side. The source QoS flow information to be established includes one or more QoS flows mapped to the DRB at the source side. If only the target QoS flow information to be established is included in the DRB information to be established, it means that the DRB is used to process the fresh data from the core network, and the corresponding DRB is not used by the source. If only the source QoS flow information to be established is included in the DRB information to be established, it means that the DRB is used to process the data forwarded from the source base station, and the corresponding DRB is not used by the target, it means that the DRB is the old DRB configuration by the source. The DRB may be released after the central unit user plane entity of the target base station receives the end marker packet.

The existing QoS flow information to be established in the DRB information to be established in a message over the interface between the central unit control plane entity of the base station and the central unit user plane entity of the base station may be used to indicate the QoS flow information to be established at target side. A new information element (IE) (such as source QoS flow information to be established or old QoS flow information to be established) is used to indicate the mapping information at the source or the QoS flow information to be established at source. The existing Qos Flow information to be established in the DRB information to be established is a mandatory field. In order to indicate that the DRB is the old DRB at the source, which is not used by the target, the DRB information to be established only needs to include the source Qos flow information to be established or the old Qos flow information to be established (that is, the Qos flow information mapped to the DRB at the source side). The source DRB configuration indication or the old DRB configuration indication may be included in the DRB information to be established in a message over the interface between the central unit control plane entity of the base station and the central unit user plane entity of the base station, so that the base station central unit user plane entity may ignore the existing QoS flow information to be established. This method may also be used in the bear context modification messages.

The existing QoS flow information to be established in the DRB information to be established in an interface message of the central unit control plane entity of the base station and the central unit user plane entity of the base station may be used to indicate the source QoS flow information to be established. A new information element (IE) (such as target QoS flow information to be established or new QoS flow information to be established) is used to indicate the mapping information at the target side or the target QoS flow information to be established. The existing Qos Flow information to be established in the DRB information to be established is a mandatory field. In order to indicate that a DRB is the DRB configured at the target side, the DRB information to be established only needs to include the target Qos flow information to be established or the new Qos flow information to be established (that is, the Qos flow information mapped to the DRB at the target side). The target DRB configuration indication or the new DRB configuration indication may be included in the DRB information to be established in a message over the interface between the central unit control plane entity of the base station and the central unit user plane entity of the base station, so that the base station central unit user plane entity may ignore the existing QoS flow information to be established. This method may also be used in the bear context modification messages.

The target flow mapping information and/or the source flow mapping information is included in the DRB information to be modified sent by the central unit control plane entity of the target base station to the central unit user plane entity of the target base station. The target flow mapping information includes one or more Qos flows mapped to the DRB at target. The source flow mapping information includes one or more source QoS flows mapped to the DRB at source. If only the target flow mapping information is included in the DRB information to be modified, it means that the DRB is used to process the fresh data from the core network, and the source does not use the corresponding DRB. If only the source flow mapping information is included in the DRB information to be modified, it means that the DRB is only used to process the data forwarded from the source base station, and the target does not use the corresponding DRB, indicating that the DRB is the old DRB configuration at source, and the DRB may be released after the end marker packet is received by the central unit user plane entity of the target base station.

The existing flow mapping information in the DRB information to be modified in an interface message of the central unit control plane entity of the base station and the central unit user plane entity of the base station may be used to indicate the Qos flow(s) mapped to the DRB at target. A new information element (IE) (such as the source flow mapping information or old flow mapping information) is used to indicate the Qos flow(s) mapped to the DRB at source.

The existing flow mapping information in the DRB information to be modified in an interface message of the central unit control plane entity of the base station and the central unit user plane entity of the base station may be used to indicate the Qos flow(s) mapped to the DRB at source. A new information element (IE) (such as the target flow mapping information or new flow mapping information) is used to indicate the Qos flow(s) mapped to the DRB at target.

The central unit control plane entity of the target base station may send the above information to the central unit user plane entity of the target base station by using a bearer context setup request or a bearer context modification request message or other messages. The DRB to be established is the DRB to be established which is included in the PDU session resource to setup list in the bearer context setup request message or the DRB to be established included in the PDU session resource to setup list (also called the PDU session resource to setup modification list) in the bearer context modification request message. In the case that the handover is from EN-DC to SA and the source secondary base station and the target base station are shared, the central unit control plane entity of the target base station may send the above information to the central unit user plane entity of the target base station through the DRB to be established in the bearer context modification request message.

In step S1503, the central unit user plane entity of the target base station receives the above information from the central unit control plane entity of the target base station, and the central unit user plane entity of the target base station saves the received information. The central unit user plane entity of the target base station assigns the tunnel information for a DRB requesting data forwarding and sends it to the central unit control plane entity of the target base station.

The central unit control plane entity of the target base station sends a UE context setup request message to the target base station distribution unit (hereinafter referred to as gNB-DU). The message includes the source DRB configuration and the DRB configuration determined at the target. For the source DRB, the DRB to be established includes the Qos flow(s) mapped to DRB at the source. For the new DRB determined at the target, the DRB to be established includes the Qos flow(s) mapped to DRB determined by the central unit control plane entity of the target base station. If the target uses the same DRB configuration and the same QoS flow to DRB mapping as the source, the DRB to be established includes the Qos flow(s) mapped to the DRB. If the target uses the same DRB configuration as the source and different QoS flow to DRB mapping, the DRB to be established may include the QoS flow(s) mapped to the DRB at the source and/or the Qos flow(s) mapped to the DRB at the target. The gNB-DU assigns a downlink transport layer address and a tunnel identifier to each DRB to be established. The gNB-DU sends a UE context setup response message to the central unit control plane entity of the target base station, and the message includes the downlink transport layer address and the tunnel identifier assigned to each DRB by the gNB-DU. The central unit control plane entity of the base station sends the downlink transport layer address and the tunnel identifier assigned to each DRB by the gNB-DU to the central unit user plane entity of the target base station. The central unit user plane entity of the target base station receives the data forwarded from the source base station.

The central unit user plane entity of the target base station processes the data forwarded from the source base station by using the DRB configuration at the source side and/or the QoS flow to DRB mapping at the source side, and processes the fresh data received from the core network by using the DRB configuration at the target side and/or the QoS flow to DRB mapping at the target side. If the DRB to be established or the DRB to be modified does not include the target QoS flow information, the DRB may be released after the central unit user plane entity of the target base station receives the end marker packet. The central unit user plane entity of the target base station sends the forwarded data received from the source base station to the UE through the gNB-DU at first. After receiving the end marker, the central unit user plane entity of the target base station starts sending the data received from the core network.

The release process of the old DRB at the gNB-DU is as described in the method in FIG. 25 or as follows. The old DRB is the DRB at the source, and the old DRB configured at the target is used to process the forwarded data.

If no fresh data is received for a DRB within a certain period of time, the gNB-DU sends a UE context modification request message to the central unit control plane entity of the target base station. The message includes the identity of the DRB which needs to be released. After receiving the message, the central unit control plane entity of the target base station may release the old DRB.

So far, the method 1500 for supporting handover of the present disclosure has been described. This method may ensure the correct processing at the target base station central unit control plane and the central unit user plane entity of the target base station when the target base station uses a different QoS flow to DRB mapping from the source base station, thereby avoiding unnecessary data sending and resource waste, improving the efficiency of data forwarding, and improving the reliability of data forwarding during handover.

Figure 16:
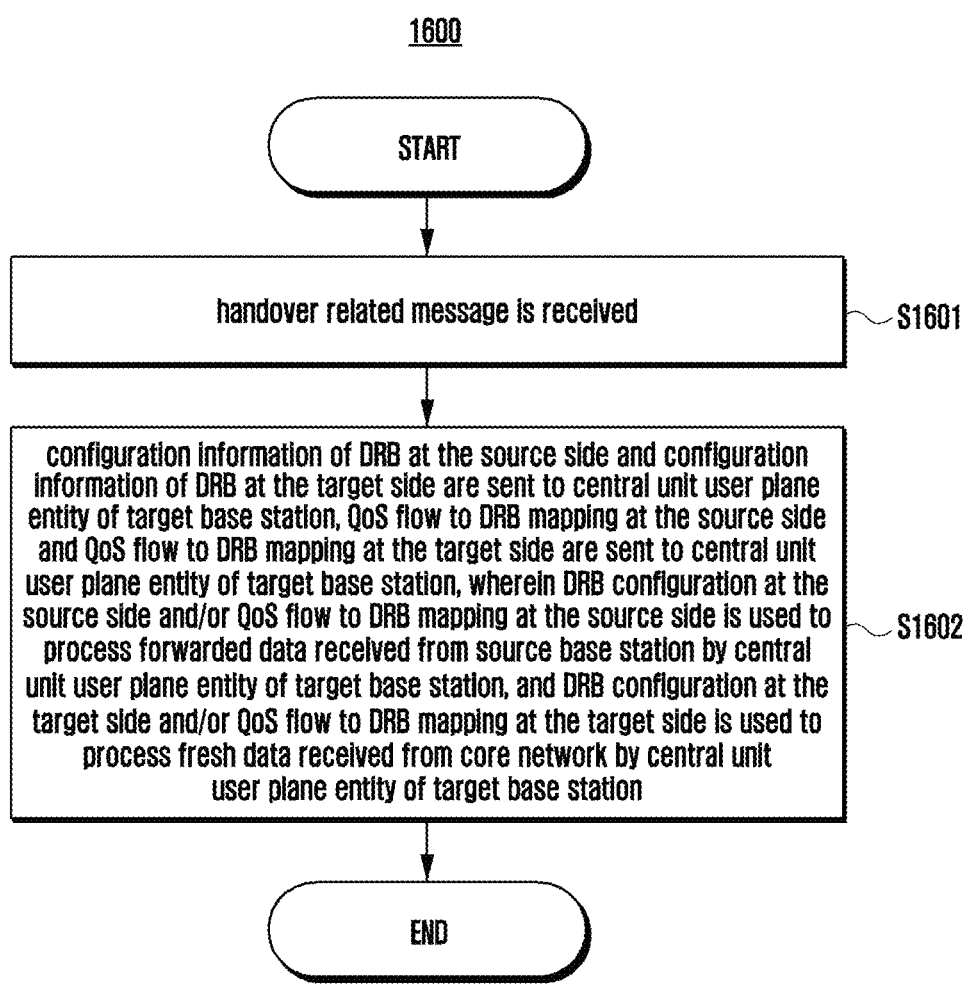
FIG. 16 is an exemplary flowchart showing a method for supporting handover according to an embodiment of the present disclosure.

FIG. 16 is an exemplary flowchart illustrating a method 1600 for supporting handover according to an embodiment of the present disclosure. The method 1600 may be used for the intra-system handover or the inter-system handover, and may be performed at the central unit control plane entity of the target base station. The method includes the following steps.

As shown in FIG. 16, in the method 1600, in step S1601, a handover request message is received.

The central unit control plane entity of the target base station receives the handover request message from the source base station or from the core network. The handover request message received from the source base station is an application layer message over interface between base stations, such as a XnAP message. The handover request message received from the core network is an layer message of the interface over interface between the base station and the core network, such as a NGAP message. The handover request message includes the configuration information of the UE at the source base station, and the configuration information includes a QoS flow to DRB mapping information. The message includes the E-RAB identifier to which a Qos flow maps.

The central unit control plane entity of the target base station determines the DRB configuration at the target side.

The central unit control plane entity of the target base station determines the QoS flow to DRB mapping at the target side. The target base station includes the DRB configuration at the target side and/or the QoS flow to DRB mapping at the target side in the handover command message, and the handover command message is sent to the UE through the source base station.

In step S1602, the configuration information of DRB at the source side and the configuration information of DRB at the target side are sent to the central unit user plane entity of the target base station. And/or, the QoS flow to DRB mapping at the source side and the QoS flow to DRB mapping at the target side are sent to the central unit user plane entity of the target base station. Wherein, the DRB configuration at the source side and/or the QoS flow to DRB mapping at the source side is used to process the forwarded data received from the source base station by the central unit user plane entity of the target base station, and the DRB configuration at the target side and/or the QoS flow to DRB mapping at the target side is used to process the fresh data received from the core network by the central unit user plane entity of the target base station. For the inter-system handover from the 4G system to the 5G system, the configuration information of DRB at the source side may also be the configuration of E-RAB at the source side, and the QoS flow to DRB mapping at the source side is also the Qos flow to E-RAB mapping.

The central unit control plane entity of the target base station may determine to use the same DRB configuration as the source side or the different DRB configuration from the source side. If the central unit control plane entity of the target base station determines to use the same DRB configuration as the source base station, it sends the configuration information of DRB to the central unit user plane entity of the target base station. If the central unit control plane entity of the target base station determines to use different DRB configuration from the source base station, it needs to send the configuration information of DRB at the source side to the central unit user plane entity of the target base station, besides the configuration information of DRB at the target side. The central unit control plane entity of the target base station sends the information to the central unit user plane entity of the target base station through the bearer context setup request message or the bearer context modification request message. The detailed processing for sending is as same as those in step 1502, and details are omitted herein.

As mentioned above, if the central unit control plane entity of the target base station determines to use the same QoS flow to DRB mapping as the source base station, the mapping is sent to the central unit user plane entity of the target base station. The central unit control plane entity of the target base station sends the mapping to the central unit user plane entity of the target base station through the bearer context setup request message or the bearer context modification request message. The central unit control plane entity of the target base station sends the mapping to the central unit user plane entity of the target base station through the Qos flow(s) information to be established which is included in the DRB to be established in the bearer context setup request message or the bearer context modification request message. The DRB to be established is the DRB to be established which is included in the PDU session resource to setup list in the bearer context setup request message, or the DRB to be established which is included in the PDU session resource to setup list (also called as the PDU session resource setup modification list) in the bearer context modification request message. In the case that the handover is from EN-DC to SA and the source secondary base station and the target base station are shared, the central unit control plane entity of the target base station may send the mapping to the central unit user plane entity of the target base station through the Qos flow(s) information to be established which is included in the DRB to be established in the bearer context modification request message.

If the central unit control plane entity of the target base station determines to use a different QoS flow to DRB mapping from the source base station, in order to ensure the data lossless during the handover process, the central unit control plane entity of the target base station may determine to temporarily configure the same Qos flow to DRB mapping as the source base station to process the data forwarded by the source base station. The target DRB configuration and the Qos Flow to DRB mapping at the target side determined by the central unit control plane entity of the target base station are used by the central unit user plane entity of the target base station to process the fresh data received from the core network.

The central unit control plane entity of the target base station sends the QoS flow to DRB mapping at the source side and the QoS flow to DRB mapping at the target side to the central unit user plane entity of the target base station. The QoS flow information to be established at the target side and/or the QoS flow information to be established at the source side are included in the DRB information to be established sent by the central unit control plane entity of the target base station to the central unit user plane entity of the target base station. The QoS flow information to be established at the target side includes one or more target QoS flows mapped to the DRB at the target side. The QoS flow information to be established at the source side includes one or more source QoS flows mapped to the DRB at the source side. If only the QoS flow information to be established by the source side is included in the DRB information to be established, it means that the DRB is only used to process the data forwarded from the source base station, and the corresponding DRB is not used by the target side, the DRB may be released after the central unit user plane entity of the target base station receives the end marker packet.

The existing QoS flow information to be established in the DRB information to be established in a message over the interface between the central unit control plane entity of the base station and the central unit user plane entity of the base station may be used to indicate the QoS flow information to be established at the target side. A new information element (IE) (such as QoS flow information to be established at the source side or old QoS flow information to be established) is used to indicate the mapping information of the source or the QoS flow information to be established at the source side. The existing QoS flow information to be established in the DRB information to be established is a mandatory field. In order to indicate that a DRB is an old DRB at the source side, which would not be used by the target side, the DRB information to be established requires to include only the Qos flow information to be established at the source side or the old Qos flow information to be established, namely the information on Qos flow mapped to the DRB at the source side. To settle such situation, detailed processing is same as those in step 1502 and details are omitted.

The existing QoS flow information to be established in the DRB information to be established in a message over the interface between the central unit control plane entity of the base station and the central unit user plane entity of the base station may be used to indicate the QoS flow information to be established at the source side, so that a new information element (IE) (such as QoS flow information to be established at the target side or new QoS flow information to be established) is used to indicate the mapping information of the target or the QoS flow information to be established at the target side. The existing QoS flow information to be established in the DRB information to be established is a mandatory field. In order to indicate that a DRB is a DRB at the target side, the DRB information to be established requires to include only the Qos flow information to be established at the target side or the new Qos flow information to be established, namely the information on Qos flow mapped to the DRB at the target side. To settle such situation, detailed processing is same as those in step 1502 and details are omitted.

The target flow mapping information and/or the source flow mapping information is included in the DRB information to be modified sent by the central unit control plane entity of the target base station to the central unit user plane entity of the target base station. The target flow mapping information includes one or more Qos flows mapped to the DRB at the source side. The source flow mapping information includes one or more QoS flows mapped to the DRB at the source side. If only the flow mapping information at the source side is included in the DRB information to be modified, it means that the DRB is only used to process the data forwarded from the source base station, and the target side does not use the corresponding DRB, and the DRB may be released after the end marker packet is received by the central unit user plane entity of the target base station.

The existing flow mapping information in the DRB information to be modified in an interface message of the central unit control plane entity of the base station and the central unit user plane entity of the base station may be used to indicate the Qos flow(s) mapped to the DRB at the target side. A new information element (IE) (such as the source flow mapping information or old flow mapping information) is used to indicate the Qos flow(s) mapped to the DRB at the source side.

The existing flow mapping information in the DRB information to be modified in a message over the interface between the central unit control plane entity of the base station and the central unit user plane entity of the base station may be used to indicate the Qos flow(s) mapped to the DRB at the source side. A new information element (IE) (such as the target flow mapping information or new flow mapping information) is used to indicate the Qos flow(s) mapped to the DRB at the target side.

The central unit control plane entity of the target base station may send the above information to the central unit user plane entity of the target base station by using a bearer context setup request or a bearer context modification request message or other messages. The DRB to be established is the DRB to be established which is included in the PDU session resource setup list in the bearer context setup request message or the DRB to be established which is included in the PDU session resource setup list (also called as the PDU session resource setup modification list) in the bearer context modification request message. In the case that the handover is from EN-DC to SA and the source secondary base station and the target base station are shared, the central unit control plane entity of the target base station may send the above information to the central unit user plane entity of the target base station through the DRB to be established in the bearer context modification request message.

So far, the method 1600 for supporting handover of the present disclosure has been described. This method may ensure the correct processing of the target base station central unit control plane and the central unit user plane entity of the target base station when the target base station uses a different QoS flow to DRB mapping from the source base station, thereby avoiding unnecessary data sending and resource waste, improving the efficiency of data forwarding, and improving the reliability of data forwarding during handover.

Figure 17:
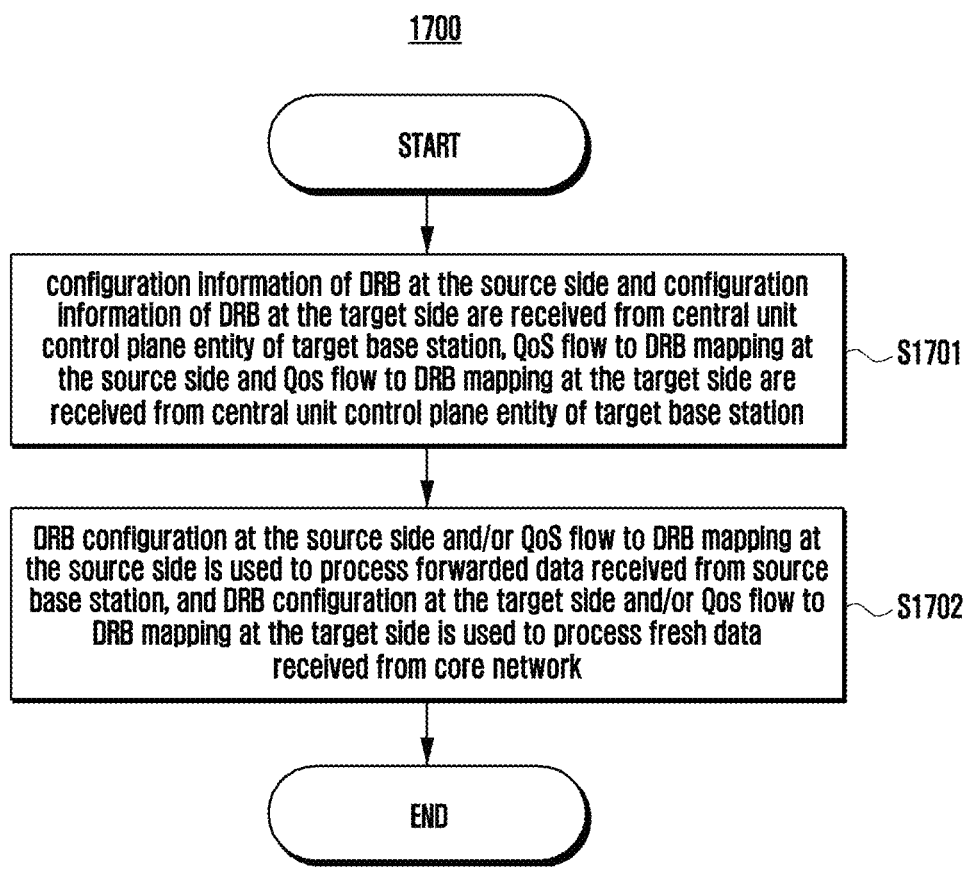
FIG. 17 is an exemplary flowchart showing a method for supporting handover according to an embodiment of the present disclosure.

FIG. 17 is an exemplary flowchart illustrating a method 1700 for supporting handover according to an embodiment of the present disclosure. The method 1700 may be used for the intra-system handover or the inter-system handover, and may be performed on the central unit user plane entity of the source base station. The method includes the following steps.

As shown in FIG. 17, in the method 1700, in step S1701, the configuration information of DRB at the source side and the configuration information of DRB at the target side are received from the central unit control plane entity of the target base station. And/or, the QoS flow to DRB mapping at the source side and the QoS flow to DRB mapping at the target side are received from the central unit control plane entity of the target base station.

In step S1702, the DRB configuration at the source side and/or the QoS flow to DRB mapping at the source side is used to process the forwarded data received from the source base station, and the DRB configuration at the target side and/or the QoS flow to DRB mapping at the target side is used to process the fresh data received from the core network.

Regarding the similar steps between the method 1700 and the method 1500 or the method 1600, details are omitted.

So far, the method 1700 for supporting handover of the present disclosure has been described. This method may ensure the correct processing of the target base station central unit control plane and the central unit user plane entity of the target base station when the target base station uses a different QoS flow to DRB mapping from the source base station, thereby avoiding unnecessary data sending and resource waste, improving the efficiency of data forwarding, and improving the reliability of data forwarding during handover.

Figure 18:
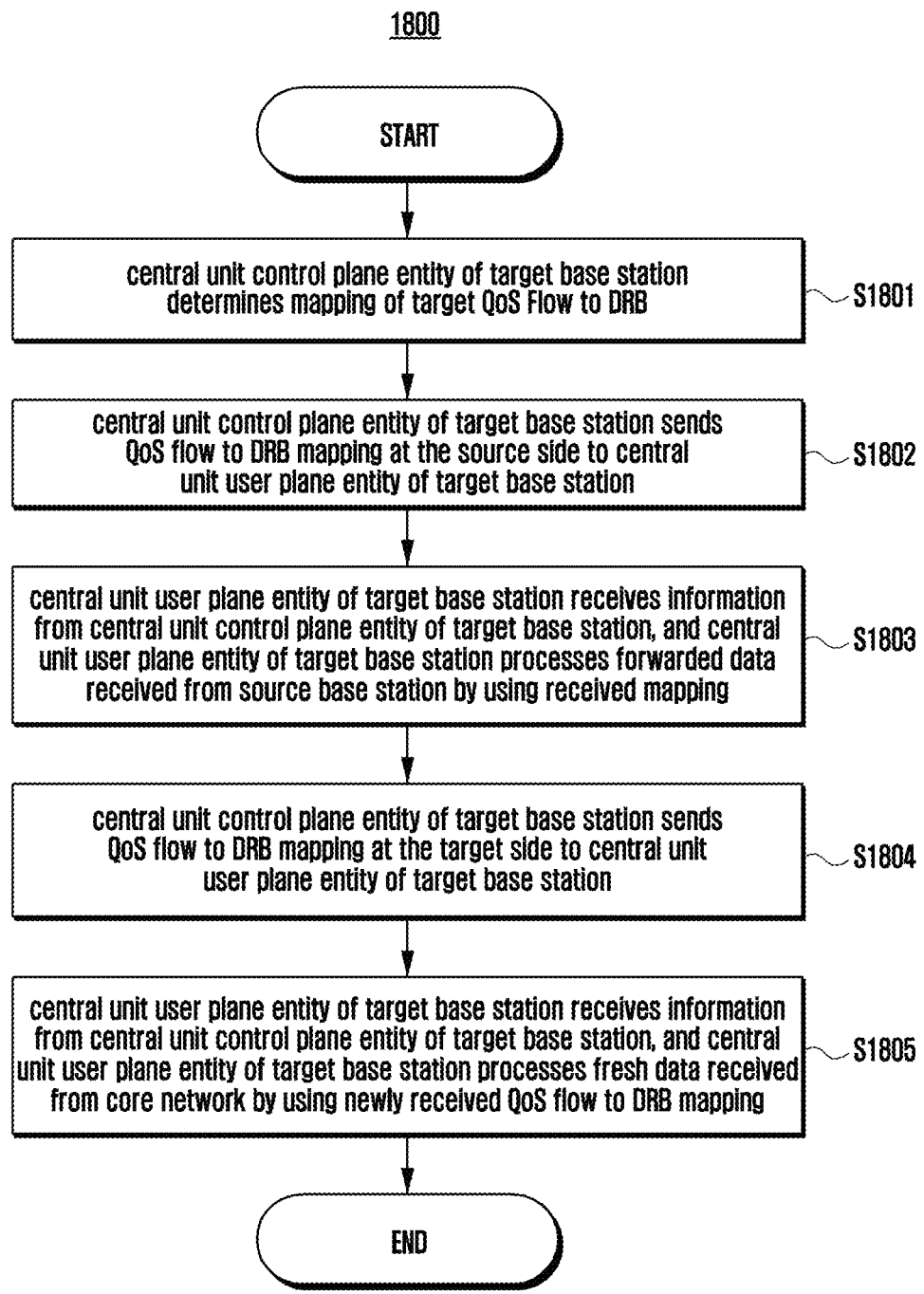
FIG. 18 shows an exemplary flowchart of a method for supporting handover according to an embodiment of the present disclosure.

FIG. 18 shows an exemplary flowchart of a method 1800 for supporting handover according to an embodiment of the present disclosure. The method 1800 may be used for the intra-system handover or the inter-system handover. The method includes the following steps.

In step S1801, the central unit control plane entity of the target base station receives a handover request message from the source base station or from the core network. The handover request message received from the source base station is an application layer message over the interface between base stations, such as a XnAP message. The handover request message received from the core network is an application layer message of the interface between the base station and the core network, such as a NGAP message. The handover request message includes the configuration information of the UE at the source base station, and the configuration information includes the DRB configuration information and/or the QoS flow to DRB mapping.

The central unit control plane entity of the target base station determines the target DRB configuration information and/or the QoS flow to DRB mapping at the target side.

The central unit control plane entity of the target base station may determine to use the same DRB configuration as the source or a different DRB configuration.

If the central unit control plane entity of the target base station determines to use the same DRB configuration and the same QoS flow to DRB mapping as the source base station, the information is sent to the central unit user plane entity of the target base station through the DRB to be established and the Qos flow information to be established on the DRB. The central unit control plane entity of the target base station sends the information to the central unit user plane entity of the target base station through the bearer context setup request message. The central unit control plane entity of the target base station sends the mapping to the central unit user plane entity of the target base station through the Qos flow information to be established included in the DRB to be established in the bearer context setup request message.

If the central unit control plane entity of the target base station determines to use the same QoS flow to DRB mapping as the source base station, the mapping is sent to the central unit user plane entity of the target base station. The central unit control plane entity of the target base station sends the mapping to the central unit user plane entity of the target base station through the bearer context setup request message. The central unit control plane entity of the target base station sends the mapping to the central unit user plane entity of the target base station through the Qos flow(s) information to be established included in the DRB to be established in the bearer context setup request message.

If the central unit control plane entity of the target base station determines to use a different DRB configuration and/or a different QoS flow to DRB mapping from the source base station, in order to ensure the data lossless during the handover process, the central unit control plane entity of the target base station may determine to temporarily configure the same DRB and/or the same QoS flow to DRB mapping as the source base station to process the data forwarded by the source base station. The target DRB configuration and the QoS flow to DRB mapping at the target side determined by the central unit control plane entity of the target base station are used by the central unit user plane entity of the target base station to process the fresh data received from the core network.

There are two methods for notifying the UE of the mapping in the present disclosure. One method is that the central unit control plane entity of the target base station directly includes the target DRB configuration and/or the QoS flow to DRB mapping at the target side in the handover command message, which is sent to the UE by the source base station. Another method is that the central unit control plane entity of the target base station includes the source DRB configuration and/or the QoS flow to DRB mapping at the source side in the handover command message, which is sent to the UE by the source base station. Afterwards, the central unit control plane entity of the target base station sends a radio resource control (RRC) reconfiguration message to the UE, which includes the DRB configuration and/or the Qos Flow to DRB mapping determined at the target side. When the central unit user plane entity of the target base station receives the end marker, the central unit user plane entity of the target base station sends an indication message to the central unit control plane entity of the target base station, and the central unit control plane entity of the target base station sends the DRB configuration and/or the QoS flow to DRB mapping determined at the target side to the UE through the RRC reconfiguration message.

In step S1802, the central unit control plane entity of the target base station sends the source DRB configuration and/or the QoS flow to DRB mapping at the source side to the central unit user plane entity of the target base station. The QoS flow information to be established is included in the DRB information to be established which is sent from the central unit control plane entity of the target base station to the central unit user plane entity of the target base station, and the QoS flow information to be established included in the DRB information to be established is set according to the QoS flow to DRB mapping at the source side. The DRB configuration to be established is the configuration at the source side. The central unit control plane entity of the target base station may send the information to the central unit user plane entity of the target base station through the bearer context setup request message or other messages.

In step S1803, the central unit user plane entity of the target base station receives the information described in step S1802 from the central unit control plane entity of the target base station. The central unit user plane entity of the target base station saves the received information.

For the DRB requesting data forwarding, the central unit user plane entity of the target base station assigns the tunnel information for data forwarding and sends it to the central unit control plane entity of the target base station.

There are two methods for the interaction between the central unit control plane entity of the target base station and the gNB-DU:

Method 1: The central unit control plane entity of the target base station sends a UE context setup request message to the target base station distribution unit (hereinafter referred to as gNB-DU simply). The message includes the source DRB configuration. For the source DRB, the DRB to be established includes the Qos flow(s) mapped to the DRB at the source side. If the target uses the same DRB configuration and the same QoS flow to DRB mapping as the source, the DRB to be established includes the Qos flow(s) mapped to the DRB. If the target uses the same DRB configuration as the source and a different QoS flow to DRB mapping, the DRB to be established may include the Qos flow(s) mapped to the DRB at the source side. The gNB-DU assigns the downlink transport layer address and the tunnel identifier to each DRB to be established. The gNB-DU sends a UE context setup response message to the central unit control plane entity of the target base station, which includes the downlink transport layer address and the tunnel identifier assigned to each DRB by the gNB-DU. The central unit control plane entity of the base station sends the downlink transport layer address and tunnel identifier assigned to each DRB by the gNB-DU to the central unit user plane entity of the target base station.

Method 2: The central unit control plane entity of the target base station sends a UE context setup request message to the target base station distribution unit (hereinafter referred to as gNB-DU simply). The message includes the source DRB configuration and the DRB configuration determined at the target. For the source DRB, the DRB to be established includes the Qos flow(s) mapped to the DRB at the source side. For the new DRB determined at the target, the DRB to be established includes the Qos flow(s) mapped to the DRB determined by the central unit control plane entity of the target base station. If the target uses the same DRB configuration and the same QoS flow to DRB mapping as the source, the DRB to be established includes the Qos flow(s) mapped to the DRB. If the target uses the same DRB configuration as the source and a different QoS flow to DRB mapping, the DRB to be established may include the QoS flow(s) mapped to the DRB at the source side and/or the Qos flow(s) mapped to the DRB at the target side. The gNB-DU assigns the downlink transport layer address and tunnel identifier to each DRB to be established. The gNB-DU sends a UE context setup response message to the central unit control plane entity of the target base station, which includes the downlink transport layer address and the tunnel identifier assigned to each DRB by the gNB-DU. The central unit control plane entity of the base station sends the downlink transport layer address and the tunnel identifier assigned to each DRB by the gNB-DU to the central unit user plane entity of the target base station. The central unit user plane entity of the target base station receives the data forwarded from the source base station, and the central unit user plane entity of the target base station process the forwarded data received from the source base station by using the received QoS flow to DRB mapping.

The target base station may send indication information on the end of forwarding data to the central unit control plane entity of the target base station after receiving the end marker.

In step S1804, the central unit control plane entity of the target base station sends the target DRB configuration and/or the QoS flow to DRB mapping at the target side to the central unit user plane entity of the target base station.

The QoS flow information to be established is included in the DRB information to be established sent by the central unit control plane entity of the target base station to the central unit user plane entity of the target base station, and the QoS flow information to be established which is included in the DRB information to be established is set according to the QoS flow to DRB mapping at the target side. The DRB configuration to be established is the configuration of the target side. The target flow mapping information is included in the DRB information to be modified sent to the central unit user plane entity of the target base station by the central unit control plane entity of the target base station. The target flow mapping information includes one or more target Qos flows mapped to the DRB. The central unit control plane entity of the target base station may send the information to the central unit user plane entity of the target base station through the bearer context modification request or the bearer context setup request message or other messages.

For the method in which the central unit user plane entity of the target base station sends the indication information of the end of forwarding data to the central unit control plane entity of the target base station after receiving the end marker, the central unit control plane entity of the target base station sends the target DRB configuration and/or the QoS flow to DRB mapping at the target side to the central unit user plane entity of the target base station. The central unit control plane entity of the target base station sends a RRC reconfiguration message to the UE, and sends the DRB configuration and/or QoS flow to DRB mapping determined by the target side to the UE.

The central unit user plane entity of the target base station deletes the DRB information used at the source side but not used at the target side.

For the Method 1 for the interaction between the central unit control plane entity of the target base station and the gNB-DU, the central unit control plane entity of the target base station sends a UE context modification request message to the target gNB-DU. The message includes the DRB configuration determined at the target. For the new DRB determined at the target, the DRB to be established includes the Qos flow(s) mapped to the DRB determined by the central unit control plane entity of the target base station. If the target uses the same DRB configuration as the source and a different QoS flow to DRB mapping, the DRB to be modified may include the Qos flow(s) mapped to the DRB at the target side. The gNB-DU assigns the downlink transport layer address and the tunnel identifier to each DRB to be established. The gNB-DU releases the old DRB configuration, which is the DRB at the source side and configured at the source side to process the forwarded data. The gNB-DU sends a UE context modification response message to the central unit control plane entity of the target base station, which includes the downlink transport layer address and the tunnel identifier assigned to each DRB by the gNB-DU. The central unit control plane entity of the base station sends the downlink transport layer address and the tunnel identifier assigned to each DRB by the gNB-DU to the central unit user plane entity of the target base station.

For the Method 2 of interaction between the central unit control plane entity of the target base station and the gNB-DU, the release process of the old DRB on the gNB-DU is as described in the method in FIG. 23 or in the following method. The old DRB is the source DRB and is configurated at the source side to process the forwarded data.

If no fresh data is received on one DRB within a certain period of time, the gNB-DU sends a UE context modification request message to the central unit control plane entity of the target base station. The message includes an identification that the DRB needs to be released. After receiving the message, the central unit control plane entity of the target base station may release the old DRB.

In step S1805, the central unit user plane entity of the target base station receives the information described in step S1804 from the central unit control plane entity of the target base station, and the central unit user plane entity of the target base station processes the fresh data received from the core network by using the newly received QoS flow to DRB mapping and sends it to the UE through the gNB-DU.

So far, the method 1800 for supporting handover of the present disclosure has been described. This method may ensure the correct processing of the target base station central unit control plane and the central unit user plane entity of the target base station as well as the gNB-DU when the target base station uses a different DRB configuration and/or a different QoS flow to DRB mapping from the source base station, thereby avoiding unnecessary data sending and resource waste, improving the efficiency of data forwarding, and improving the reliability of data forwarding during handover.

Figure 19:
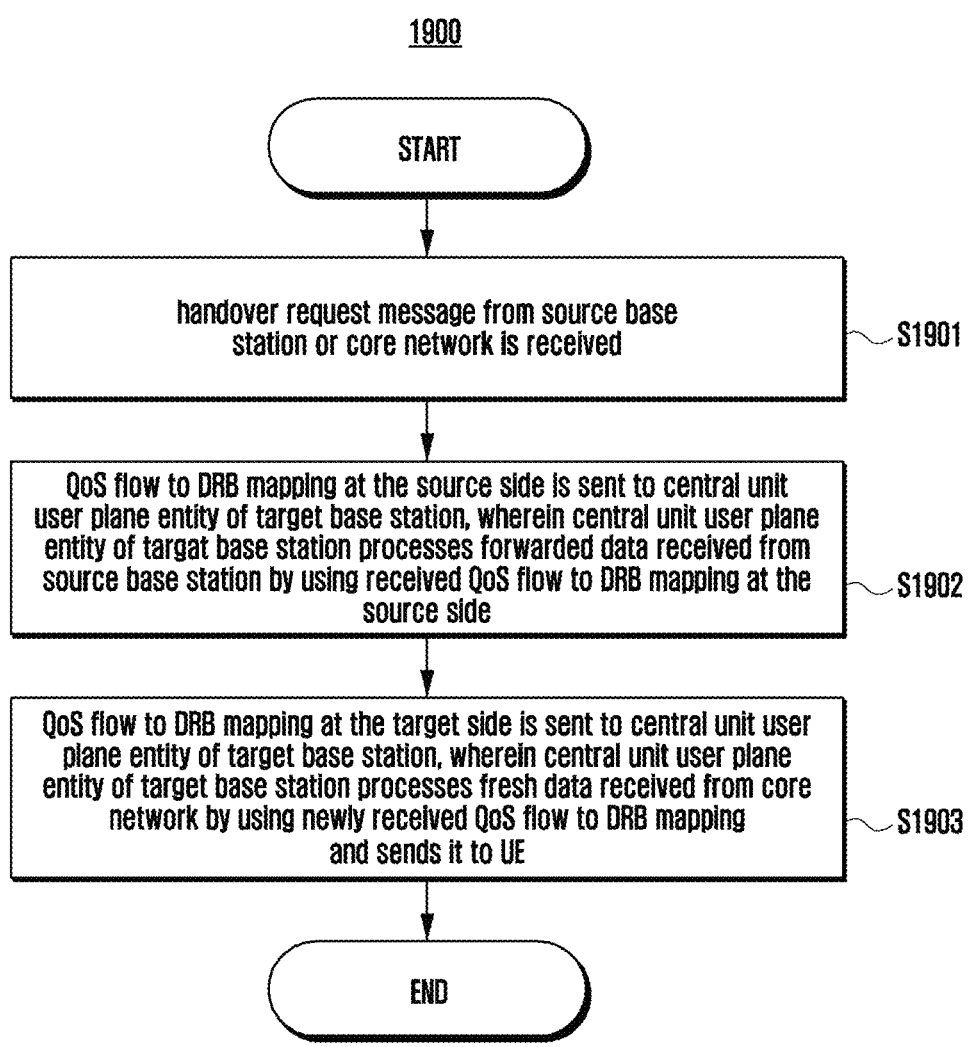
FIG. 19 is an exemplary flowchart showing a method for supporting handover according to an embodiment of the present disclosure.

FIG. 19 is an exemplary flowchart illustrating a method 1900 for supporting handover according to an embodiment of the present disclosure. The method 1900 may be used for the intra-system handover or the inter-system handover, and may be performed at the central unit control plane entity of the target base station. The method includes the following steps.

As shown in FIG. 19, in method 1900, in step S1901, a handover request message from a source base station or a core network is received.

In step S1902, the QoS flow to DRB mapping at the source side is sent to the central unit user plane entity of the target base station, wherein the central unit user plane entity of the target base station processes the forwarded data received from the source base station by using the received QoS flow to DRB mapping.

In step S1903, the QoS flow to DRB mapping at the target side is sent to the user plane entity of the base station central unit, wherein the central unit user plane entity of the target base station processes the fresh data received from the core network by using the newly received QoS flow to DRB mapping and sends it to the UE.

The method 1900 is similar to the method 1800, and the repetitions are omitted.

So far, the method 1900 for supporting handover of the present disclosure has been described. This method may ensure the correct processing of the target base station central unit control plane and the target base station central unit user plane when the target base station uses a different QoS flow to DRB mapping from the source base station, thereby avoiding unnecessary data sending and resource waste, improving the efficiency of data forwarding, and improving the reliability of data forwarding during handover.

Figure 20:
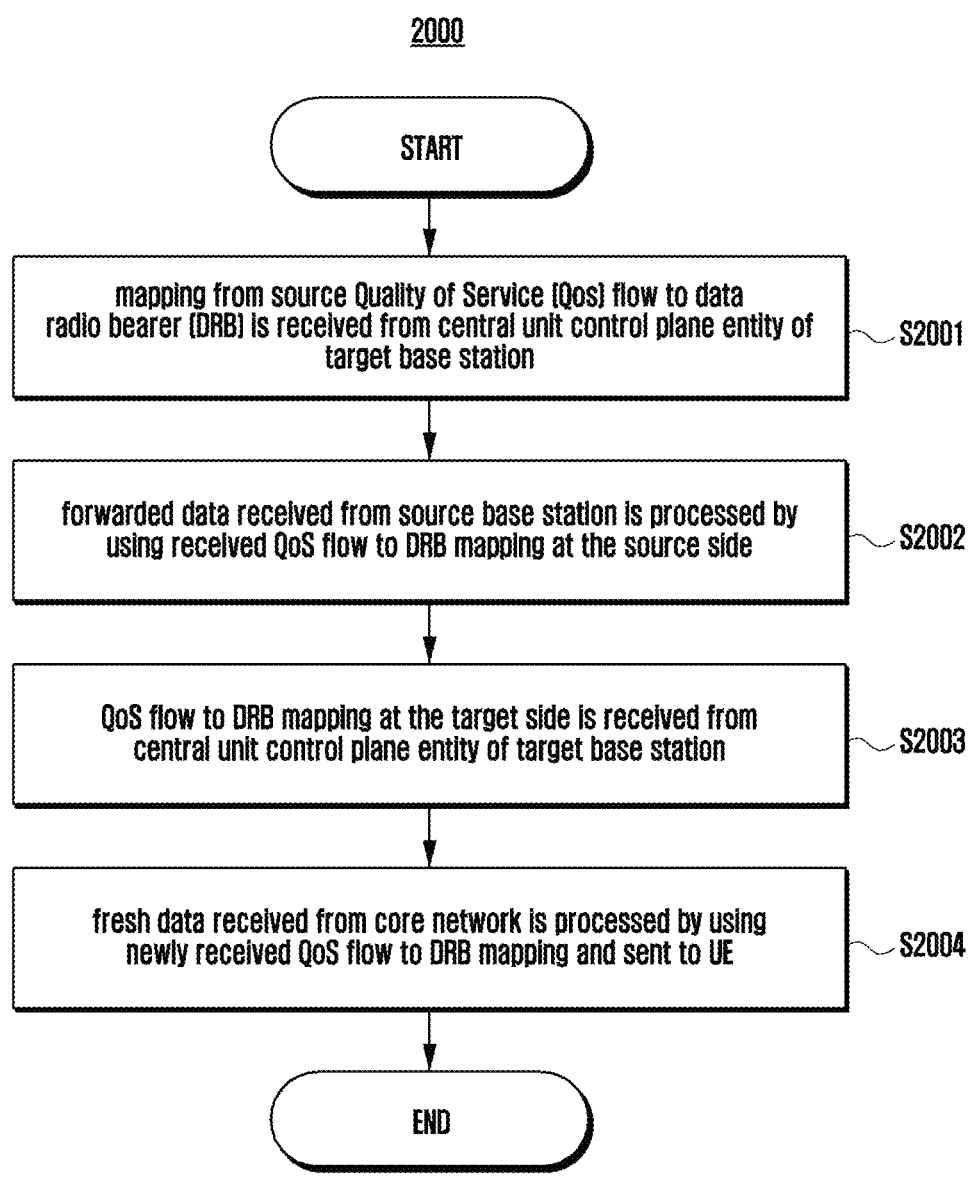
FIG. 20 is an exemplary flowchart showing a method for supporting handover according to an embodiment of the present disclosure.

FIG. 20 is an exemplary flowchart illustrating a method 2000 for supporting handover according to an embodiment of the present disclosure. The method 2000 may be used for the intra-system handover or the inter-system handover, and may be performed at the central unit user plane entity of the target base station. The method includes the following steps.

As shown in FIG. 20, in the method 2000, in step S2001, the QoS flow to DRB mapping at the source side is received from the central unit control plane entity of the target base station.

In step S2002, the forwarded data received from the source base station is processed by using the received QoS flow to DRB mapping at the source side.

In step S2003, the QoS flow to DRB mapping at the target side is received from the central unit control plane entity of the target base station.

In step S2004, the fresh data received from the core network is processed by using the newly received QoS flow to DRB mapping and sent to the UE.

The method 2000 is similar to the method 1800 and the method 1900, and the repetitions are omitted.

So far, the method 2000 for supporting handover of the present disclosure has been described. This method may ensure the correct processing of the target base station central unit control plane and the central unit user plane entity of the target base station when the target base station uses a different QoS flow to DRB mapping from the source base station, thereby avoiding unnecessary data sending and resource waste, improving the efficiency of data forwarding, and improving the reliability of data forwarding during handover.

Figure 21:
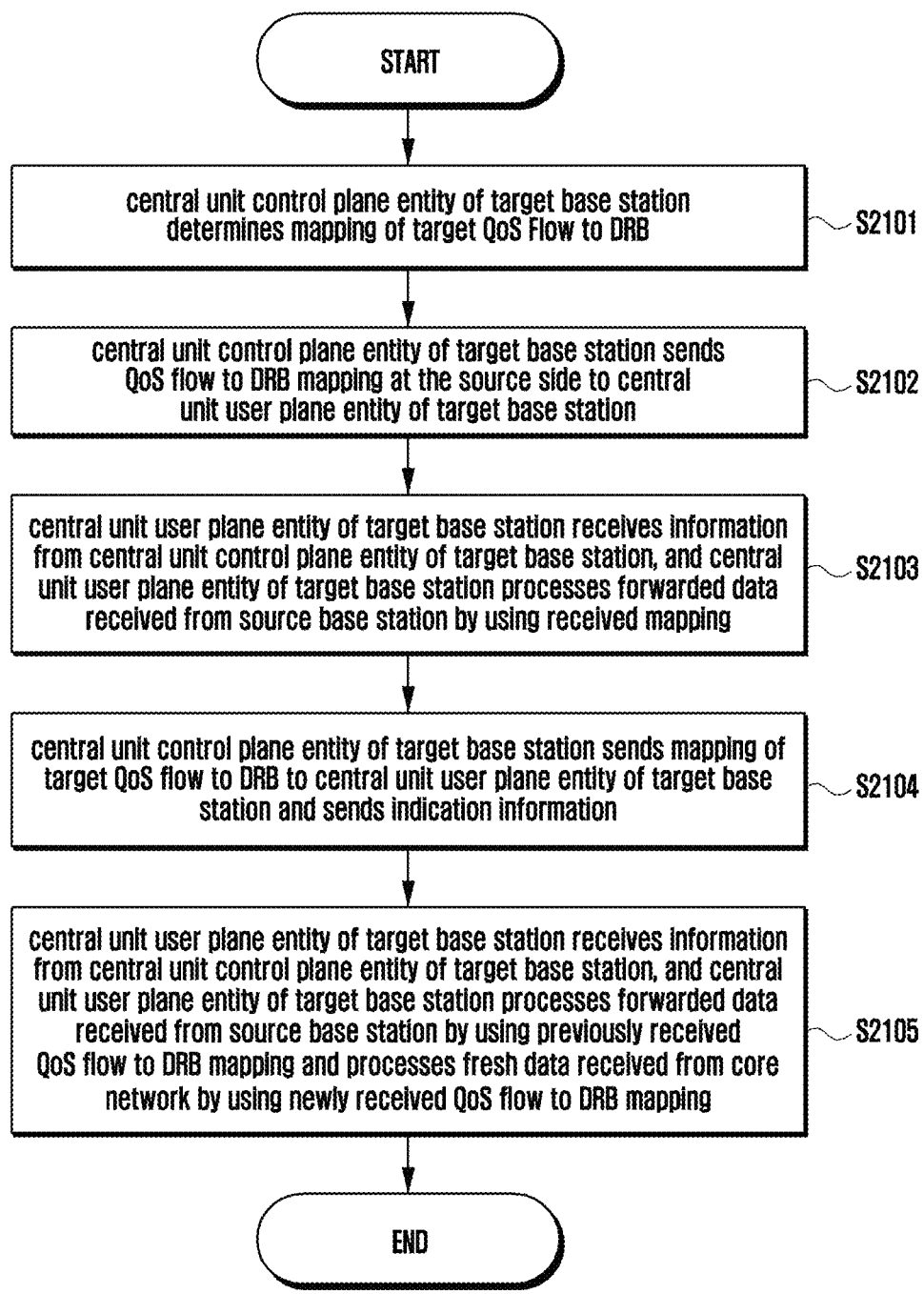
FIG. 21 shows an exemplary flowchart of a method for supporting handover according to an embodiment of the present disclosure.

FIG. 21 shows an exemplary flowchart of a method 2100 for supporting handover according to an embodiment of the present disclosure. The method 2100 may be used for the intra-system handover or the inter-system handover. The method includes the following steps.

In step S2101, the central unit control plane entity of the target base station receives a handover request message from the source base station or the core network. The handover request message received from the source base station is an application layer message over the interface between base stations, such as a XnAP message. The handover request message received from the core network is an application layer message of the interface between the base station and the core network, such as an NGAP message. The handover request message includes configuration information of the UE at the source base station, which includes the DRB configuration information and/or the QoS flow to DRB mapping.

The central unit control plane entity of the target base station determines the DRB configuration information and/or the Qos Flow to DRB mapping at the target side.

There are two methods for notifying the UE of the mapping in the present disclosure. One method is that the central unit control plane entity of the target base station directly includes the target DRB configuration information and/or the QoS flow to DRB mapping at the target side in the handover command message, which is sent to the UE by the source base station. Another method is that the central unit control plane entity of the target base station includes the source DRB configuration information and/or the QoS flow to DRB mapping at the source side in the handover command message, which is sent to the UE by the source base station. Afterwards, the central unit control plane entity of the target base station sends a radio resource control (RRC) reconfiguration message to the UE, which includes the target DRB configuration information and/or the QoS flow to DRB mapping at the target side determined by the target side. The central unit control plane entity of the target base station may determine when to send the RRC reconfiguration message to the UE according to the implementation.

Step S2102 is the same as step S1802 and the repetitions are omitted.

In step S2103, the central unit user plane entity of the target base station receives the information from the central unit control plane entity of the target base station. The central unit user plane entity of the target base station saves the received information.

For the DRB requesting data forwarding, the central unit user plane entity of the target base station assigns the tunnel information for data forwarding and sends it to the central unit control plane entity of the target base station.

The method for the interaction between the central unit control plane entity of the target base station and the gNB-DU is the same as that described in step 1803, and details are omitted.

The central unit user plane entity of the target base station receives the data forwarded from the source base station, and the central unit user plane entity of the target base station processes the forwarded data received from the source base station by using the received mapping.

In step S2104, the central unit control plane entity of the target base station sends the target DRB configuration and/or the QoS flow to DRB mapping at the target side to the central unit user plane entity of the target base station and sends the indication information.

The QoS flow information to be established is included in the DRB information to be established which is sent from the central unit control plane entity of the target base station to the central unit user plane entity of the target base station.

The QoS flow information to be established included in the DRB information to be established is set according to the QoS flow to DRB mapping at the target side. The target flow mapping information is included in the DRB information to be modified sent to the central unit user plane entity of the target base station by the central unit control plane entity of the target base station. The target flow mapping information includes one or more target Qos flows mapped to the DRB. The central unit control plane entity of the target base station may send the information to the central unit user plane entity of the target base station through the bearer context modification request or the bearer context setup request message or other messages.

The central unit control plane entity of the target base station sends an RRC reconfiguration message to the UE, and sends the DRB configuration and/or the QoS flow to DRB mapping determined by the target side to the UE.

In step S2105, the central unit user plane entity of the target base station receives the information of step S2104 from the central unit control plane entity of the target base station, the central unit user plane entity of the target base station does not delete the old mapping at the source side, the central unit user plane entity of the target base station does not delete the DRB that is temporarily used at the source side for processing the forwarded data but is not used at the target side. The central unit user plane entity of the target base station does not delete the old mapping at the source side and/or does not delete the DRB that is temporarily used for processing the forwarded data but is not used at the target side according to the received indication information. The central unit user plane entity of the target base station processes the data received from the source base station by using the received QoS flow to DRB mapping at the source side.

After receiving the end marker, the central unit user plane entity of the target base station deletes the old mapping at the source side and/or deletes the DRB that is temporarily used for processing the forwarded data but is not used at the target side. The central unit user plane entity of the target base station processes the fresh data received from the core network by using the newly received QoS flow to DRB mapping. The central unit user plane entity of the target base station sends the data received from the core network to the UE through the gNB-DU.

The release process of the old DRB on the gNB-DU is as described in the method in FIG. 25 or as follows. The old DRB is the DRB at the source side and is configured at the source side to process the forwarded data.

If no fresh data is received on one DRB within a certain period of time, the gNB-DU sends a UE context modification request message to the central unit control plane entity of the target base station. The message includes the identification that the DRB needs to be released. After receiving the message, the central unit control plane entity of the target base station may release the old DRB.

So far, the method 2100 for supporting handover of the present disclosure has been described. This method may ensure the correct processing of the target base station central unit control plane and the central unit user plane entity of the target base station as well as the gNB-DU when the target base station uses a different DRB configuration and/or a different QoS flow to DRB mapping from the source base station, thereby avoiding unnecessary data sending and resource waste, improving the efficiency of data forwarding, and improving the reliability of data forwarding during handover.

Figure 22:
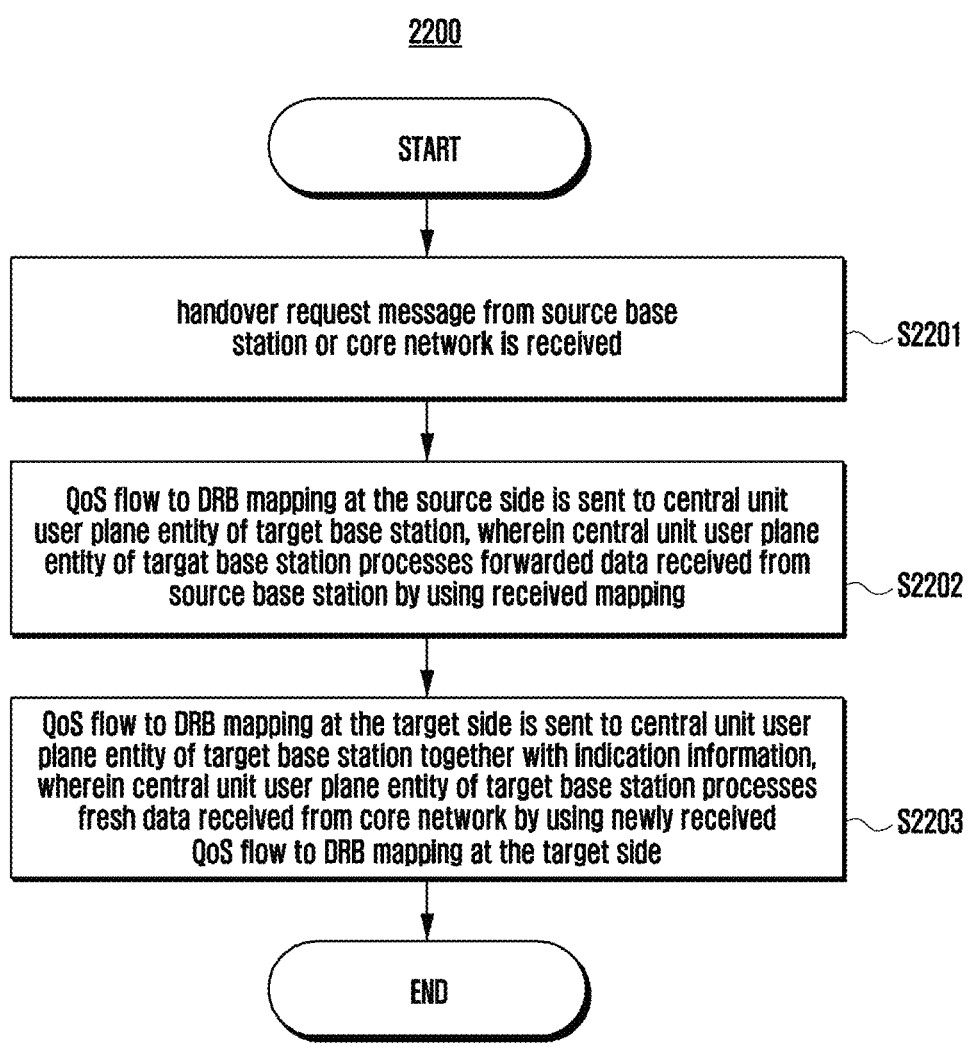
FIG. 22 is an exemplary flowchart showing a method for supporting handover according to an embodiment of the present disclosure.

FIG. 22 is an exemplary flowchart illustrating a method 2200 for supporting handover according to an embodiment of the present disclosure. The method 2200 may be used for the intra-system handover or the inter-system handover, and may be performed at the central unit control plane entity of the target base station. The method includes the following steps.

As shown in FIG. 22, in the method 2200, in step S2201, a handover request message from the source base station or the core network is received.

In step S2202, the QoS flow to DRB mapping at the source side is sent to the central unit user plane entity of the target base station, wherein the central unit user plane entity of the target base station processes the forwarded data received from the source base station by using the received mapping.

In step S2203, the QoS flow to DRB mapping at the target side is sent to the central unit user plane entity of the target base station and the indication information is sent. The user plane entity of the base station central unit processes the fresh data received from the core network by using the newly received QoS flow to DRB mapping at the target side.

The method 2200 is similar to the method 2100, and the repetitions are omitted.

So far, the method 2200 for supporting handover of the present disclosure has been described. This method may ensure the correct processing of the target base station central unit control plane and the central unit user plane entity of the target base station when the target base station uses a different QoS flow to DRB mapping from the source base station, thereby avoiding unnecessary data sending and resource waste, improving the efficiency of data forwarding, and improving the reliability of data forwarding during handover.

Figure 23:
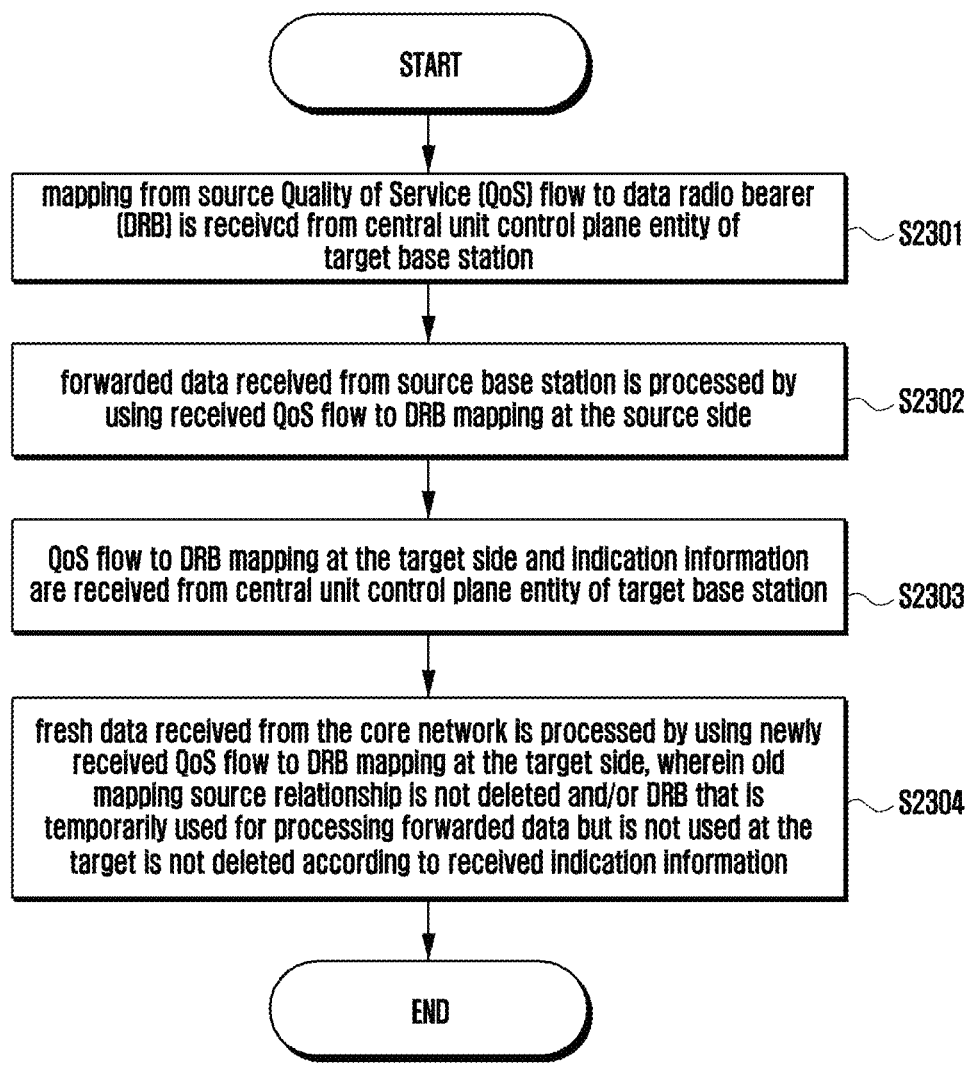
FIG. 23 is an exemplary flowchart showing a method for supporting handover according to an embodiment of the present disclosure.

FIG. 23 is an exemplary flowchart illustrating a method 2300 for supporting handover according to an embodiment of the present disclosure. The method 2300 may be used for the intra-system handover or the inter-system handover, and may be performed at the central unit user plane entity of the target base station. The method includes the following steps.

As shown in FIG. 23, in the method 2300, in step S2301, the QoS flow to DRB mapping at the source side is received from the central unit control plane entity of the target base station.

In step S2302, the received QoS flow to DRB mapping at the source side is used to process the forwarded data received from the source base station.

In step S2303, the QoS flow to DRB mapping at the target side and the indication information are received from the central unit control plane entity of the target base station.

In step S2304, the newly received QoS flow to DRB mapping at the target side is used to process the fresh data received from the core network, wherein the old mapping at the source side is not deleted and/or the DRB that is temporarily used for processing the forwarded data but is not used at the target side is not deleted according to the received indication information.

The method 2300 is similar to the method 2100 and the method 2200, and the repetitions are omitted.

So far, the method 2300 for supporting handover of the present disclosure has been described. This method may ensure the correct processing of the target base station central unit control plane and the central unit user plane entity of the target base station when the target base station uses a different QoS flow to DRB mapping from the source base station, thereby avoiding unnecessary data sending and resource waste, improving the efficiency of data forwarding, and improving the reliability of data forwarding during handover.

FIG. 24 shows an exemplary flowchart of a method 2400 for supporting handover according to an embodiment of the present disclosure. The method 2400 may be used for the intra-system handover or the inter-system handover. The method includes the following steps.

In step S2401, the central unit control plane entity of the target base station receives a handover request message from the source base station or the core network. The handover request message received from the source base station is an application layer message over the interface between base stations, such as a XnAP message. The handover request message received from the core network is an application layer message of the interface between the base station and the core network, such as a NGAP message. The handover request message includes configuration information of the UE at the source base station, and the configuration information includes DRB configuration information and/or the QoS flow to DRB mapping.

The central unit control plane entity of the target base station determines the target DRB configuration information and/or the QoS flow to DRB mapping at the target side.

There are two methods for notifying the UE of the mapping in the present disclosure. One method is that the central unit control plane entity of the target base station directly includes the target DRB configuration information and/or the QoS flow to DRB mapping at the target side in the handover command message, which is sent to the UE by the source base station. Another method is that the central unit control plane entity of the target base station includes source DRB configuration information and/or the QoS flow to DRB mapping at the source side in the handover command message, which is sent to the UE by the source base station. Afterwards, the central unit control plane entity of the target base station sends a radio resource control (RRC) reconfiguration message to the UE, which includes the target DRB configuration information and/or the QoS flow to DRB mapping at the target side determined by the target side. The central unit control plane entity of the target base station may determine when to send the RRC reconfiguration message to the UE according to the implementation.

Step S2402 is the same as step S1802, and details are omitted.

In step S2403, the central unit user plane entity of the target base station receives the information from the central unit control plane entity of the target base station. The central unit user plane entity of the target base station saves the received information.

For the DRB requesting data forwarding, the central unit user plane entity of the target base station assigns tunnel information for data forwarding and sends it to the central unit control plane entity of the target base station.

The method for the interaction between the central unit control plane entity of the target base station and the gNB-DU is the same as that described in step S1803, and details are omitted.

The central unit user plane entity of the target base station receives the data forwarded from the source base station, and the central unit user plane entity of the target base station processes the forwarded data received from the source base station by using the received mapping.

In step S2404, the central unit control plane entity of the target base station sends the target DRB configuration and/or the mapping of the target Qos flow to DRB to the central unit user plane entity of the target base station.

The QoS flow information to be established is included in the DRB information to be established sent by the central unit control plane entity of the target base station to the central unit user plane entity of the target base station, and the QoS flow information to be established included in the DRB information to be established is set according to the QoS flow to DRB mapping at the target side. The target flow mapping information is included in the DRB information to be modified sent to the central unit user plane entity of the target base station by the central unit control plane entity of the target base station. The target flow mapping information includes one or more Qos flows mapped to the DRB at the target side. The central unit control plane entity of the target base station may send the information to the central unit user plane entity of the target base station through the bearer context modification request or the bearer context setup request message or other messages.

The central unit control plane entity of the target base station sends the RRC reconfiguration message to the UE, and sends the DRB configuration and/or the mapping of the Qos Flow to DRB determined by the target side to the UE.

In step S2405, the central unit user plane entity of the target base station receives the information of step S2404 from the central unit control plane entity of the target base station, the central unit user plane entity of the target base station does not delete the old mapping at the source side, the central unit user plane entity of the target base station does not delete the DRB that is temporarily used at the source side for processing the forwarded data but is not used at the target side. The central unit user plane entity of the target base station processes the data received from the source base station by using the received QoS flow to DRB mapping at the source side.

After receiving the end marker, the central unit user plane entity of the target base station deletes the old mapping at the source side and/or deletes the DRB that is temporarily used for processing the forwarded data but is not used at the target side. The central unit user plane entity of the target base station processes the fresh data received from the core network by using the newly received DRB configuration and/or the QoS flow to DRB mapping. The central unit user plane entity of the target base station sends the data received from the core network to the UE through the gNB-DU.

The release process of the old DRB on the gNB-DU is as described in the method in FIG. 25 or as follows. The old DRB is the DRB at the source side, and the target side is configured to process the forwarded data.

If no fresh data is received on one DRB within a certain period of time, the gNB-DU sends a UE context modification request message to the central unit control plane entity of the target base station. The message includes the identification that the DRB needs to be released. After receiving the message, the central unit control plane entity of the target base station may release the old DRB.

So far, the method 2400 for supporting handover of the present disclosure has been described. This method may ensure the correct processing of the target base station central unit control plane and the central unit user plane entity of the target base station as well as the gNB-DU when the target base station uses a different DRB configuration and/or a different QoS flow to DRB mapping from the source base station, thereby avoiding unnecessary data sending and resource waste, improving the efficiency of data forwarding, and improving the reliability of data forwarding during handover.

FIG. 25 shows an exemplary flowchart of a method 2500 for supporting handover according to an embodiment of the present disclosure. The method 2500 may be used for the inter-system handover or the intra-system handover. The method includes the following steps.

In step S2501, the central unit user plane entity of the target base station receives the end marker packet of the data forwarding.

In step S2502, the central unit user plane entity of the target base station sends the data forwarding end indication information to the central unit control plane entity of the target base station. The central unit user plane entity of the target base station may send the data forwarding end indication information to the central unit control plane entity of the target base station after receiving the end marker packets of all the DRBs of the data forwarding.

In step S2503, the central unit control plane entity of the target base station receives the data forwarding end indication information. The central unit control plane entity of the target base station sends a message to the target gNB-DU, to request to release an old DRB. An old DRB is the DRB at the source side and is configured at the target side to process the forwarded data. The central unit control plane entity of the target base station may request the gNB-DU to release an old DRB through the UE context modification message or other messages.

The gNB-DU receives the information from the central unit control plane entity of the target base station. The gNB-DU releases an old DRB. The gNB-DU sends a response message to the central unit control plane entity of the target base station.

So far, the method 2500 for supporting handover of the present disclosure has been described. With this method, the gNB-DU may release unnecessary DRB in time, save radio resources, and increase the capacity of the system or the ability to serve more users.

Figure 26:
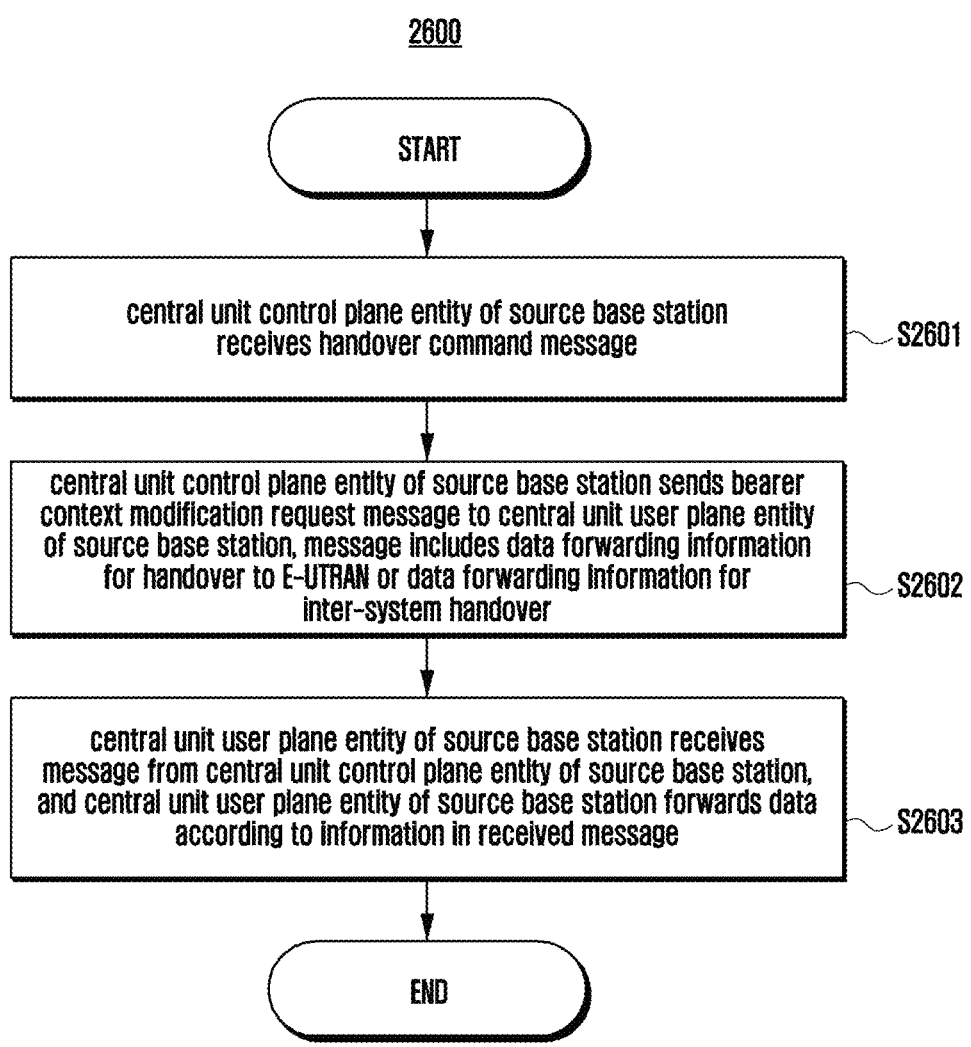
FIG. 26 shows an exemplary flowchart of a method for supporting handover according to an embodiment of the present disclosure.

FIG. 26 is an exemplary flowchart illustrating a method 2600 for supporting handover according to an embodiment of the present disclosure. The method 2600 may be used for an intra-system handover or an inter-system handover, and may be performed at the central unit control plane entity side of the source base station. The method includes the following steps.

In step S2601, the central unit control plane entity of the source base station receives a handover command message.

The handover command message comprises an E-RAB identifier and data forwarding tunnel information for data forwarding. During the procedure of the PDU session setup, the central unit control plane entity of the source base station receives the PDU session to be established, the information on one or more QoS flows in the PDU session and the E-RAB identifier to which the QoS flow maps from the core network, and the central unit control plane entity of the source base station stores the E-RAB identifier to which the QoS flow maps.

In step S2602, the central unit control plane entity of the source base station sends the bearer context modification request message to the central unit user plane entity of the source base station.

The message includes data forwarding information for handover to E-UTRAN or inter-system handover data forwarding information. The information (that is, the data forwarding information for handover to E-UTRAN or the inter-system handover data forwarding information) element may also be other names or named in other ways without departing from the scope of the present invention, and this information element aims to inform the central unit user plane entity of the source base station of the data forwarding information. The data forwarding information includes downlink data forwarding information. The downlink data forwarding information includes a transport layer address and a tunnel identifier. The downlink data forwarding information also includes a Qos flow list to be forwarded data through the data forwarding tunnel. The transport layer address and the tunnel identifier are the data forwarding tunnel information for each E-RAB allocated by the target base station and received in the handover command message by the central unit control plane entity of the source base station. The central unit control plane entity of the source base station receives the E-RAB identifier to which a Qos flow maps from the core network during the procedure of the PDU session establishment, so that the central unit control plane entity of the source base station knows the Qos flow(s) to be forwarded data through each E-RAB tunnel. The downlink data forwarding information may also include a DRB identifier. For the inter-system handover, each DRB identifier corresponds to each E-RAB identifier respectively, and may be the same as the E-RAB identifier or corresponds to the E-RAB identifier one-to-one. The downlink data forwarding information may also include an E-RAB identifier.

In step S2603, the central unit user plane entity of the source base station receives the message from the central unit control plane entity of the source base station. The central unit user plane entity of the source base station stores the information in the received message. The central unit user plane entity of the source base station forwards data according to the received information. The information is, for example, data forwarding information for handover to E-UTRAN or inter-system handover data forwarding information.

The source base station forwards the data of each Qos flow through the corresponding tunnel. The central unit user plane entity of the source base station knows that it is the inter-system handover according to the new information (the data forwarding information for handover to E-UTRAN or the inter-system handover data forwarding information) element included in the received message, so that no SDAP header is included in the forwarded data packet. The central unit user plane entity of the source base station forwards the PDCP SDU without the SDAP header.

For the intra-system handover, the data packet forwarded by the central unit user plane entity of the source base station over the tunnel corresponding to each DRB, that is, the PDCP SDU, may include the SDAP header.

So far, the method 2600 for supporting handover of the present invention has been described. With this method, in the case that the number of E-RABs used by the target base station is different from the number of DRBs used by the source NG-RAN, the central unit user plane entity of the source base station can correctly forward data to the target base station, the central unit user plane entity of the source base station can forward the data packets of Qos flows to the correct E-RAB tunnel, and the central unit user plane entity of the source base station can forward data packets without the SDAP header for the inter-system handover, in order to avoid impacts on the target E-UTRAN base station and ensure to send the correct data packets, avoid data loss, improve the efficiency of data transmission, and improve the reliability of data forwarding during handover.

Figure 27:
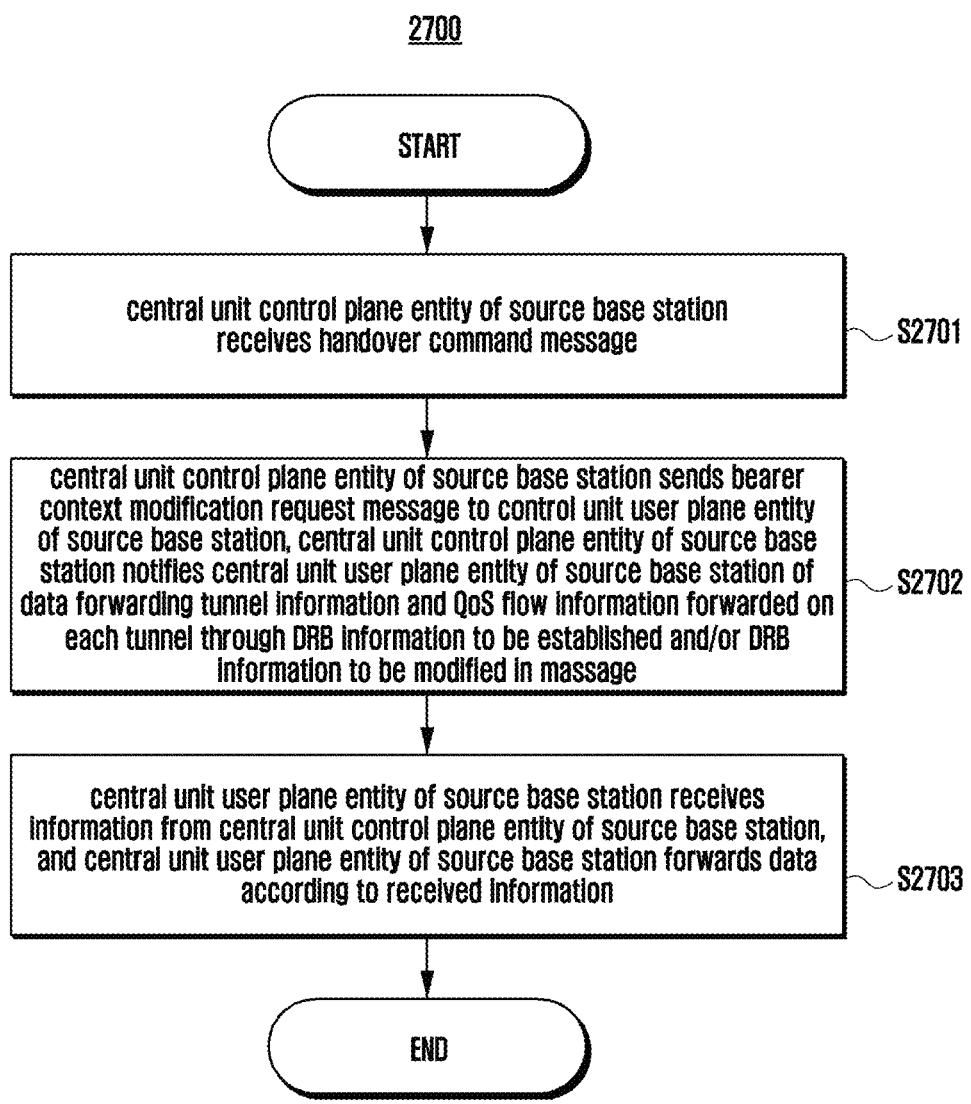
FIG. 27 shows an exemplary flowchart of a method for supporting handover according to an embodiment of the present disclosure.

FIG. 27 shows an exemplary flowchart of a method 2700 for supporting handover according to an embodiment of the present disclosure. The method 2700 may be used for the inter-system handover or the intra-system handover, and may be performed at the central unit control plane entity of the target base station. The method includes the following steps.

In step S2701, the central unit control plane entity of the source base station receives the handover command message.

The handover command message comprises an E-RAB identifier for data forwarding and data forwarding tunnel information. During the procedure of the PDU session establishment, the central unit control plane entity of the source base station receives the PDU session to be established, the information on one or more QoS flows in the PDU session and the E-RAB identifier to which the QoS flow maps from the core network, and the central unit control plane entity of the source base station stores the E-RAB identifier to which the QoS flow maps.

In step S2702, the central unit control plane entity of the source base station sends the bearer context modification request message to the central unit user plane entity of the source base station. The central unit control plane entity of the source base station notifies the central unit user plane entity of the source base station of the data forwarding tunnel information and the Qos flow information forwarded on each tunnel through the DRB information to be established and/or the DRB information to be modified in the message.

The central unit control plane entity of the source base station notifies the central unit user plane entity of the source base station of the data forwarding tunnel information and the Qos flow information forwarded on each tunnel through the DRB information to be established and/or the DRB information to be modified in the PDU session resource modification item in the message.

If the DRB of the central unit user plane entity of the target base station has been configured during the establishment of the PDU session, the central unit control plane entity of the source base station sends the transport layer address and the tunnel identifier assigned by the target base station through the DRB data forwarding information in the DRB modification item, and sends the Qos flow(s) that forwards data on the tunnel corresponding to DRB through the flow mapping information in the DRB modification item. The DRB modification item includes the DRB identifier.

For the case where the number of E-RABs of the target base station is more than the number of source DRBs, the DRB of the central unit user plane entity of the source base station is not configured during the PDU session establishment process, and the central unit control plane entity of the source base station sends the transport layer address and the tunnel identifier assigned by the target base station to the central unit user plane entity of the target base station by adding the information element, i.e. DRB data forwarding information in the DRB establishment item, and send the Qos flow(s) that forwards data on the tunnel corresponding to DRB to the central unit user plane entity of the target base station by the DRB to be established in the DRB establishment item. The Qos flow(s) of the forwarded data is sent. The DRB establishment item includes the DRB identifier.

For the inter-system handover, each DRB identifier corresponds to each E-RAB identifier respectively, and may be the same as the E-RAB identifier or corresponds to the E-RAB identifier one-to-one. The bearer context modification request message also includes the indication information for the inter-system handover. The indication information of the inter-system handover may be included in the PDU session resource modification information or the DRB information to be modified or the DRB information to be established.

The data forwarding information includes the downlink data forwarding information. The downlink data forwarding information includes a transport layer address and a tunnel identifier. The transport layer address and the tunnel identifier are the data forwarding tunnel information assigned to each E-RAB by the target base station, which is received by the central unit control plane entity of the source base station in the handover command message. The control plane entity of the source base station receives the E-RAB identifier to which each Qos flow maps from the core network during the establishment of the PDU session, so that the source base station control plane entity knows the Qos flow(s) that forwards data through each E-RAB tunnel.

In step S2703, the central unit user plane entity of the target base station receives a message from the central unit control plane entity of the source base station. The central unit user plane entity of the target base station saves the received information. The central unit user plane entity of the target base station forwards data according to the received information.

The central unit user plane entity of the target base station knows the Qos flow(s) forwarded through the tunnel according to DRB data forwarding information of each DRB to be modified in the received DRB information and flow mapping information. Alternatively, the central unit user plane entity of the target base station knows the Qos flow(s) forwarded through the tunnel according to DRB data forwarding information of each DRB to be established in the received DRB information and the Qos flow information to be established.

The source base station forwards the data of each Qos flow through the corresponding tunnel. For the inter-system handover, the central unit user plane entity of the target base station knows that it is the inter-system handover according to the received indication information of the inter-system handover, so that the SDAP header is not included in the forwarded data packet. The central unit user plane entity of the source base station forwards the PDCP SDU without the SDAP header. For the intra-system handover, the PDCP SDU forwarded by the central unit user plane entity of the source base station on the tunnel corresponding to each DRB may include the SDAP header.

So far, the method 2700 for supporting handover of the present disclosure has been described. With this method, in the case that the number of E-RABs used by the target base station is different from the number of DRBs used by the source NG-RAN, the central unit user plane entity of the source base station may correctly forward data to the target base station, the central unit user plane entity of the source base station may forward the data packets of Qos flows to the correct E-RAB tunnel, and the central unit user plane entity of the source base station may forward data packets without the SDAP header for the inter-system handover, in order to avoid impacts at the target E-UTRAN base station and ensure to send the correct data packets, avoid data loss, improve the efficiency of data transmission, and improve the reliability of data forwarding during handover.

Figure 28:
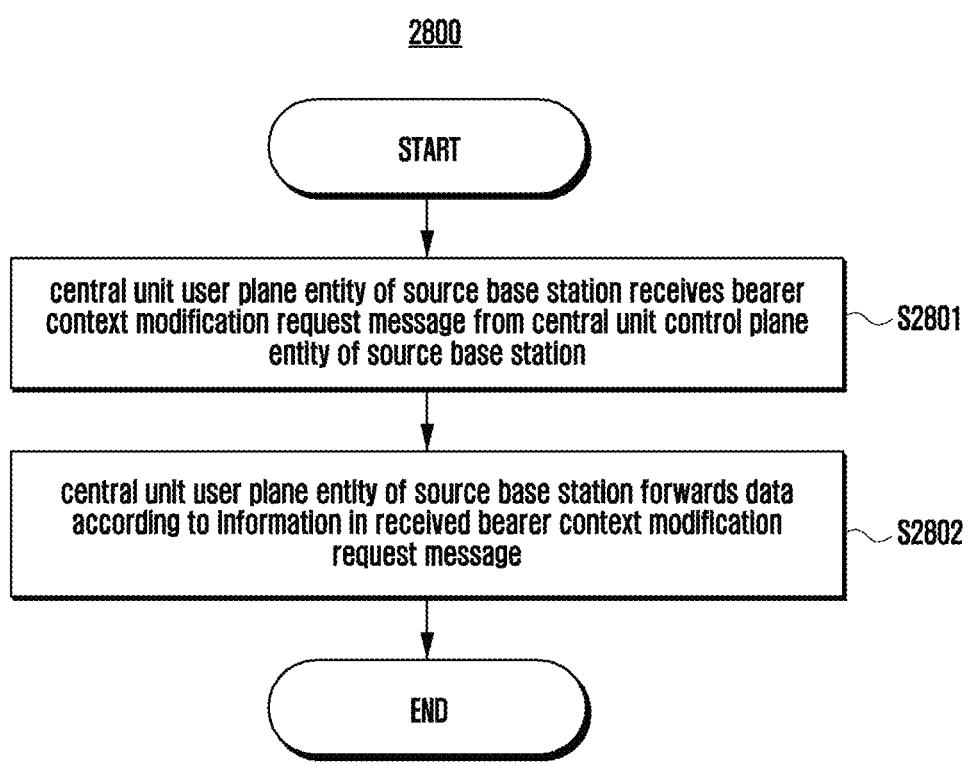
FIG. 28 shows an exemplary flowchart of a method for supporting handover according to an embodiment of the present disclosure.

FIG. 28 shows an exemplary flowchart of a method 2800 for supporting handover according to an embodiment of the present disclosure. The method 2800 may be used for the inter-system handover or the intra-system handover, and may be performed at the central unit user plane entity of the target base station. The method includes the following steps.

In step S2801, the central unit user plane entity of the source base station receives the bearer context modification request message from the central unit control plane entity of the source base station.

In step S2802, the central unit user plane entity of the target base station forwards the data according to the information in the received bearer context modification request message.

The method 2800 is similar to the method 2600, and the repetitions are omitted.

So far, the method 2800 for supporting handover of the present disclosure has been described. With this method, in the case that the number of E-RABs used by the target base station is different from the number of DRBs used by the source NG-RAN, the central unit user plane entity of the source base station may correctly forward data to the target base station, the central unit user plane entity of the source base station may forward the data packets of Qos flows to the correct E-RAB tunnel, and the central unit user plane entity of the source base station may forward data packets without the SDAP header for the inter-system handover, in order to avoid impacts at the target E-UTRAN base station and ensure to send the correct data packets, avoid data loss, improve the efficiency of data transmission, and improve the reliability of data forwarding during handover.

Figure 29:
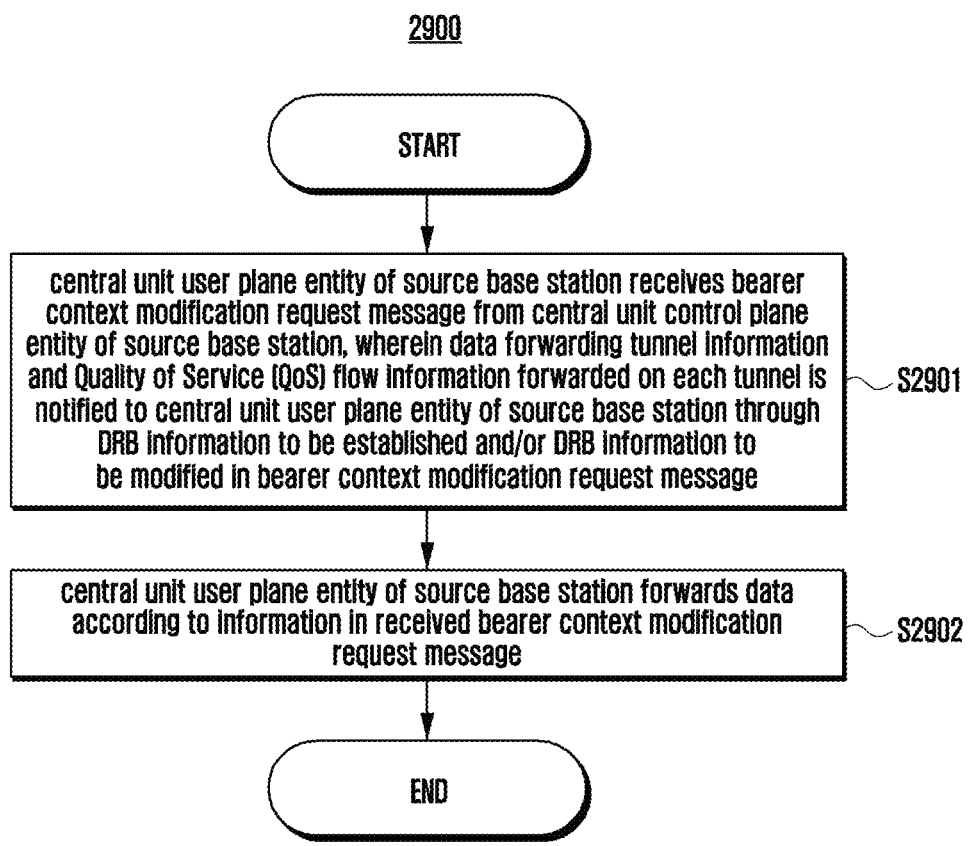
FIG. 29 shows an exemplary flowchart of a method for supporting handover according to an embodiment of the present disclosure.

FIG. 29 shows an exemplary flowchart of a method 2900 for supporting handover according to an embodiment of the present disclosure. The method 2900 may be used for the inter-system handover or the intra-system handover, and may be performed at the central unit user plane entity of the target base station. The method includes the following steps.

In step S2901, the central unit user plane entity of the source base station receives a bearer context modification request message from the central unit control plane entity of the source base station, wherein the data forwarding tunnel information and the Qos flow information forwarded on each tunnel is notified to the central unit user plane entity of the source base station through the DRB information to be established and/or the DRB information to be modified in the bearer context modification request message.

In step S2902, the central unit user plane entity of the target base station forwards data according to the information in the received bearer context modification request message.

The method 2900 is similar to the method 2700, and the repetitions are omitted.

So far, the method 2900 for supporting handover of the present disclosure has been described. With this method, in the case that the number of E-RABs used by the target base station is different from the number of DRBs used by the source NG-RAN, the central unit user plane entity of the source base station may correctly forward data to the target base station, the central unit user plane entity of the source base station may forward the data packets of Qos flows to the correct E-RAB tunnel, and the central unit user plane entity of the source base station may forward data packets without the SDAP header for the inter-system handover, in order to avoid impacts at the target E-UTRAN base station and ensure to send the correct data packets, avoid data loss, improve the efficiency of data transmission, and improve the reliability of data forwarding during handover.

The various methods described above with reference to FIGS. 3 to 29 may be used individually or in combination to solve the data forwarding problem during the inter-system handover or the intra-system handover.

Figure 30:
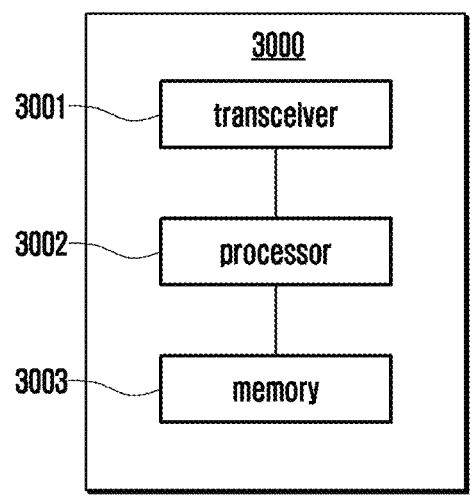
FIG. 30 shows a schematic block diagram of a device for supporting handover according to an embodiment of the present disclosure.

FIG. 30 shows a schematic block diagram of a device 3000 for supporting handover according to an embodiment of the present disclosure. The device 3000 may be implemented at the base station side. For example, the device 3000 may be implemented to perform one or more of the methods described above with reference to FIG. 3-29. The device 3000 may be correspond to the gNB or eNB described in the present disclosure.

As shown in FIG. 30, the device 3000 may include a transceiver 3001, a processor 3002, and a memory 3003.

The transceiver 3001 transmits and receives signals. The memory 3003 stores instructions that may be executed by the processor 3002. As executed by the processor 3002, the instructions may cause the processor 3002 to execute one or more of the methods described above with reference to FIGS. 3 to 29. The processor 3002 may include one or more processors or other processing devices that control the proposed function, process, and/or method. Operation of the device 3000 may be implemented by the processor 3002. For example, operations of central unit control plane entity of the device may be implemented by the processor 3002, and operations of central unit user plane entity of the device may be implemented by the processor 3002.

According to an aspect of the embodiments of the present disclosure, a method for supporting handover is provided, comprising: receiving a message from a central unit control plane entity of a target base station; receiving a data packet from a source base station; and discarding a Packet Data Convergence Protocol (PDCP) Service Data Unit (SDU) including PDCP sequence numbers (SNs) in the received data packet according to an indication of the message.

In an example, the indication of the message includes an indication information sent through a bearer context modification request message, the indication information indicates at least one of the following: a full configuration or a delta configuration; whether the PDCP SN is reserved; whether the PDCP is restarted; and whether to discard the data packet of the PDCP SDU including the PDCP SN.

In an example, discarding the PDCP SDU including the PDCP SN in the received data packet according to the indication of the message comprises discarding the PDCP SDU including the PDCP SN in the received data packet when the indication information indicates at least one of the following: the full configuration; the PDCP SN is not reserved; the PDCP restarts; and the PDCP SDU including the PDCP SN is discarded.

In an example, the indication of the message includes at least one of the following: no PDCP SN status information is received; no PDCP SN status information of data radio bearer (DRB) is received; no bearer context modification request message is received; and no PDCP SN status information of the DRB is included in the received bearer context modification request message.

In an example, discarding the PDCP SDU including the PDCP SN comprises: identifying the SDU to be discarded according to the SN in the General Packet Radio Service (GPRS) Tunneling Protocol (GTP) user plane (GTP-U) data packet.

In an example, the received data packet is sent from the source base station or forwarded by the source base station through a core network.

In an example, the PDCP SDU without the PDCP SN in the received data packet is fresh data.

According to another aspect of the embodiments of the present disclosure, a method for supporting handover is provided, comprising: receiving a handover request message; receiving a sequence number (SN) status transfer message or a downlink radio access network (RAN) status transfer message; and sending a message to a central unit user plane entity of a target base station, wherein the central unit user plane entity of the target base station discards a Packet Data Convergence Protocol (PDCP) Service Data Unit (SDU) including PDCP sequence numbers (SNs) in the received data packet according to the indication of the message.

In an example, receiving the handover request message comprises receiving a handover request message from the source base station, and receiving the SN status transfer message comprises receiving the SN status transfer message from the source base station, wherein the handover request message is a Xn application protocol (AP) message or other inter-base station messages, and wherein the SN status transfer message is a Xn AP message or other inter-base station messages.

In an example, receiving the handover request message comprises receiving a handover request message from the core network, wherein the handover request message received from the core network is a next generation application protocol (NGAP) message or a message between another base station and the core network.

In an example, the handover request message received from the core network includes a handover type.

In an example, the method also comprises determining whether to use a full configuration or a delta configuration.

In an example, sending a message to the central unit user plane entity of the target base station comprises sending a bearer context modification request message to the central unit user plane entity of the target base station when the handover type is an inter-system handover or when it is decided to use the full configuration.

In an example, the indication of the message includes an indication information sent through a bearer context modification request message, the indication information indicating at least one of the following: a full configuration or a delta configuration; whether the PDCP SN is reserved; whether the PDCP is restarted; and whether to discard the PDCP SDU including the PDCP SN in the data packet.

In an example, the indication of the message includes at least one of the following: no PDCP SN status information is received; no PDCP SN status information of the data radio bearer (DRB) is received; no bearer context modification request message is received; and no PDCP SN status information of the DRB is included in the received bearer context modification request message.

According to an aspect of the embodiments of the present disclosure, a method for supporting handover is provided, comprising: receiving a handover request message by a target base station; sending information on whether to use the full configuration or the delta configuration to a source base station by the target base station; and not sending a Packet Data Convergence Protocol (PDCP) Service Data Unit (SDU) including PDCP sequence numbers (SNs) to the target base station by the source base station based on the information.

In an example, receiving the handover request message by the target base station comprises receiving the handover request message from the source base station or the core network, and the handover request message received from the source base station is a Xn application protocol (AP) message or other inter-base station messages, and the handover request message received from the core network is the next generation application protocol (NGAP) message or the message between another base station and the core network.

In an example, the method further comprises determining whether to use the full configuration or the delta configuration by the target base station, the full configuration or the delta configuration is for each data radio bearer.

In an example, when the separation of the central unit user plane of the source base station and the central unit control plane of the source base station is supported by the source base station, the central unit control plane entity of the source base station notifies the central unit user plane entity of the source base station of not sending the PDCP SDU including the PDCP SN to the target base station.

In an example, the central unit control plane entity of the source base station notifies the central unit user plane entity of the source base station of not sending the PDCP SDU including the PDCP SN to the target base station comprises: the central unit control plane entity of the source base station sends an indication information to the central unit user plane entity of the source base station. The indication information indicates at least one of the following: whether to use a full configuration or a delta configuration; whether the PDCP SN status is reserved; whether only the fresh data is sent; whether to send the PDCP SDU including the PDCP SN; whether to send the PDCP data packet sent to the user equipment (UE) but not confirmed by the UE; and whether to only send the PDCP SDU without the PDCP SN.

In an example, the central unit control plane entity of the source base station notifies the central unit user plane entity of the source base station of not sending the PDCP SDU including the PDCP SN to the target base station comprises: the central unit control plane entity of the source base station sends data forwarding tunnel information to the central unit user plane entity of the source base station without requesting PDCP SN status information in order to indicate that the central unit control plane entity of the source base station does not send PDCP SN status information to the target base station.

According to an aspect of the embodiments of the present disclosure, a method for supporting handover is provided, comprising: receiving a handover related message; and indicating to the central unit user plane entity of the source base station of the information for data forwarding, wherein the central unit user plane entity of the source base station sends a Packet Data Convergence Protocol (PDCP) Service Data Unit (SDU) without the PDCP SN to the target base station based on the information for data forwarding.

In an example, the handover related message is one of a handover request confirmation message and a handover command message, and receiving the handover related message comprises receiving the handover request confirmation message from the target base station or the handover command message from the core network, and wherein the handover related message indicates whether it is the full configuration or the delta configuration, or indicates whether the Packet Data Convergence Protocol (PDCP) Sequence Number (SN) status is reserved.

In an example, indicating the information for data forwarding comprises sending indication information through the bearer context modification request message, and the indication information indicates at least one of the following: whether the PDCP SN status is reserved; whether only the fresh data is sent; whether to send the PDCP SDU including the PDCP SN; whether to send PDCP data packet sent to the user equipment (UE) but not confirmed by the UE; and whether to only send PDCP SDU without the PDCP SN.

In an example, indicating to the central unit user plane entity of the source base station of the information for data forwarding comprises: sending data forwarding tunnel information without requesting PDCP SN status information, in order to indicate that the central unit control plane entity of the source base station does not send the PDCP SN status information to the target base station.

According to one aspect of the embodiments of the present disclosure, a method for supporting handover is provided, comprising: receiving an indication of the information for data forwarding; and sending a Packet Data Convergence Protocol (PDCP) Service Data unit (SDU) without the PDCP sequence number (SN) to a target base station, based on the information for data forwarding.

In an example, the indication of the information for data forwarding comprises an indication information received through the bearer context modification request message, and the indication information indicates at least one of the following: whether the PDCP SN status is reserved; whether only the fresh data is sent; whether to send the PDCP SDU including the PDCP SN; whether to send PDCP data packet sent to the user equipment (UE) but not confirmed by the UE; and whether to only send PDCP SDU without the PDCP SN.

In an example, receiving an indication of the information for data forwarding comprises: receiving data forwarding tunnel information from the central unit control plane entity of the source base station without requesting PDCP SN status information, in order to indicate that the central unit control plane entity of the source base station does not send PDCP SN status information to the target base station.

According to another aspect of the embodiments of the present disclosure, a method for supporting handover is provided, comprising: receiving a handover request message by a central unit control plane entity of a target base station; sending, by a central unit control plane entity of the target base station, configuration information of data radio bearer (DRB) at the source side and configuration information of DRB at the target side, and/or a mapping from source Quality of Service (Qos) flow to a data radio bearer (DRB) as well as a mapping from target Qos flow to DRB, to a central unit user plane entity of the target base station; and processing, by the central unit user plane entity of the target base station, the forwarded data received from the source base station using the configuration of DRB at the source side and/or the QoS flow to DRB mapping at the source side and a fresh data received from the core network using the configuration of DRB at the target side and/or the QoS flow to DRB mapping at the target side.

In an example, the handover request message is received from the source base station or from the core network, the handover request message received from the source base station is an application layer message of an inter-base station interface, and the handover request message received from the core network is an application layer message of the base station and the core network interface. The handover request message includes the configuration information of the user equipment (UE) at the source base station, and the configuration information includes the QoS flow to DRB mapping.

In an example, when the central unit control plane entity of the target base station determines to use the QoS flow to DRB mapping being different from that for the source base station, the central unit control plane entity of the target base station temporarily configures the QoS flow to DRB mapping which is same as the source base station to process the data forwarded by the source base station.

In an example, target QoS flow information to be established is indicated by existing QoS flow information to be established in the DRB information to be established in an interface message of the central unit control plane entity of the base station and the central unit user plane entity of the base station, and source QoS flow information to be established is indicated by a new information element; or the source QoS flow information to be established is indicated by existing QoS flow information to be established in the DRB information to be established in an interface message of the central unit control plane entity of the base station and the central unit user plane entity of the base station, and the target QoS flow information to be established is indicated by a new information element; or the target QoS flow mapped to DRB is indicated by existing flow mapping information in the DRB information to be modified in the interface message of the central unit control plane entity of the base station and the central unit user plane entity of the base station, and the source QoS flow mapped to DRB is indicated by a new information element; or the source QoS flow mapped to DRB is indicated by the existing flow mapping information in the DRB information to be modified in the interface message of the central unit control plane entity of the base station and the central unit user plane entity of the base station, and the target QoS flow mapped to DRB is indicated by a new information element.

In an example, the central unit control plane entity of the target base station sends the configuration information of DRB at the source side and the configuration information of DRB at the target side to the central unit user plane entity of the target base station directly, or sends the configuration information of DRB at the target side together with a delta configuration between the source side and the target side to the central unit user plane entity of the target base station, or sends the configuration information of DRB at the source side and a delta configuration between the source side and the target side to the central unit user plane entity of the target base station.

According to another aspect of the embodiments of the present disclosure, a method for supporting handover is provided, comprising: receiving a handover request message; and sending configuration information of DRB at a source side and configuration information of DRB at a target side, and/or a mapping from source Quality of Service (Qos) flow to the data radio bearer (DRB) as well as a mapping from a target Qos flow to DRB, to a central unit user plane entity of a target base station, wherein the configuration of DRB at the source side and/or the QoS flow to DRB mapping at the source side is used to process the forwarded data received from the source base station by the central unit user plane entity of the target base station, and the configuration of DRB at the target side and/or the QoS flow to DRB mapping at the target side is used to process a fresh data received from the core network.

In an example, target QoS flow information to be established is indicated by existing QoS flow information to be established in the DRB information to be established in an interface message of the central unit control plane entity of the base station and the central unit user plane entity of the base station, and source QoS flow information to be established is indicated by a new information element; or the source QoS flow information to be established is indicated by existing QoS flow information to be established in the DRB information to be established in an interface message of the central unit control plane entity of the base station and the central unit user plane entity of the base station, and the target QoS flow information to be established is indicated by a new information element; or the target QoS flow mapped to DRB is indicated by existing flow mapping information in the DRB information to be modified in the interface message of the central unit control plane entity of the base station and the central unit user plane entity of the base station, and the source QoS flow mapped to DRB is indicated by a new information element; or the source QoS flow mapped to DRB is indicated by the existing flow mapping information in the DRB information to be modified in the interface message of the central unit control plane entity of the base station and the central unit user plane entity of the base station, and the target QoS flow mapped to DRB is indicated by a new information element.

In an example, the central unit control plane entity of the target base station sends the configuration information of DRB at the source side and the configuration information of DRB at the target side to the central unit user plane entity of the target base station directly, or sends the configuration information of DRB at the target side together with a delta configuration between the source side and the target side to the central unit user plane entity of the target base station, or sends the configuration information of DRB at the source side and a delta configuration between the source side and the target side to the central unit user plane entity of the target base station.

According to still another aspect of the embodiments of the present disclosure, a method for supporting handover is provided, comprising: receiving configuration information of DRB at a source side and configuration information of DRB at a target side and/or a mapping from source Quality of Service (Qos) flow to the data radio bearer (DRB) as well as a QoS flow to DRB mapping at the target side, from a central unit control plane entity of the target base station; and processing the forwarded data received from the source base station using the configuration of DRB at the source side and/or the QoS flow to DRB mapping at the source side and a fresh data received from the core network using the configuration of DRB at the target side and/or the QoS flow to DRB mapping at the target side.

In an example, target QoS flow information to be established is indicated by existing QoS flow information to be established in the DRB information to be established in an interface message of the central unit control plane entity of the base station and the central unit user plane entity of the base station, and source QoS flow information to be established is indicated by a new information element; or the source QoS flow information to be established is indicated by existing QoS flow information to be established in the DRB information to be established in an interface message of the central unit control plane entity of the base station and the central unit user plane entity of the base station, and the target QoS flow information to be established is indicated by a new information element; or the target QoS flow mapped to DRB is indicated by existing flow mapping information in the DRB information to be modified in the interface message of the central unit control plane entity of the base station and the central unit user plane entity of the base station, and the source QoS flow mapped to DRB is indicated by a new information element; or the source QoS flow mapped to DRB is indicated by the existing flow mapping information in the DRB information to be modified in the interface message of the central unit control plane entity of the base station and the central unit user plane entity of the base station, and the target QoS flow mapped to DRB is indicated by a new information element.

In an example, the central unit control plane entity of the target base station sends the configuration information of DRB at the source side and the configuration information of DRB at the target side to the central unit user plane entity of the target base station directly, or sends the configuration information of DRB at the target side together with a delta configuration between the source side and the target side to the central unit user plane entity of the target base station, or sends the configuration information of DRB at the source side and a delta configuration between the source side and the target side to the central unit user plane entity of the target base station.

According to another aspect of the embodiments of the present disclosure, a method for supporting handover is provided, comprising: receiving, by a central unit control plane entity of a target base station, a handover request message from a source base station or a core network; sending, by the central unit control plane entity of the target base station, a mapping from source Quality of Service (Qos) flow to data radio bearer (DRB) to a central unit user plane entity of the target base station; processing, by the central unit user plane entity of the target base station, forwarded data received from the source base station using the received QoS flow to DRB mapping at the source side; sending, by the central unit control plane entity of the target base station, a QoS flow to DRB mapping at the target side to the central unit user plane entity of the base station; and processing, by the central unit user plane entity of the target base station, fresh data received from the core network using newly received QoS flow to DRB mapping and sending to a user equipment (UE).

In an example, the method further comprises: including the QoS flow to DRB mapping at the target side in the handover command message by the central unit control plane entity of the target base station, the handover command message is sent to the UE through the source base station.

In an example, the method further comprises: including, by the central unit control plane entity of the target base station, the QoS flow to DRB mapping at the source side in the handover command message, the handover command message is sent to the UE through the source base station; sending, by the central unit control plane entity of the target base station, a radio resource control (RRC) reconfiguration message to UE, the RRC reconfiguration message includes the QoS flow to DRB mapping determined by the target; sending, by the central unit user plane entity of the target base station, an indication message to the central unit control plane entity of the target base station after an end marker packet is received by the central unit user plane entity of the target base station; and sending, by the central unit control plane entity of the target base station, the QoS flow to DRB mapping determined by the target through the RRC reconfiguration message.

In an example, sending the QoS flow to DRB mapping at the source side to the central unit user plane entity of the target base station by the central unit control plane entity of the target base station comprises: including the QoS flow information to be established in the DRB information to be established which is sent from the central unit control plane entity of the target base station to the central unit user plane entity of the target base station. The QoS flow information to be established included in the DRB information to be established is set according to the QoS flow to DRB mapping at the source side.

In an example, sending the mapping of the target Qos flow to DRB to the central unit user plane entity of the base station by the central unit control plane entity of the target base station comprises: including the QoS flow information to be established in the DRB information to be established which is sent from the central unit control plane entity of the target base station to the central unit user plane entity of the target base station. The QoS flow information to be established included in the DRB information to be established is set according to the QoS flow to DRB mapping at the target side.

According to another aspect of the embodiments of the present disclosure, a method for supporting handover is provided, comprising: receiving a handover request message from a source base station or from a core network; sending a mapping from source Quality of Service (Qos) flow to data radio bearer (DRB) to a central unit user plane entity of a target base station, wherein forwarded data received from a source base station is processed using the received QoS flow to DRB mapping at the source side by the central unit user plane entity of the target base station; and sending a QoS flow to DRB mapping at the target side to the central unit user plane entity of the base station, wherein a fresh data received from the core network is processed using newly received QoS flow to DRB mapping and sent to a user equipment (UE) by the central unit user plane entity of the target base station.

In an example, sending a mapping from source Quality of Service (Qos) flow to data radio bearer (DRB) to a central unit user plane entity of a target base station comprises: including the QoS flow information to be established in the DRB information to be established which is sent from the central unit control plane entity of the target base station to the central unit user plane entity of the target base station, the QoS flow information to be established included in the DRB information to be established is set according to the QoS flow to DRB mapping at the source side. And wherein sending the mapping of the target Qos flow to DRB to the central unit user plane entity of the base station comprises: including the QoS flow information to be established in the DRB information to be established which is sent from the central unit control plane entity of the target base station to the central unit user plane entity of the target base station, the QoS flow information to be established included in DRB information to be established is set according to the QoS flow to DRB mapping at the target.

According to another aspect of the embodiments of the present disclosure, a method for supporting handover is provided, comprising: receiving a mapping from source Quality of Service (Qos) flow to data radio bearer (DRB) from a central unit control plane entity of a target base station; processing forwarded data received from a source base station using the received QoS flow to DRB mapping at the source side; receiving a QoS flow to DRB mapping at the target side from the central unit control plane entity of the target base station; and processing a fresh data received from a core network using newly received QoS flow to DRB mapping and sending them to a user equipment (UE)

In an example, receiving a mapping from source Quality of Service (Qos) flow to data radio bearer (DRB) from a central unit control plane entity of a target base station comprises: including the QoS flow information to be established in the DRB information to be established which is sent from the central unit control plane entity of the target base station to the central unit user plane entity of the target base station, the QoS flow information to be established included in the DRB information to be established is set according to the QoS flow to DRB mapping at the source side. And wherein receiving a QoS flow to DRB mapping at the target side from the central unit control plane entity of the target base station comprises: including the QoS flow information to be established in the DRB information to be established which is sent from the central unit control plane entity of the target base station to the central unit user plane entity of the target base station, the QoS flow information to be established included in the DRB information to be established is set according to the QoS flow to DRB mapping at the target side.

According to another aspect of the embodiments of the present disclosure, a method for supporting handover is provided, comprising: receiving, by a central unit control plane entity of a target base station, a handover request message from a source base station or a core network; sending, by the central unit control plane entity of the target base station, a mapping from source Quality of Service (Qos) flow to data radio bearer (DRB) to a central unit user plane entity of the target base station; processing, by the central unit user plane entity of the target base station, the forwarded data received from the source base station using the received QoS flow to DRB mapping at the source side; sending, by the central unit control plane entity of the target base station, a QoS flow to DRB mapping at the target side to the central unit user plane entity of the base station and sending an indication information; and processing, by the central unit user plane entity of the target base station, the forwarded data received from the source base station using the received QoS flow to DRB mapping at the source side and processing a fresh data received from the core network using newly received QoS flow to DRB mapping at the target side.

In an example, the central unit user plane entity of the target base station does not delete an old source mapping and/or does not delete a DRB that is temporarily used for processing the forwarded data but is not used by the target according to the received indication information.

According to one aspect of the embodiments of the present disclosure, a method for supporting handover is provided, comprising: receiving, by a central unit control plane entity of a source base station, a handover command message; and sending, by the central unit control plane entity of the source base station, a bearer context modification request message to a central unit user plane entity of the source base station, wherein the central unit user plane entity of the source base station forwards data according to the information in the received bearer context modification request message.

In an example, the handover command message includes Evolved Radio Access Bearer (E-RAB) identification information for data forwarding and data forwarding tunnel information.

In an example, the bearer context modification request message includes data forwarding information for handover to the Evolved Universal Terrestrial Radio Access Network (E-UTRAN) or data forwarding information for inter-system handover, so as to notify the central unit user plane entity of the source base station of the data forwarding information.

In an example, the data forwarding information includes downlink data forwarding information, the downlink data forwarding information includes a transport layer address and a tunnel identifier, and the transport layer address and tunnel identifier are data forwarding tunnel information assigned to each E-RAB by the target base station which is received in the handover command message by the central unit control plane entity of the source base station.

In an example, the downlink data forwarding information further includes at least one of the following: a Quality of Service (Qos) flow list for forwarding data through a data forwarding tunnel; a data radio bearer (DRB) identifier; and an E-RAB identifier.

In an example, for the inter-system handover, the DRB identifier corresponds to each E-RAB identifier respectively, and is the same as the E-RAB identifier or corresponds to the E-RAB identifier one-to-one.

In an example, the central unit user plane entity of the source base station determines that it is an inter-system handover according to the data forwarding information for the handover to E-UTRAN or the inter-system handover data forwarding information, and no service data adaptation protocol (SDAP) header is included in the forwarded data packet; or for the inter-system handover, the central unit user plane entity of the source base station includes the SDAP header in the data packet forwarded on the tunnel corresponding to each DRB.

In an example, the central unit user plane entity of the source base station is notified of the data forwarding tunnel information and the Quality of Service (Qos) flow information forwarded on each the tunnel by the data radio bearer (DRB) information to be established and/or the DRB information to be modified in the bearer context modification request message.

In an example, the bearer context modification request message includes an indication information of the inter-system handover, and the indication information of the inter-system handover may be included in at least one of the protocol data unit (PDU) session resource modification information, the DRB information to be modified, or the DRB information to be established.

In an example, when the DRB of the central unit user plane entity of the source base station is configured during an setup of the PDU session, the central unit control plane entity of the source base station sends the transport layer address and the tunnel identifier assigned by the target base station through the DRB data forwarding information in the DRB modification item, and sends the Quality of Service (Qos) flow that forwards the data on the tunnel corresponding to DRB through the flow mapping information in the DRB modification item, wherein the DRB identifier is included in the DRB modification item.

In an example, when the DRB of the central unit user plane entity of the source base station is not configured during the setup of the PDU session, the central unit control plane entity of the source base station sends the transport layer address and the tunnel identifier assigned by the target base station to the central unit user plane entity of the source base station by adding DRB data forwarding information in the DRB setup item, and sends the Qos flow that forwards the data on the tunnel corresponding to DRB to the central unit user plane entity of the source base station through the Qos flow information to be established in the DRB setup item, wherein the DRB identifier is included in the DRB setup item.

In an example, the central unit user plane entity of the source base station knows the Quality of Service (Qos) flow forwarded through the tunnel according to DRB data forwarding information of each DRB in the received DRB information to be modified and flow mapping information, or the central unit user plane entity of the source base station knows the QoS flow forwarded through the tunnel according to DRB data forwarding information of each DRB in the received DRB information to be established and the QoS flow information to be established.

In an example, the central unit user plane entity of the source base station determines the inter-system handover according to a received indication information on inter-system handover, and no service data adaptation protocol (SDAP) header is included in the forwarded data packet; or for the inter-system handover, the central unit user plane entity of the source base station includes the SDAP header in the data packet forwarded on the tunnel corresponding to each DRB.

According to one aspect of the embodiments of the present disclosure, a method for supporting handover is provided, comprising: receiving, by a central unit user plane entity of a source base station, a bearer context modification request message from a central unit control plane entity of the source base station; and forwarding, by the central unit user plane entity of the source base station, data according to the information in the received bearer context modification request message.

In an example, the bearer context modification request message includes data forwarding information for handover to the Evolved Universal Terrestrial Radio Access Network (E-UTRAN) or data forwarding information for inter-system handover, so as to notify the central unit user plane entity of the source base station of the data forwarding information.

In an example, the data forwarding information includes a downlink data forwarding information, the downlink data forwarding information includes a transport layer address and a tunnel identifier, and the transport layer address and tunnel identifier are the data forwarding tunnel information for each E-RAB assigned by the target base station which is received in the handover command message by the central unit control plane entity of the source base station.

In an example, the downlink data forwarding information further includes at least one of the following: a Quality of Service (Qos) flow list for forwarding data through the data forwarding tunnel; a data radio bearer (DRB) identifier; and an E-RAB identifier.

In an example, for the inter-system handover, the DRB identifier corresponds to each E-RAB identifier respectively, and is the same as the E-RAB identifier or corresponds to the E-RAB identifier one-to-one.

In an example, the central unit user plane entity of the source base station determines that it is an inter-system handover according to the data forwarding information for the handover to E-UTRAN or the inter-system handover data forwarding information, and no service data adaptation protocol (SDAP) header is included in the forwarded data packet; or for the inter-system handover, the central unit user plane entity of the source base station includes the SDAP header in the data packet forwarded on the tunnel corresponding to each DRB.

In an example, the central unit user plane entity of the source base station is notified of the data forwarding tunnel information and the Quality of Service (Qos) flow information forwarded on each tunnel by the data radio bearer (DRB) information to be established and/or the DRB information to be modified in the bearer context modification request message; and the central unit user plane entity of the source base station forwards data according to the information in the received bearer context modification request message.

In an example, the bearer context modification request message includes indication information on the inter-system handover, and the indication information on the inter-system handover may be included in at least one of the protocol data unit (PDU) session resource modification information, the DRB information to be modified, or the DRB information to be established.

In an example, when the DRB of the central unit user plane entity of the source base station is configured during the setup of the PDU session, the central unit control plane entity of the source base station sends the transport layer address and the tunnel identifier assigned by the target base station through the DRB data forwarding information in the DRB modification item, and sends the Quality of Service (Qos) flow that forwards the data on the tunnel corresponding to DRB through the flow mapping information in the DRB modification item, wherein the DRB identifier is included in the DRB modification item.

In an example, when the DRB of the central unit user plane entity of the source base station is not configured during the setup of the PDU session, the central unit control plane entity of the source base station sends the transport layer address and the tunnel identifier assigned by the target base station to the central unit user plane entity of the source base station by adding DRB data forwarding information in the DRB setup item, and ends the Qos flow that forwards the data on the tunnel corresponding to DRB to the central unit user plane entity of the source base station through the Qos flow information to be established in the DRB setup item, wherein the DRB identifier is included in the DRB setup item.

In an example, the central unit user plane entity of the source base station knows the Quality of Service (Qos) flow forwarded through the tunnel according to DRB data forwarding information of each DRB in the received DRB information to be modified and flow mapping information, or the central unit user plane entity of the source base station knows the QoS flow forwarded through the tunnel according to DRB data forwarding information of each DRB in the received DRB information to be established and the QoS flow information to be established.

In an example, the central unit user plane entity of the source base station determines the inter-system handover according to the received indication information on inter-system handover, and no service data adaptation protocol (SDAP) header is included in the forwarded data packet; or for the inter-system handover, the central unit user plane entity of the source base station includes the SDAP header in the data packet forwarded on the tunnel corresponding to each DRB.

According to one aspect of the embodiments of the present disclosure, a method for supporting handover is provided, comprising: receiving a message from a central unit control plane entity of a target base station; receiving data packets from a source base station; and discarding PDCP SN included in the received data packet according to the indication of the message.

In an example, discarding the PDCP SN included in the received data packet comprises not sending the PDCP SN received from the source base station to the UE by the central unit user plane entity of the target base station.

In an example, the data packet is sent to the UE after processing by the target after the central unit user plane entity of the target base station removes the PDCP SN from the PDCP SDU.

In an example, the message may indicate the discarding of the PDCP SN included in the received data packet with an explicit indication way or an implicit indication way.

In an example, the explicit indication may comprise including indication information in the message, and the implicit indication may comprise without PDCP SN status information in the message.

In an example, the indication information may indicate at least one of the following: whether it is a full configuration or a delta configuration; whether PDCP SN is reserved; whether PDCP is restarted; discarding the data packet of the PDCP SDU including the PDCP SN; or discarding the PDCP SN included in the received data packet.

In an example, discarding the PDCP SN included in the received data packet according to the indication of the message, comprises: discarding the PDCP SN included in the received data packet when the indication information indicates at least one of the following: full configuration; the PDCP SN is not reserved; PDCP restarts; and discard the PDCP SDU including the PDCP SN or discard the PDCP SN included in the received data packet.

In an example, discarding the PDCP SN included in the received data packet according to the indication of the message, comprises: discarding the PDCP SN included in the received data packet when the indication of the message indicates at least one of the following: no PDCP SN status information is received; no PDCP SN status information of the data radio bearer (DRB) is received; no bearer context modification request message is received; and no PDCP SN status information of the DRB is included in the received bearer context modification request message.

According to another aspect of the embodiments of the present disclosure, a method for supporting handover is provided, comprising: receiving a handover request message; receiving a sequence number (SN) status transfer message or a downlink radio access network (RAN) status transfer message; and sending a message to a central unit user plane entity of a target base station, wherein the central unit user plane entity of the target base station discards PDCP SN included in the received data packet according to the indication of the message.

According to another aspect of the embodiments of the present disclosure, a method for supporting handover is provided, comprising: receiving, by a central unit user plane entity of a target base station, an indication information sent by a central unit control plane entity of a target base station; receiving, by the central unit user plane entity of the target base station, a data packet from the source base station or forwarded by the source base station through the core network; and receiving, by the central unit user plane entity of the target base station, the indication information from the central unit control plane entity of the target base station, and discarding, by the central unit user plane entity of the target base station, the PDCP SN included in the received data packet.

In an example, if the indication information indicates the full configuration or the PDCP SN is not reserved or the PDCP restarts or indicates to discard the PDCP SDU information including the PDCP SN or indicates to discard the PDCP SN information, the central unit user plane entity of the target base station discards the PDCP SN included in the received data packet.

According to another aspect of the embodiments of the present disclosure, a method for supporting handover is provided, comprising: receiving, by a central unit user plane entity of a target base station, a message sent by a central unit control plane entity of a target base station; receiving, by the central unit user plane entity of the target base station, a data packet from the source base station or forwarded by the source base station through the core network; and discarding the PDCP SN included in the received data packet by the central unit user plane entity of the target base station if no PDCP SN status information is received.

According to another aspect of the embodiments of the present disclosure, a method for supporting handover is provided, comprising: receiving, by a target base station, a handover request message; sending, by the target base station, information on whether to use a full configuration or a delta configuration to a source base station; and forwarding, by the source base station, data packets without the PDCP SN to the target base station based on the information.

In an example, the information on whether to use the full configuration or the delta configuration may be at least one of the following: information on whether the PDCP SN status is reserved, information on whether the PDCP SN is restarted, information on the PDCP SN is not required, or information on the data packet including the PDCP SN is not required.

In an example, if the source base station supports an architecture where the control plane and the user plane are separated, the central unit control plane entity of the source base station may notify the central unit user plane entity of the source base station there is no PDCP SN in the forwarded data packet through an explicit indication way or an implicit indication way.

In an example, the indication information may indicate at least one of the following: whether it is a full configuration or a delta configuration; whether PDCP SN is reserved; whether only the fresh data is sent; whether to send PDCP SDU including the PDCP SN; whether to send PDCP data packet sent to the user equipment (UE) but not confirmed by the UE; whether to include the PDCP SDU in the forwarded data packet; and whether to only send PDCP SDU without the PDCP SN.

According to another aspect of the embodiments of the present disclosure, a method for supporting handover is provided, comprising: receiving, by a target base station or a central unit control plane entity of the target base station, a handover request message; sending, by the target base station or the central unit control plane entity of the target base station, information on whether it is full configuration or delta configuration to the source base station or a central unit control plane entity of the source base station; and forwarding, by the source base station, the data packet without the PDCP SN to the target base station.

According to another aspect of the embodiments of the present disclosure, a method for supporting handover is provided, comprising: receiving, a handover related message; and indicating to a central unit user plane entity of a source base station of information for data forwarding, wherein the central unit user plane entity of the source base station forwards a PDCP SDU without the PDCP SN to the target base station based on the information for data forwarding.

In an example, the central unit control plane entity of the source base station may indicate the information for data forwarding to the central unit user plane entity of the source base station through an explicit indication way or an implicit indication way.

In an example, forwarding the data packet without the PDCP SN to the target base station by central unit user plane entity of the source base station when the indication information determines at least one of the followings: no PDCP SN status is reserved; only the fresh data is sent; the PDCP SDU including the PDCP SN is not sent; PDCP data packet sent to the user equipment (UE) but not confirmed by the UE is not forwarded; and only the PDCP SDU without the PDCP SN is sent.

In an example, for the DRB requested to be modified or established by the central unit control plane entity of the source base station, if the central unit control plane entity of the source base station does not request PDCP SN status information, the central unit user plane entity of the source base station forwards the PDCP SDU without the PDCP SN to the target base station.

According to another aspect of the embodiments of the present disclosure, a method for supporting handover is provided, comprising: receiving, by a central unit control plane entity of a source base station, a handover command message or a handover request confirmation message; notifying, by the central unit control plane entity of the source base station, the central unit user plane entity of the source base station of the data forwarding information through an explicit indication way or an implicit indication way; and forwarding, by the central unit user plane entity of the source base station, the data packet without the PDCP SN to the target base station.

According to another aspect of the embodiments of the present disclosure, a method for supporting handover is provided, comprising: receiving an indication of the information for data forwarding; and not sending a Packet Data Convergence Protocol (PDCP) Service Data Unit (SDU) including the PDCP sequence number (SN) to a target base station, based on the information for data forwarding.

In an example, an indication of the information for data forwarding may be received through an explicit indication way or an implicit indication way.

In an example, forwarding the data packet without the PDCP SN to the target base station by the source base station when the indication information determines at least one of the followings: the PDCP SN status is not reserved; only the fresh data is sent; the PDCP SDU including the PDCP SN is not sent; PDCP data packet sent to the user equipment (UE) but not confirmed by the UE is not sent; PDCP SN is not sent; and only the PDCP SDU without the PDCP SN is sent.

In an example, by not requesting of the PDCP SN status information, the central unit user plane entity of the source base station knows that the PDCP SN is not reserved or the central unit control plane entity of the source base station does not send PDCP SN status information to the target base station, and forwards PDCP SDU without the PDCP SN to the target base station.

According to another aspect of the embodiments of the present disclosure, a method for supporting handover is provided, comprising: receiving, by a central unit user plane entity of a source base station, the data forwarding information and the tunnel information for data forwarding sent by a central unit control plane entity of a source base station; and forwarding data packets without the PDCP SN to the target base station by the central unit control plane entity of the source base station.

According to another aspect of the embodiments of the present disclosure, a method for supporting handover performed by a target base station is provided, comprising: receiving, at a central unit-user plane (CU-UP) of the target base station, a first message for a bearer context modification from a central unit-control plane (CU-CP) of the target base station; receiving, at the CU-UP of the target base station, a packet data convergence protocol (PDCP) service data unit (SDU) from a central unit-user plane (CU-UP) of a source base station; identifying, at the CU-UP of the target base station, whether the first message includes PDCP sequence number (SN) status information; in case that the first message does not include the PDCP SN status information, identifying, at the CU-UP of the target base station, whether the PDCP SDU includes a PDCP SN; and in case that the PDCP SDU includes the PDCP SN, discarding, at the CU-UP of the target base station, the PDCP SDU.

In an example, transmission of the PDCP SDU may be skipped.

In an example, when intra-system handover involves full configuration, the first message does not include the PDCP SN status information.

In an example, identifying whether the PDCP SDU includes the PDCP SN comprising: identifying, at the CU-UP of the target base station, whether the PDCP SN is present in a forwarded general packet radio service tunneling protocol-user plane (GTP-U) packet.

According to another aspect of the embodiments of the present disclosure, a method for supporting handover performed by a target base station is provided, comprising: identifying, at a central unit-control plane (CU-CP) of the target base station, whether the intra-system handover involves full configuration; in case that intra-system handover involves the full configuration, generating, at the CU-CP of the target base station, a message for a bearer context modification which does not include packet data convergence protocol (PDCP) sequence number (SN) status information; and transmitting, at the CU-CP of the target base station, the message to a central unit-user plane (CU-UP) of the target base station, wherein a PDCP service data unit (SDU) received from a CU-UP of the source base station is discarded in case that the PDCP SDU includes a PDCP SN.

In an example, transmission of the PDCP SDU may be skipped.

In an example, whether the PDCP SDU includes the PDCP SN is identified based on a presence of the PDCP SN in a forwarded general packet radio service tunneling protocol-user plane (GTP-U) packet.

According to another aspect of the embodiments of the present disclosure, a target base station for supporting handover is provided, comprising: a transceiver; and a processor coupled with the transceiver and configured to: receive, at a central unit-user plane (CU-UP) of the target base station, a first message for a bearer context modification from a central unit-control plane (CU-CP) of the target base station, receive, at the CU-UP of the target base station, a packet data convergence protocol (PDCP) service data unit (SDU) from a central unit-user plane (CU-UP) of a source base station, identify, at the CU-UP of the target base station, whether the first message includes PDCP sequence number (SN) status information, in case that the first message does not include the PDCP SN status information, identify, at the CU-UP of the target base station, whether the PDCP SDU includes a PDCP SN, and in case that the PDCP SDU includes the PDCP SN, discard, at the CU-UP of the target base station, the PDCP SDU.

In an example, transmission of the PDCP SDU may be skipped.

In an example, when intra-system handover involves full configuration, the first message does not include the PDCP SN status information.

In an example, the processor is configured to identify, at the CU-UP of the target base station, whether the PDCP SN is present in a forwarded general packet radio service tunneling protocol-user plane (GTP-U) packet.

According to another aspect of the embodiments of the present disclosure, a target base station for supporting handover is provided, comprising: a transceiver; and a processor coupled with the transceiver and configured to: identify, at a central unit-control plane (CU-CP) of the target base station, whether the intra-system handover involves full configuration, in case that the intra-system handover involves the full configuration, generate, at the CU-CP of the target base station, a message for a bearer context modification which does not include packet data convergence protocol (PDCP) sequence number (SN) status information, and transmit, at the CU-CP of the target base station, the message to a central unit-user plane (CU-UP) of the target base station, wherein a PDCP service data unit (SDU) received from a CU-UP of the source base station is discarded in case that the PDCP SDU includes a PDCP SN.

In an example, transmission of the PDCP SDU may be skipped.

In an example, whether the PDCP SDU includes the PDCP SN is identified based on a presence of the PDCP SN in a forwarded general packet radio service tunneling protocol-user plane (GTP-U) packet.

According to another aspect of the embodiments of the present disclosure, a method for supporting handover performed by a source base station in a first system is provided, comprising: receiving, at a central unit-control plane (CU-CP) of the source base station, a first message for a handover command from a core network, the first message including an identifier of an evolved universal terrestrial radio access network (E-UTRAN) radio access bearer (E-RAB) and information associated with a tunnel for data forwarding; identifying, at the CU-CP of the source base station, information for data forwarding to a second system based on the first message, the information for data forwarding including the information associated with the tunnel and an identifier of a quality of service (QoS) flow to be forwarded on the tunnel; and transmitting, at the CU-CP of the source base station, a second message for a bearer context modification to a central unit-user plane (CU-UP) of the source base station, the second message including the information for data forwarding, wherein data associated with the QoS flow is forwarded to a target base station in the second system based on the information for data forwarding.

In an example, information on a mapping relationship between the E-RAB and the QoS flow is obtained based on a procedure associated with a protocol data unit (PDU) session setup, and the identifier of the QoS flow is identified based on the mapping relationship.

In an example, the data is forwarded as a packet data convergence protocol (PDCP) service data unit (SDU) without a service data adaptation protocol (SDAP) header.

In an example, the information associated with the tunnel includes a transport layer address of the tunnel and an identifier of the tunnel.

According to another aspect of the embodiments of the present disclosure, a method for supporting handover performed by a source base station in a first system is provided, comprising: receiving, at a central unit-user plane (CU-UP) of the source base station, a message for a bearer context modification from a central unit-control plane (CU-CP) of the source base station; in case that the message includes information for data forwarding to a second system, identifying, at the CU-UP of the source base station, a tunnel and a quality of flow (QoS) to be forwarded on the tunnel based on the information for data forwarding; and forwarding, at the CU-UP of the source base station, data associated with the QoS flow to a target base station in the second system through the tunnel; wherein the information for data forwarding includes information associated with the tunnel and an identifier of the QoS flow.

In an example, the information for data forwarding is based on a message for a handover command, the message for the handover command is received by the CU-CU of the source base station from a core network, and the message for the handover command includes an identifier of an evolved universal terrestrial radio access network (E-UTRAN) radio access bearer (E-RAB) and the information associated with the tunnel for data forwarding.

In an example, the data is forwarded as a packet data convergence protocol (PDCP) service data unit (SDU) without a service data adaptation protocol (SDAP) header.

In an example, the information associated with the tunnel includes a transport layer address of the tunnel and an identifier of the tunnel.

According to another aspect of the embodiments of the present disclosure, a source base station for supporting handover in a first system is provided, comprising: a transceiver; and a processor coupled with the transceiver and configured to: receive, at a central unit-control plane (CU-CP) of the source base station, a first message for a handover command from a core network, the first message including an identifier of an evolved universal terrestrial radio access network (E-UTRAN) radio access bearer (E-RAB) and information associated with a tunnel for data forwarding, identify, at the CU-CP of the source base station, information for data forwarding to a second system based on the first message, the information for data forwarding including the information associated with the tunnel and an identifier of a quality of service (QoS) flow to be forwarded on the tunnel, and transmit, at the CU-CP of the source base station, a second message for a bearer context modification to a central unit-user plane (CU-UP) of the source base station, the second message including the information for data forwarding, wherein data associated with the QoS flow is forwarded to a target base station in the second system based on the information for data forwarding.

In an example, information on a mapping relationship between the E-RAB and the QoS flow is obtained based on a procedure associated with a protocol data unit (PDU) session setup, and the identifier of the QoS flow is identified based on the mapping relationship.

In an example, the data is forwarded as a packet data convergence protocol (PDCP) service data unit (SDU) without a service data adaptation protocol (SDAP) header.

In an example, the information associated with the tunnel includes a transport layer address of the tunnel and an identifier of the tunnel.

According to another aspect of the embodiments of the present disclosure, a source base station for supporting handover in a first system is provided, comprising: a transceiver; and a processor coupled with the transceiver and configured to: receive, at a central unit-user plane (CU-UP) of the source base station, a message for a bearer context modification from a central unit-control plane (CU-CP) of the source base station, in case that the message includes information for data forwarding to a second system, identify, at the CU-UP of the source base station, a tunnel and a quality of flow (QoS) to be forwarded on the tunnel based on the information for data forwarding, and forward, at the CU-UP of the source base station, data associated with the QoS flow to a target base station in the second system through the tunnel, wherein the information for data forwarding includes information associated with the tunnel and an identifier of the QoS flow.

In an example, the information for data forwarding is based on a message for a handover command, the message for the handover command is received by the CU-CU of the source base station from a core network, and the message for the handover command includes an identifier of an evolved universal terrestrial radio access network (E-UTRAN) radio access bearer (E-RAB) and the information associated with the tunnel for data forwarding.

In an example, the data is forwarded as a packet data convergence protocol (PDCP) service data unit (SDU) without a service data adaptation protocol (SDAP) header.

In an example, the information associated with the tunnel includes a transport layer address of the tunnel and an identifier of the tunnel.

According to another aspect of the embodiments of the present disclosure, a device for supporting handover is provided, comprising: a transceiver, which is configured to send and receive signals; a processor; and a memory, comprising instructions that, when executed by the processor, cause the processor to perform any of the foregoing methods.

According to the embodiment of the present disclosure, the aforementioned method and device for supporting handover may solve the problem of coordinated work between the source base station and the target base station during the handover process. Especially when the source base station and/or the target base station support the separation of the control plane and the user plane, ensure that the central unit control plane entity of the source base station, the central unit user plane entity of the source base station, the central unit control plane entity of the target base station and/or the central unit user plane entity of the target base station may fully coordinately work. In addition, the method and device for supporting handover may also reduce data loss, reduce data interruption time, avoid sending useless data packets over the air interface, improve data forwarding efficiency, and ensure service continuity.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the embodiments as described herein.

Although the present disclosure has been described with various embodiments, various changes and modifications may be suggested to one skilled in the art. It is intended that the present disclosure encompass such changes and modifications as fall within the scope of the appended claims.

What is claimed is:

1. A method for supporting a handover performed by a target base station in a communication system, the method comprising:
receiving, at a central unit-user plane (CU-UP) of the target base station, a message for a bearer context modification from a central unit-control plane (CU-CP) of the target base station;
receiving, at the CU-UP of the target base station, a data packet forwarded from a CU-UP of a source base station;
based on the message not including packet data convergence protocol (PDCP) sequence number (SN) status information, identifying, at the CU-UP of the target base station, a PDCP service data unit (SDU) associated with a PDCP SN in the data packet; and
discarding, at the CU-UP of the target base station, the PDCP SDU associated with the PDCP SN.

2. The method of claim 1,
wherein, based on the handover involving full configuration, the message does not include the PDCP SN status information.

3. The method of claim 1, wherein identifying the PDCP SDU associated with the PDCP SN comprises:
identifying, at the CU-UP of the target base station, the PDCP SDU for which delivery was attempted by the source base station, based on a presence of the PDCP SN in the data packet.

4. The method of claim 1,
wherein the PDCP SDU for which delivery was attempted by the source base station is not transmitted by the CU-CP of the target base station to a user equipment (UE), and
wherein the data packet includes a general packet radio service tunneling protocol-user plane (GTP-U) packet.

5. A method for supporting a handover performed by a target base station in a communication system, the method comprising:
identifying, at a central unit-control plane (CU-CP) of the target base station, whether the handover involves full configuration;
based on the handover involving the full configuration, generating, at the CU-CP of the target base station, a message for a bearer context modification which does not include packet data convergence protocol (PDCP) sequence number (SN) status information; and
transmitting, at the CU-CP of the target base station, the message to a central unit-user plane (CU-UP) of the target base station,
wherein the message indicates that the CU-UP of the target base station discards a PDCP service data unit (SDU) associated with a PDCP SN in a data packet forwarded from a CU-UP of a source base station.

6. The method of claim 5,
wherein the PDCP SDU for which delivery was attempted by the source base station is identified based on a presence of the PDCP SN in the data packet.

7. The method of claim 5,
wherein the PDCP SDU for which delivery was attempted by the source base station is not transmitted by the CU-CP of the target base station to a user equipment (UE), and
wherein the data packet includes a general packet radio service tunneling protocol-user plane (GTP-U) packet.

8. A target base station for supporting a handover in a communication system, comprising:
a transceiver; and
a controller coupled with the transceiver and configured to:
receive, at a central unit-user plane (CU-UP) of the target base station, a message for a bearer context modification from a central unit-control plane (CU-CP) of the target base station,
receive, at the CU-UP of the target base station, a data packet forwarded from a CU-UP of a source base station,
based on the message not including packet data convergence protocol (PDCP) sequence number (SN) status information, identify, at the CU-UP of the target base station, a PDCP service data unit (SDU) associated with a PDCP SN in the data packet, and
discard, at the CU-UP of the target base station, the PDCP SDU associated with the PDCP SN.

9. The target base station of claim 8,
wherein, based on the handover involving full configuration, the message does not include the PDCP SN status information.

10. The target base station of claim 8, wherein the controller is configured to:
identify, at the CU-UP of the target base station, the PDCP SDU for which delivery was attempted by the source base station, based on a presence of the PDCP SN in the data packet.

11. The target base station of claim 8,
wherein the PDCP SDU for which delivery was attempted by the source base station is not transmitted by the CU-CP of the target base station to a user equipment (UE), and
wherein the data packet includes a general packet radio service tunneling protocol-user plane (GTP-U) packet.

12. A target base station for supporting a handover in a communication system, comprising:
a transceiver; and
a controller coupled with the transceiver and configured to:
identify, at a central unit-control plane (CU-CP) of the target base station, whether the handover involves full configuration,
based on the handover involving the full configuration, generate, at the CU-CP of the target base station, a message for a bearer context modification which does not include packet data convergence protocol (PDCP) sequence number (SN) status information, and
transmit, at the CU-CP of the target base station, the message to a central unit-user plane (CU-UP) of the target base station,
wherein the message indicates that the CU-UP of the target base station discards a PDCP service data unit (SDU) associated with a PDCP SN in a data packet forwarded from a CU-UP of a source base station.

13. The target base station of claim 12,
wherein the PDCP SDU for which delivery was attempted by the source base station is identified based on a presence of the PDCP SN in the data packet.

14. The target base station of claim 12,
wherein the PDCP SDU for which delivery was attempted by the source base station is not transmitted by the CU-CP of the target base station to a user equipment (UE), and
wherein the data packet includes a general packet radio service tunneling protocol-user plane (GTP-U) packet.

* * * * *